United States Patent [19]
Omori et al.

[11] Patent Number: 5,644,427
[45] Date of Patent: Jul. 1, 1997

[54] IMAGE DISPLAY APPARATUS

[75] Inventors: Shigeru Omori; Tomohiko Hattori; Kunimasa Katayama; Sadayuki Sakuma, all of Nakai-machi, Japan

[73] Assignee: Terumo Kabushiki Kaisha, Tokyo, Japan

[21] Appl. No.: 385,056

[22] Filed: Feb. 7, 1995

[30] Foreign Application Priority Data

Feb. 7, 1994 [JP] Japan .................................. 6-013843

[51] Int. Cl.$^6$ .................................................. G02B 27/22
[52] U.S. Cl. .......................... 359/464; 359/462; 359/471; 348/51
[58] Field of Search ........................... 359/462, 464, 359/466, 471; 348/42, 51, 65, 72; 352/57; 353/7

[56] References Cited

U.S. PATENT DOCUMENTS

| | | | |
|---|---|---|---|
| 3,128,339 | 4/1964 | Wupper | 348/64 |
| 4,385,316 | 5/1983 | Yanagisawa | 348/44 |
| 4,535,354 | 8/1985 | Rickert | 348/52 |
| 4,641,178 | 2/1987 | Street | 348/57 |
| 4,647,966 | 3/1987 | Phillips et al. | 348/58 |
| 4,649,425 | 3/1987 | Pund | 348/52 |
| 4,717,949 | 1/1988 | Eichenlaub | 348/54 |
| 4,829,365 | 5/1989 | Eichenlaub | 348/54 |
| 4,870,600 | 9/1989 | Hiraoka | 395/119 |
| 4,890,902 | 1/1990 | Doane et al. | 359/52 |
| 4,922,336 | 5/1990 | Morton | 348/51 |
| 4,987,487 | 1/1991 | Ichinose et al. | 348/59 |
| 5,008,658 | 4/1991 | Russay et al. | 345/87 |
| 5,032,912 | 7/1991 | Sakariassen | 348/52 |
| 5,059,957 | 10/1991 | Todoriki et al. | 345/7 |
| 5,132,839 | 7/1992 | Travis | 359/462 |

(List continued on next page.)

FOREIGN PATENT DOCUMENTS

| | | |
|---|---|---|
| 0505998 A3 | 9/1992 | European Pat. Off. . |
| 0 576 106 | 12/1993 | European Pat. Off. . |
| 0 595 023A1 | 5/1994 | European Pat. Off. . |
| 0 602 934 | 6/1994 | European Pat. Off. . |
| 0 602 934 A2 | 6/1994 | European Pat. Off. . |
| 0601308 A1 | 6/1994 | European Pat. Off. . |
| 41 02 895C1 | 1/1992 | Germany . |
| 93 00 765 | 5/1993 | Germany . |
| 63-127777 | 5/1988 | Japan . |
| 63-194497 | 8/1988 | Japan . |
| 5-22722 | 1/1993 | Japan . |
| 2111798 | 7/1983 | United Kingdom . |
| 2206763 | 1/1989 | United Kingdom . |
| WO 83/02169 | 6/1983 | WIPO . |
| WO 93/19394 | 10/1993 | WIPO . |

OTHER PUBLICATIONS

K.E. Jachimowicz, et al., "Stereoscopic (3–D) projection display using polarized color multiplexing," Optical Engineering, vol. 29, Aug. 1990.

K. Yamamoto, et al., "Automatic Viewing Range Tracing Method For Communication Equipment", IEEE Transactions on Consumer Electronics, Aug. 1991, No. 3, vol. 37, pp. 424–431.

J.R. Moore et al., "The Implementation of a Multi-view Autostereoscopic Display," *Image Technology (Journal of the BKSTS)*, vol. 75, No. 1, Jan. 1993, London GB, pp. 6–11.

*Primary Examiner*—Paul M. Dzierzynski
*Assistant Examiner*—Darren E. Schuberg
*Attorney, Agent, or Firm*—Burns, Doane, Swecker & Mathis, LLP

[57] ABSTRACT

Screen images for the right eye and for the left eye are displayed upside down on the image display devices 10a and 10b, respectively, and images of right half and left half faces of the viewers picked-up by image sensing devices 14a and 14b are displayed on the spatial modulation elements 11a and 11b. By seeing the screen images transmitted through the images of the right half and the left half faces, which are light transmission images, on the spatial modulation elements 11a and 11b, and through lenses 11a and 11b, having directivities, the right eyes and the left eyes of the viewers can respectively see the screen images for the right eyes and for the left eyes, which are combined by a half mirror 15.

36 Claims, 37 Drawing Sheets

U.S. PATENT DOCUMENTS

| | | | |
|---|---|---|---|
| 5,162,785 | 11/1992 | Fagard | 345/87 |
| 5,311,220 | 5/1994 | Eichenlaub | 348/55 |
| 5,315,377 | 5/1994 | Isono et al. | 348/51 |
| 5,365,370 | 11/1994 | Hudgins | 359/464 |
| 5,408,264 | 4/1995 | Kurata et al. | 348/51 |
| 5,421,589 | 6/1995 | Monroe | 273/437 |
| 5,430,474 | 7/1995 | Hines | 348/42 |
| 5,430,809 | 7/1995 | Tomitaka | 382/173 |
| 5,457,574 | 10/1995 | Eichenlaub | 359/619 |
| 5,459,605 | 10/1995 | Kempf | 359/462 |
| 5,494,483 | 2/1996 | Adair | 600/111 |
| 5,499,303 | 3/1996 | Hundt et al. | 382/100 |
| 5,568,314 | 10/1996 | Omori et al. | 359/464 |

DIRECT IMAGE

DIRECT IMAGE (INVERTED UPSIDE DOWN)

FOR RIGHT EYE

NEGATIVE-POSITIVE REVERSED IMAGE

NEGATIVE-POSITIVE REVERSED TURNED UPSIDE DOWN & RIGHT AND LEFT

IMAGE DISPLAY APPARATUS

BACKGROUND OF THE INVENTION

The present invention relates to a display apparatus for displaying an image and, more particularly, to a display apparatus for displaying a stereoscopic image for industrial, domestic, and medical uses.

In a conventional stereoscopic display system, a viewer wears glasses for separating right and left images from each other whereby right and left eyes of the viewer can selectively see right and left screen images, respectively, which are displayed on an image field in a time-division fashion. In another conventional technique, a lenticular plate is attached to an image field so that the lenticular plate can separate right and left images from each other and thus right and left eyes of the viewer can selectively see right and left screen images, respectively.

FIG. 1 illustrates an example of the configuration of the above-described conventional stereoscopic-image display system, which includes glasses 60 capable of separating right and left images from each other, liquid crystal shutters 61a and 61b, a synchronous circuit 62, and color CRT 63 serving as an image display device.

The above first example of a stereoscopic-image display system having such a configuration operates as follows. The color CRT 63 displays stereoscopic images wherein screen images for right and left eyes are displayed alternately in a time-division fashion. Under the control of the synchronous circuit 62, the liquid crystal shutter 61a of the glasses 60 is opened and thus become transparent only when screen images for the right eye are displayed, and the liquid crystal shutter 61b is opened and become transparent only when screen images for the left eye are displayed. As a result, a viewer wearing the glasses 60 can observe screen images for the right eye with his or her right eye, and screen images for the left eye with the left eye. In this way, stereoscopic vision is provided.

FIG. 2 illustrates the configuration of the second example of a conventional stereoscopic-image display system, which includes a lenticular plate 71 having a large number of cylindrical lenses touching each other in parallel and a color CRT 72 serving as an image display device.

This second example of stereoscopic-image display system having such a configuration operates as follows. The color CRT 72 simultaneously displays both screen images for right and left eyes such that screen images for right and left eyes having radius-width of each cylindrical lens (slit-shaped) are displayed alternately on arbitrary positions in each cylindrical lens of the lenticular plate 71. The right eye of a viewer sees only the screen images for the right eye displayed on the above-described slit-shaped zones through each cylindrical lens of the lenticular plate 71, and the left eye sees only the screen images for the left eye displayed on the slit-shaped zones, whereby stereoscopic vision is obtained.

In the first example of the conventional stereoscopic-image display system, however, a viewer has to wear troublesome and uncomfortable glasses which separately provide screen images to right and left eyes of the viewer. Another problem in observing stereoscopic images using this technique is flicker due to the switching between the screen images for right and left eyes.

In the second example of the conventional stereoscopic-image display system, since a stripe-shaped stereoscopic image is observed via cylindrical lenses, stereoscopic vision can be obtained only when a viewer is in a limited narrow area. If the viewer moves, degradation occurs in the image. Besides, many viewers at various positions can not observe an image at the same time. Furthermore, image processing is necessary to provide a stripe-shaped image, thus requiring an expensive apparatus.

In medical applications, when an endoscopic operation is done, an operator usually observes a plane image of the inside of a patient's abdominal cavity displayed on a monitor via an endoscope. In which case, the monitored image of the inside of the abdominal cavity has little characteristic features because the entire abdominal cavity is displayed in a single color, thus it is difficult to give perspective vision. This causes a long operation time, and causes heavy loads to both operator and patient. As described above, when a conventional stereoscopic-image display system of the above-described first or second type is used in the operation, there are serious problems in practical use such as uncomfortable glasses for separating right and left images, flicker of an image, and limitation in movement of a viewer.

SUMMARY OF THE INVENTION

The object of the present invention is to provide an image display apparatus capable of displaying two images which are seen without glasses for separating screen images for the right eye from a screen image for the left eye, and which can be seen by many viewers without flicker.

According to the present invention, the foregoing object is attained by providing an image display apparatus comprising:

first image display means for displaying a first image;

second image display means for displaying a second image;

first spatial modulation element provided between said first image display means and viewers;

second spatial modulation element provided between said second image display means and the viewers;

at least one optical element, provided between the first and second spatial modulation elements and viewers, for giving directivity to light of the first and the second images which are transmitted through said first and second spatial modulation elements; and combining means, provided between the first and second spatial modulation elements and viewers, for combining light of the first and second images which are transmitted through said first and second spatial modulation elements, wherein said first spatial modulation element transmits light at a position corresponding to one of either right or left half faces of the viewers, and blocks light at a position corresponding to either left or right half faces, and said second spatial modulation element transmits light at a position corresponding to one of either left or right half faces of the viewers, and blocks light at a position corresponding to either right or left half faces, respectively.

The spatial modulation element selectively controls light to be transmitted through it and blocked by it, and the optical element having directivity selects light transmission areas and the light blocking areas on the spatial modulation element, thus the first image is seen by either one of the right or the left eye of the viewer, and the second image is seen by the other eye of the viewer.

According to an aspect of the present invention as described above, in the image display apparatus capable of displaying a stereoscopic image, wherein said first and second spatial modulation elements are for screen images of a stereoscopic image for the right eye and the left eye, respectively, said first spatial modulation element transmits light at the position corresponding to right half faces of the viewers and blocks light at the position corresponding to left half faces of the viewers, whereas said second spatial modulation element transmits light at the position corresponding to left half faces of the viewers and blocks light at the position corresponding to right half faces of the viewers.

It is another object of the present invention is to provide an image display apparatus capable of displaying a stereoscopic image, containing the construction as described above, further comprising at least one image sensing device for picking up an image of the viewers, wherein light transmission areas and light blocking areas on said first and second spatial modulation elements are controlled depending upon the image of the viewers' faces picked up by said image sensing device.

Still another object of the present invention is to provide an image display apparatus capable of displaying a stereoscopic image, containing the construction as described above, further comprising detecting means for detecting positions of the viewers, wherein light transmission areas and light blocking areas on said first and second spatial modulation elements are controlled depending upon the positions of the viewers detected by said detecting means.

According to an aspect of the present invention as described above, said optical element is a lens or a concave mirror.

Further, according to an aspect of the present invention as described above, said optical element magnifies area corresponding to the right half faces of the viewers on said first spatial modulation element for the right eyes of the viewers, and magnifies area corresponding to the left half faces of the viewers on said second spatial modulation element for the left eyes of the viewers.

Furthermore, according to an aspect of the present invention as described above, said optical element is provided between said combining means and the viewers. Accordingly, the number of the necessary optical element is reduced to one.

Further, according to an aspect of the present invention as described above, said optical elements are a pair of lenses or concave mirrors which respectively provided between said first and second spatial modulation elements and said combining element. Therefore, it is easy to align an optical axis, thus, easy to set the optical element at a proper position.

Further, according to an aspect of the present invention as described above, said first and second spatial modulation elements are transmission type monochromatic liquid crystal displays or electrochromic displays.

Further, according to an aspect of the present invention as described above, said fist and second spatial modulation elements are light blocking plates on which areas for transmitting light and areas for blocking light are fixed. In this case, there is a limitation on the displacement of the viewer, however, it is possible to reduce the cost for manufacturing the apparatus.

Further, according to an aspect of the present invention as described above, further comprising an infrared light irradiation device for illuminating either right or left half faces of the viewers, said image sensing device can selectively pick up images depending upon the wavelengths of infrared light Further, according to an aspect of the present invention as described above, further comprising a pair of irradiation devices for illuminating right half and the left half faces of the viewers by using light having two different wavelengths, wherein a pair of said image sensing devices have wavelength filters each of which selectively transmits infrared light of different the wavelengths emitted by said pair of irradiation devices. Accordingly, an image of half face of the viewer can be easily picked up by eliminating external scattered light without causing discomfort to the viewer.

Further, according to an aspect of the present invention as described above, said first spatial modulation element displays an image of right half faces, picked up by said pair of image sensing devices, of the viewers as light transmission figures, and wherein said second spatial modulation element displays an image of left half faces, picked up by said pair of image sensing devices, of the viewers as light transmission figures. The light transmission figure can be an image of viewer's face, or can be a predetermined shaped figure displayed at a position of the viewer's face.

Further, according to an aspect of the present invention as described above, images except the faces of viewers are eliminated by applying subtraction on two images picked up by said pair of image sensing elements, and images of obtained left and right half faces of the viewers are displayed on the first and second spatial modulation elements as light transmission figures, respectively. The light transmission figure does not include any undesired noises.

Further, according to an aspect of the present invention as described above, said image sensing device picks up an image of either right or left half faces of the viewers, and one of said first and second spatial modulation elements displays the image of the half faces of the viewers picked-up by the image sensing device, and the other spatial modulation element displays the negative-positive converted image of the half faces of the viewers. Thereby, it is possible to reduce the number of image sensing devices to one.

Further, according to an aspect of the present invention as described above, surfaces of said first and second spatial modulation elements are preferably provided beyond a focal distance of the lens or the concave mirror.

Further, according to an aspect of the present invention as described above, said irradiation device is a lamp unit for emitting infrared light, or a LED capable of emitting infrared light.

Further, according to an aspect of the present invention as described above, the image display means displays an image taken by an endoscope.

Further, according to an aspect of the present invention as described above, said first and second image display means display still images.

Further, according to an aspect of the present invention as described above, said first and second image display means comprise liquid crystal displays for displaying the first or second images and polarizing plates provided in front of the liquid crystal displays.

DESCRIPTION OF PREFERRED EMBODIMENTS

<First Embodiment>

Figure 1:
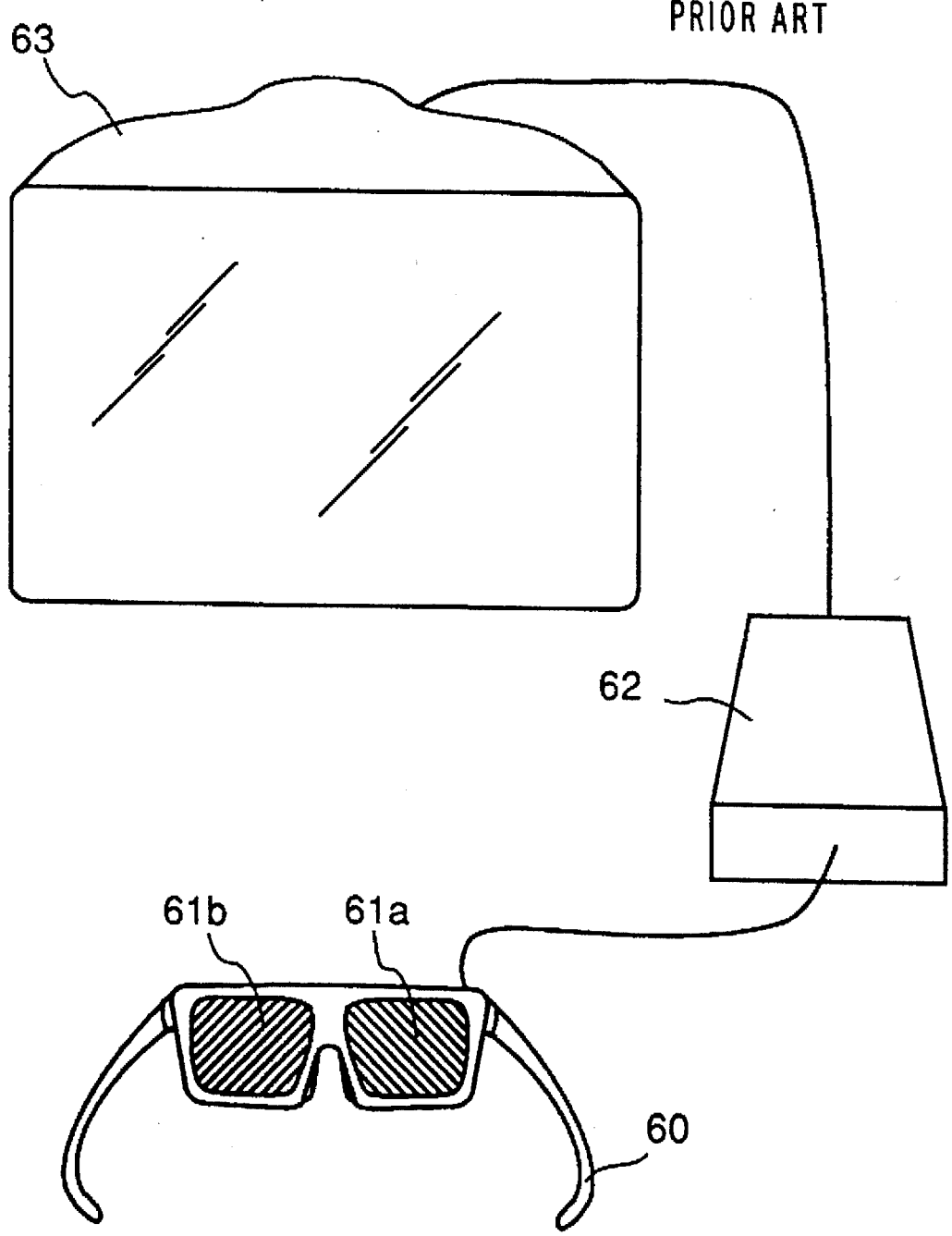
FIG. 1 illustrates a configuration of a conventional stereoscopic image display apparatus according to the first example.
Figure 2:
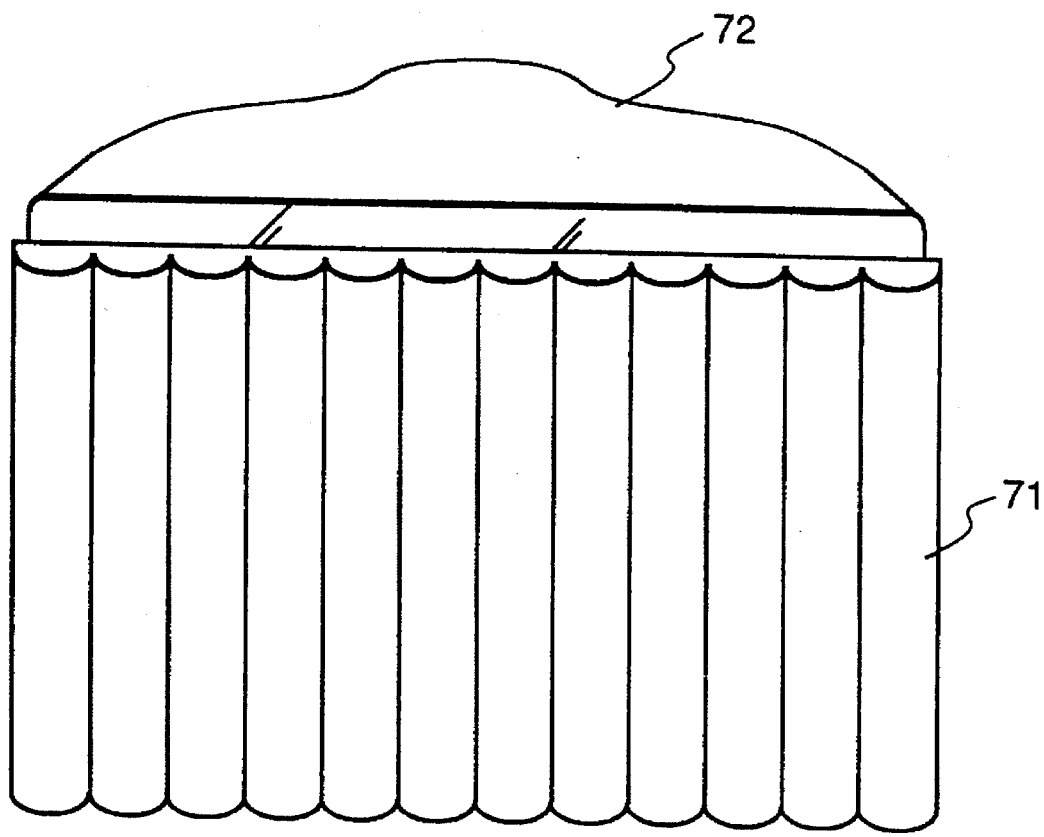
FIG. 2 illustrates a configuration of a conventional stereoscopic image display apparatus according to the second example.
Figure 3:
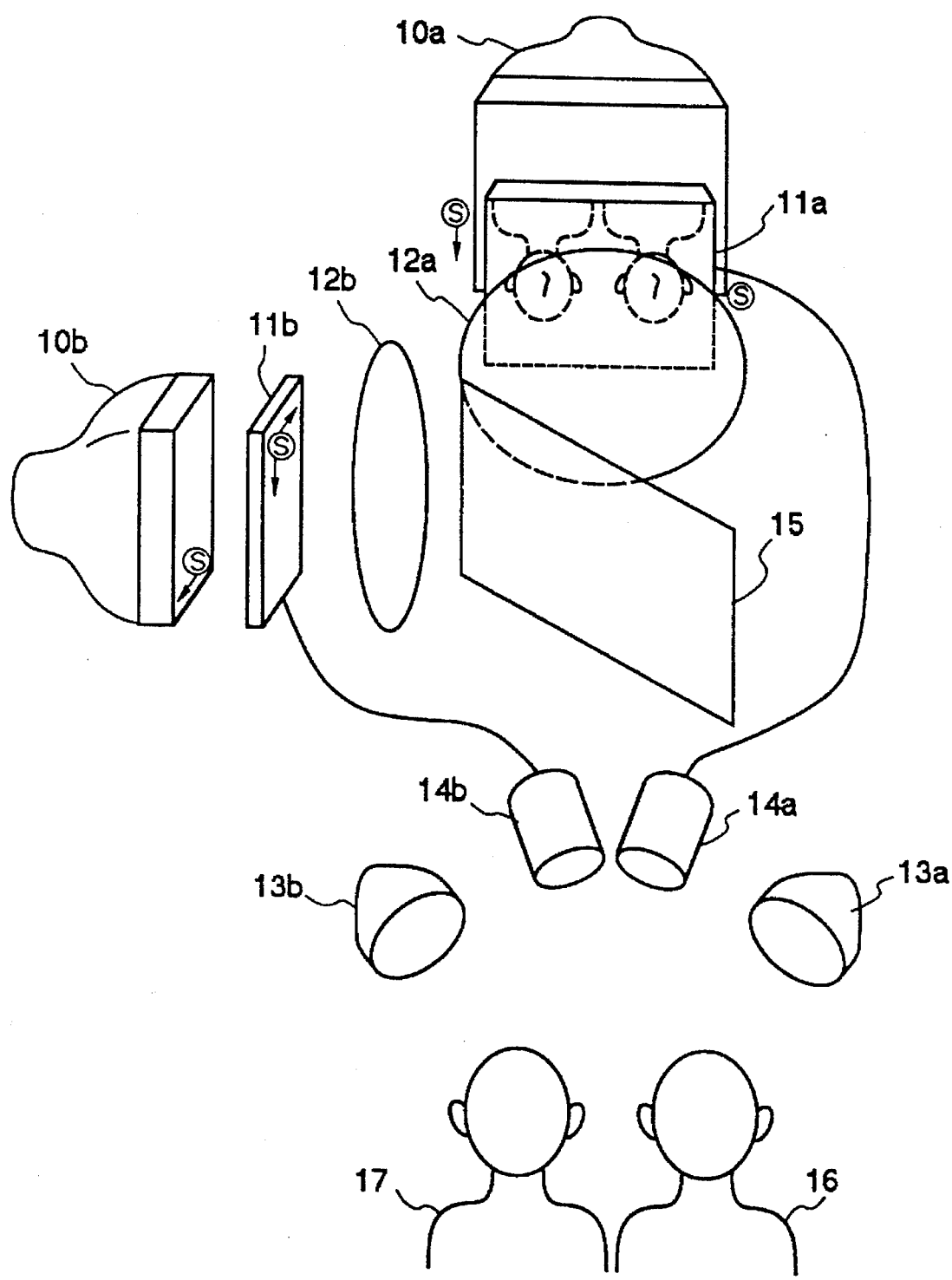
FIG. 3 illustrates a configuration of a stereoscopic image display apparatus according to the first embodiment of the present invention.

FIG. 3 shows a configuration of a stereoscopic image display apparatus according to a first embodiment of the present invention. The apparatus according to the first embodiment comprises a plurality of displays. The displays are set "normally" unless otherwise specified. It is meant by "normally" that a luster scan starts at an upper left point of the display screen of the "normally" set display when it is set upright. If a display is set with the screen surface placed horizontally, a luster scan starts at an upper left point (from the view point of viewer) of the screen surface of the "normally" set display. In the figures, arrows "→" and indicators "ⓢ" are used to describe another method of setting the displays, which will be described later.

In FIG. 3, reference numerals 10a and 10b denote color CRTs as image display devices displaying screen images;

11a and 11b, transmission type liquid crystal displays functioning as spatial modulation devices each of which is provided between the color CRT 10a or 10b and viewers; and 12a and 12b, Fresnel lenses having a focal distance of 150 mm. Each Fresnel lens is placed at the distance which is farther than the focal distance of the Fresnel lenses 12a and 12b from the liquid crystal display 11a or 11b, 160 mm, for instance. Further, reference numerals 13a and 13b denote LEDs which emit light having wavelengths of 850 nm and 950 nm, respectively, and function as irradiation devices; 14a and 14b, monochrome CCD cameras which serve as image sensing devices; 15, a half mirror for combining images displayed on the color CRTs 10a and 10b; and 16 and 17, viewers who see stereoscopic images.

In the present specification, an objective image which are seen by the right or left eye of viewer for stereoscopic vision are referred to as "screen image". Therefore, "screen images" are not limited to images which are displayed on a screen, they encompasses images on films.

Figure 4:
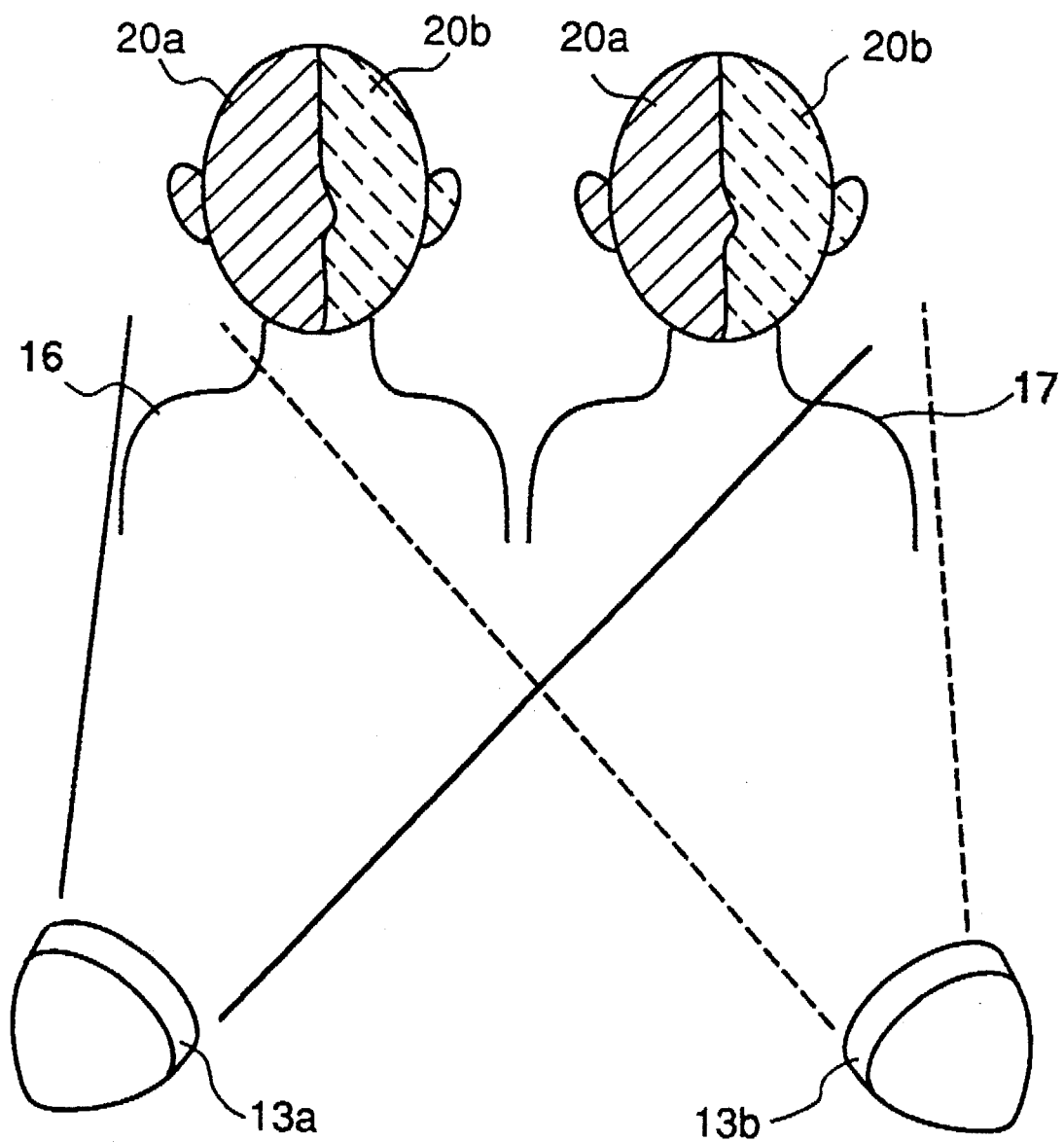
FIG. 4 illustrates an explanatory view of operation of the stereoscopic image display apparatus according to the first embodiment of the present invention.

FIG. 4 illustrates a situation where the viewers 16 and 17 are illuminated from the front by the LEDs 13a and 13b. Two areas 20a are right half faces of the viewers 16 and 17 illuminated by the LED 13a. Similarly, two areas 20b are left half faces of the viewers 16 and 17 illuminated by the LED 13b.

Figure 5:
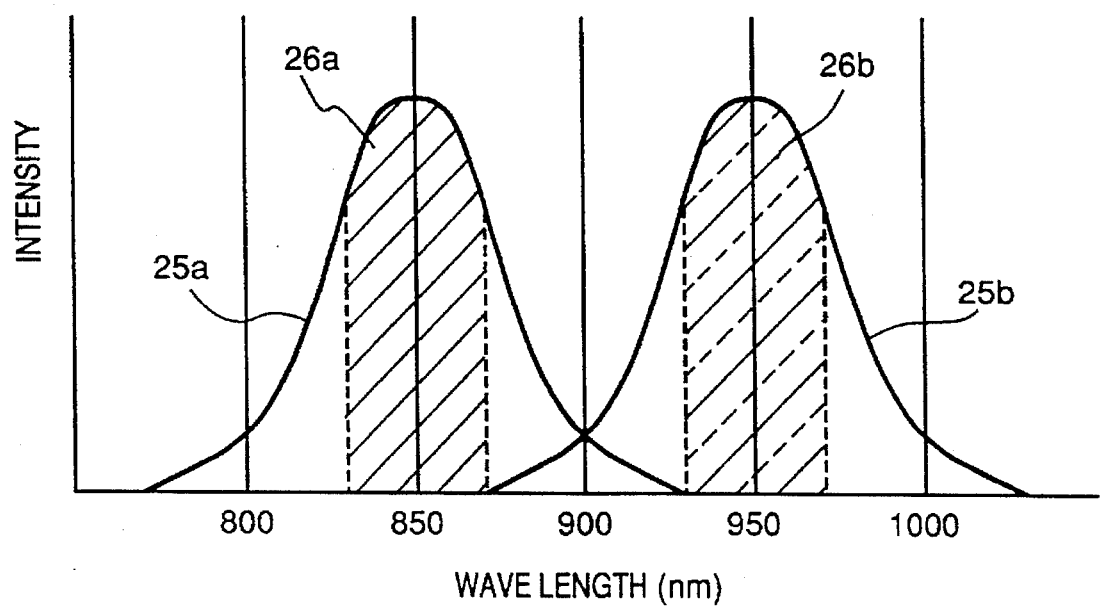
FIG. 5 illustrates graphs showing characteristic distributions of wavelengths of light emitted by a light in the stereoscopic image display apparatus according to the first embodiment of the present invention.

FIG. 5 shows graphs illustrating a characteristic distribution of light emitted from the LED 13a and 13b. The curve 25a shows a wavelength distribution of the light from the LED 13a, and the curve 25b shows a wavelength distribution of the light from the LED 13b. The hatched areas 26a and 26b in FIG. 5 are the wavelength bands of light being selectively transmitted through wavelength filters (will be explained later) attached to the monochrome CCD cameras 14a and 14b, respectively.

Figure 6:
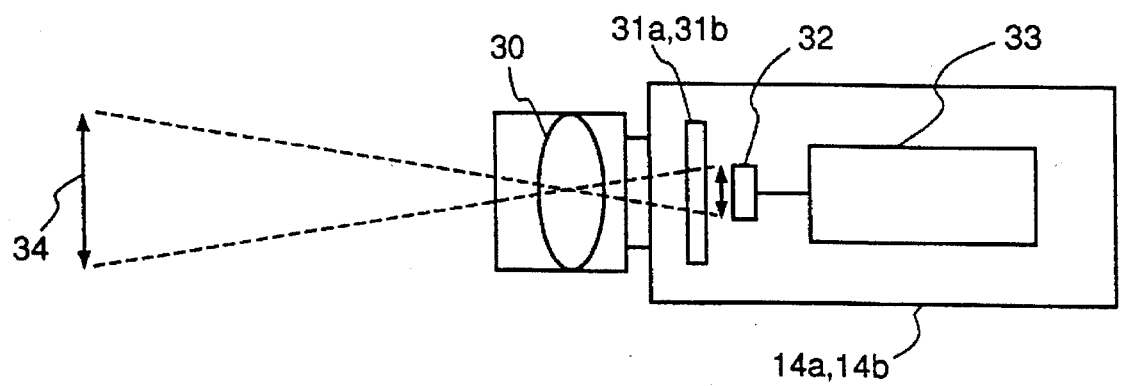
FIG. 6 illustrates a cross sectional view of an image sensing device in the stereoscopic image display apparatus according to the first embodiment of the present invention.

FIG. 6 is a cross sectional view of the CCD cameras 14a and 14b which pick up images of viewers' faces. In FIG. 6, reference numeral 30 denotes an objective lens; 31a and 31b, interference filters which function as wavelength filters; 32, an image sensing element including a CCD chip; 33, a driving circuit for driving the image sensing element; and 34, an object which is an image of faces of viewers 16 and 17 in the first embodiment.

Figure 7:
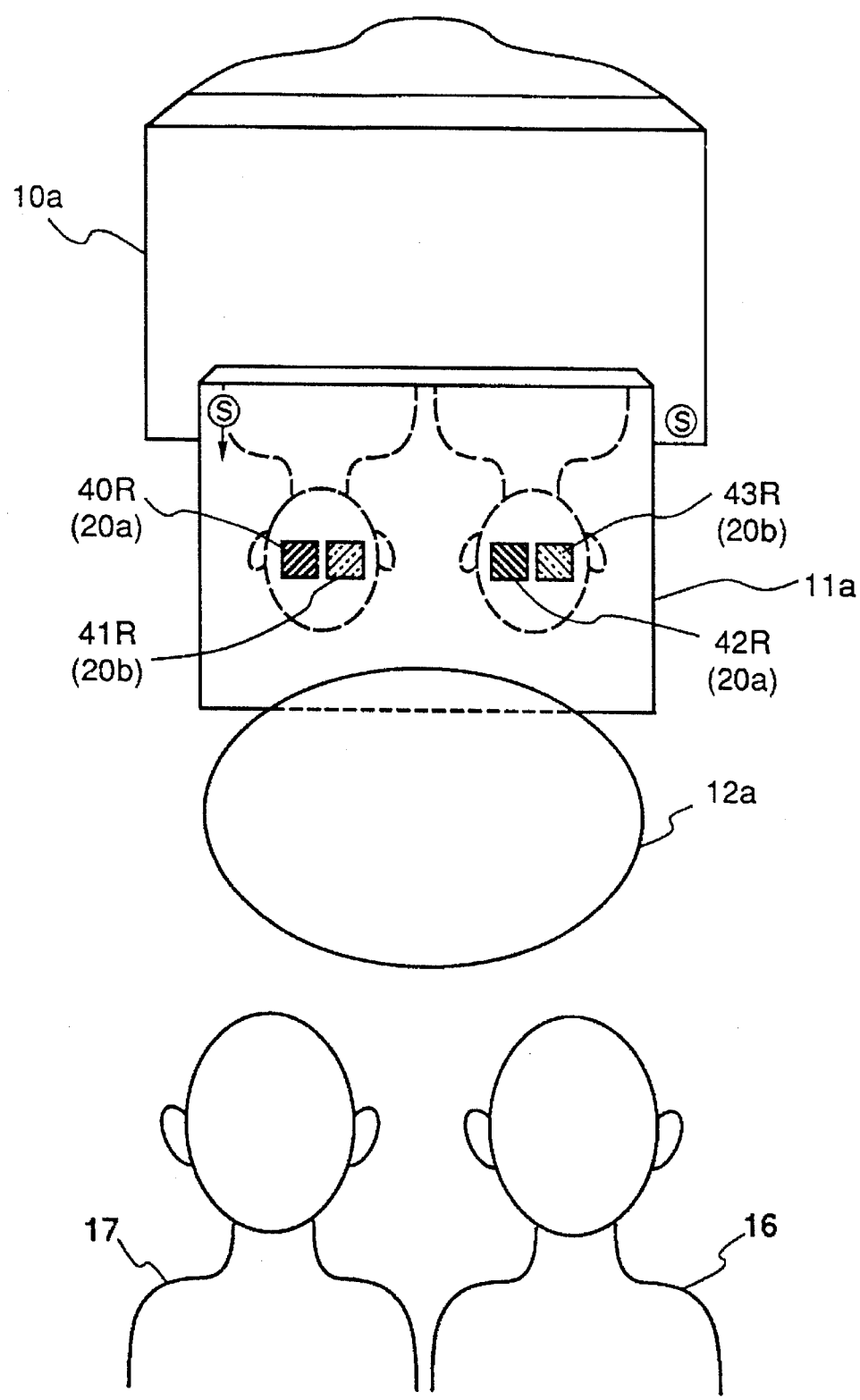
FIG. 7 illustrates an explanatory view of operation of the stereoscopic image display apparatus according to the first embodiment of the present invention.

FIG. 7 illustrates a scene where the viewers see the image of their faces as a virtual image according to the embodiment referring to FIG. 3. In FIG. 7, for a simplicity sake, the color CRT 10a, the liquid crystal display 11a, and the Fresnel lens 12a is shown out of the color CRTs 10a and 10b, the liquid crystal displays 11a and 11b, and the Fresnel lenses 12a and 12b, and the half mirror 15 is not shown. Areas 40R, 41R, 42R, and 43R displayed on the liquid crystal display 11a in FIG. 7 are actually seen by the viewers 16 and 17.

Operations of the stereoscopic image display apparatus constructed as above will be described with reference to FIGS. 3 to 7.

Regarding the screen images shown in FIG. 3 seen by the viewers 16 and 17, screen images for the right eye (referred as "R screen images", hereinafter) are displayed on the color CRT 10a after being turned upside down, and screen images for the left eye (referred as "L screen images", hereinafter) are displayed on the color CRT 10b after being turned upside down and converted into reflected image. The R and L screen images displayed on the CRTs 10a and 10b are combined by the half mirror 15. Further, regarding the LEDs 13a and 13b provided in the oblique forward directions of the viewers 16 and 17, the LED 13a is set so as to illuminate the areas 20a which are the right half faces of the viewers 16 and 17, likewise, the LED 13b is set so as to illuminate the areas 20b which are the left half faces of the viewers 16 and 17, as shown in FIG. 4. The wavelengths of the light from the LEDs 13a and 13b, as shown in FIG. 5, have peaks at about 850 nm and 950 nm, respectively, as indicated by the curves 25a and 25b. Since intensities of the two kinds of light at common wavelength are less than half strength of the intensities at the peaks, thus the two LEDs can be used as light sources which emit light of two different wavelengths. Meanwhile, in the CCD cameras 14a and 14b, the interference filters 31a and 31b, which transmit light having wavelengths of 850±20 nm and 950±20 nm, respectively, are provided between the image sensing elements 32 and objective lenses 30, thus, when an image of the object 34 is focused on the image sensing elements 32, portions which are illuminated by two kinds of light having wavelength ranges 26a and 26b in FIG. 5 are preserved as an image.

Therefore, according to the configuration as described above, the CCD camera 14a picks up images of areas 20a which include the right eyes of the viewers 16 and 17, whereas, the CCD camera 14b picks up images of areas 20b which include the left eyes of the viewers 16 and 17. The images of the two areas 20a, picked up by the camera 14a are displayed on the liquid crystal display 11a as images (or areas) 40R and 42R, respectively. Note that, when the images 40R and 42R are displayed on the liquid crystal display 11a, the areas where the images 40R and 42R are displayed transmit light. If images, displayed on the liquid display apparatus, transmit light through the areas of the images, the images are called "light transmission images", hereinafter. In this case, the camera 14a is not sensitive to the light from the LED 13b, thus it does not pick up images of areas 20b which includes the left eyes of the viewers. Therefore, areas 41R and 43R on the liquid crystal display 11a connected to the camera 14a does not transmit light.

Figure 8:
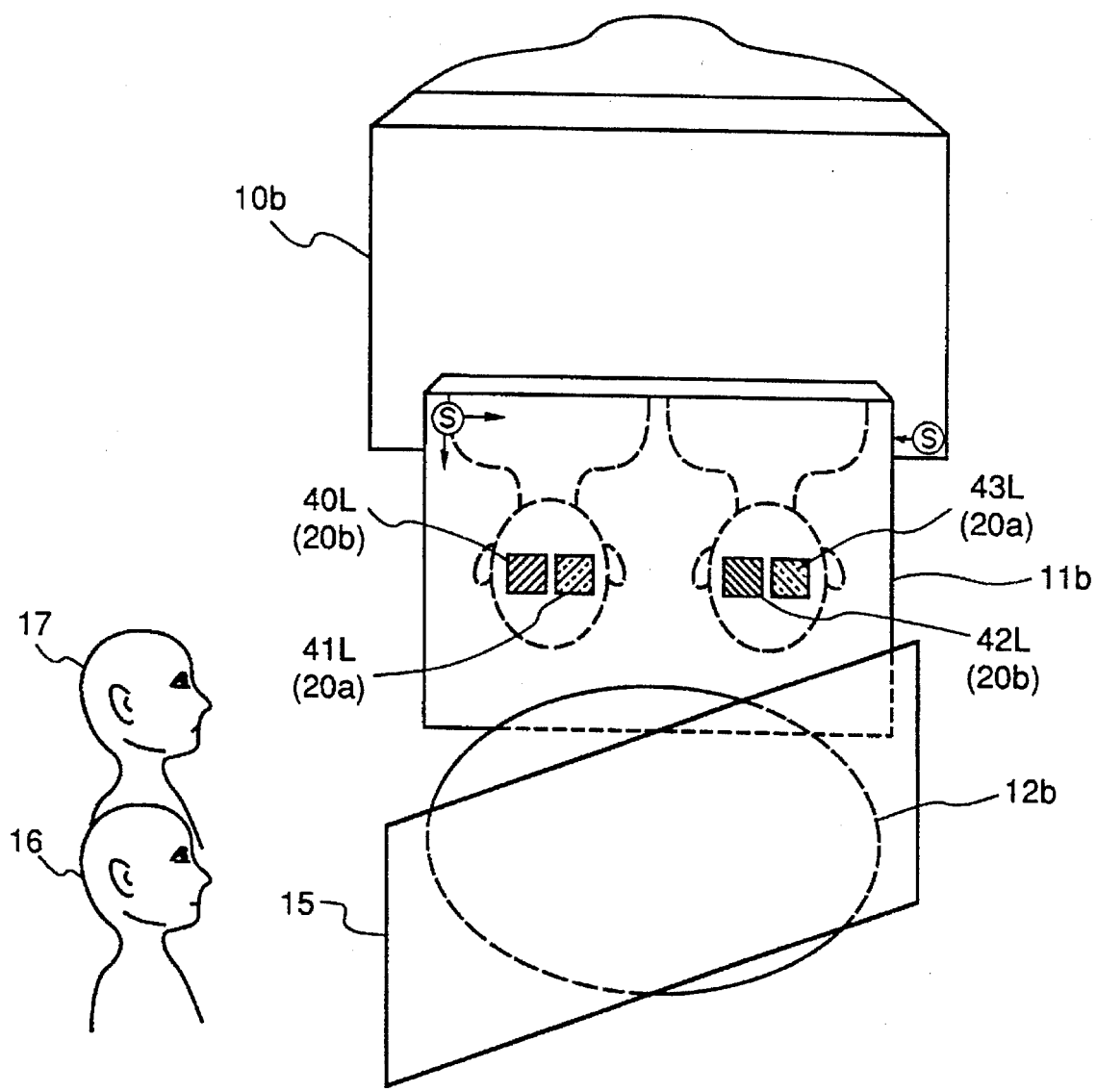
FIG. 8 illustrates an explanatory view of operation of the stereoscopic image display apparatus according to the first embodiment of the present invention.

FIG. 8 shows process in which the L screen images displayed on the color CRT 10b reach the viewers. The output from the camera 14b is inputted to the liquid crystal display 11b. As described above, on the liquid crystal display 11b, upside-down mirror images to the images picked up by the CCD camera 14b are displayed, thus the images, picked up by the CCD camera 14b, in the two areas 20b are displayed as images (areas) 40L and 42L on the liquid crystal display 11b. In other words, the CCD camera 14b is sensitive only to the light from the LED 13b, thus by the reflected images, picked up by the CCD camera 14b, right-to-left, the areas corresponding to the illuminated areas 20b become the areas 40L and 42L on the liquid crystal display 11b, as shown in FIG. 8.

Figure 9:
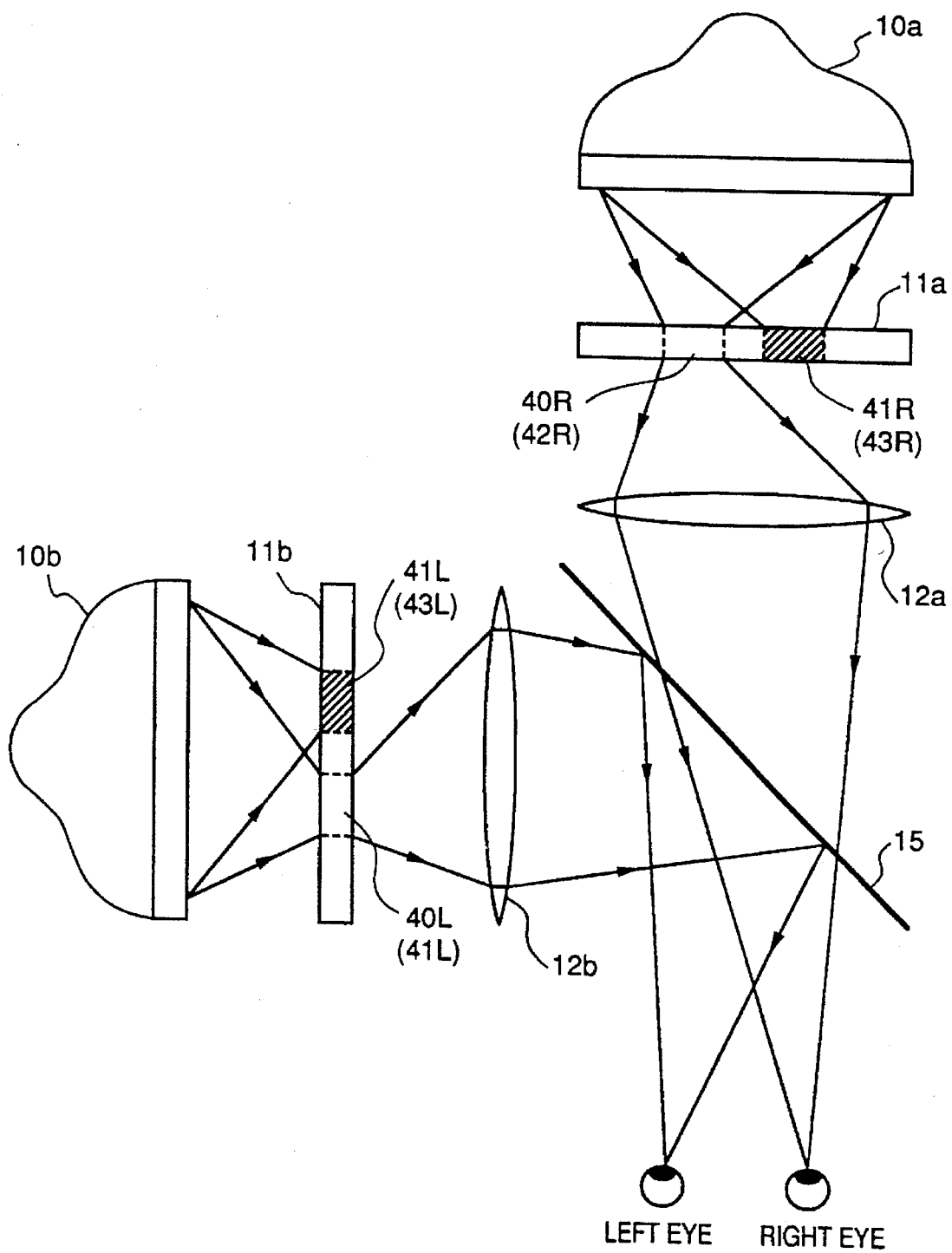
FIG. 9 illustrates an explanatory view of operation of the stereoscopic image display apparatus according to the first embodiment of the present invention.

FIG. 9 is a diagram explaining that the R screen images displayed on the color CRT 10a are transmitted through the light transmission area 40R of the liquid crystal display 11a, and condensed by the Fresnel lens 12a, transmitted through the half mirror 15, and reach the right eyes of the viewers. Since the 41R blocks light, the light which reaches the area 41R from the color CRT 10a is blocked. Therefore, the area 41R is at the position corresponding to the left eyes of the viewers, however, their left eyes can not see the images on the CRT 10a.

Similarly, as shown in FIG. 9, the L screen images displayed on the color CRT 10b are transmitted through the light transmission area 40L of the liquid crystal display 11b, and condensed by the Fresnel lens 12b, reflected by the half mirror 15, and reach the left eyes of the viewers. Since the 41L does not transmit light, the light which reaches the area 41L from the color CRT 10b is blocked. Therefore, the area 41L is at the position corresponding to the right eyes of the viewers, however, their right eyes can not see the images on the CRT 10b.

It should be noted that contrast of the liquid crystal displays 11a and 12b and iris diaphragms of the CCD cameras 14a and 14b should be adjusted so that the areas 20a and 20b displaying the faces and other areas have the clearest contrast between each other.

By changing the interference filters attached to the CCD cameras 14a and 14b, it is possible for the CCD camera 14a to pick up images in the only areas 20b and to display the images on the liquid crystal display 11a as light blocking figures, and for the CCD camera 114b to pick up images in the only areas 20a and to display the images on the liquid crystal display 11b as light blocking figures. In this case, the same object is achieved, in addition, the areas of the light blocking figures on the liquid crystal displays 11a and 11b are small, which enable to expand the areas from which the viewers can see the color display CRTs 10a and 10b, thus more preferable.

Next, functions of the Fresnel lenses 12a and 12b will be described with reference to FIG. 7. The Fresnel lens 12a is provided so that the viewers 16 and 17 are able to see the upside-down images of them displayed on the transmission type liquid crystal display 11a as virtual images. By setting the Fresnel lenses 12a and 12b at positions where the distance between the positions and the liquid crystal display 11a is farther than the focal distance of the Fresnel lens 12a, the images on the areas 40R (or 40L) on the liquid crystal display 11a (or 11b) are magnified, where the magnification ratio is limited according to the effective diameter of the Fresnel lens 12a, and the magnified R (or L) screen images are focused at the right (or left) eye of the viewer 16. Likewise, the images on the areas 42R (or 42L) of the liquid crystal display 11a (or 11b) are magnified, and the magnified R (or L) screen images are focused at the right (or left) eye of the viewer 17. Therefore, in a case where the areas 40 and 42 transmit light, they functions as a selective transmitting light control image for the right (or left) eyes of the viewers 16 and 17 within the range of the effective diameter of the Fresnel lens 12a (or 12b), and the viewers 16 and 17 can see the images displayed on the color CRT 10a (or 10b), provided behind the liquid crystal display 11a (or 11b), through the transmitting light control image on the liquid crystal display 11 as upside-down images. The magnification ratio of upside-down images can be set arbitrarily by choosing the distance between the Fresnel lens 12a (or 12b) and the color CRT 10a (or 10b) and the distance between the Fresnel lens 12a (or 12b) and the viewers 16 and 17. Regarding function of the light transmission figure, the area 40 is effective to the right eye of the viewer 16, and the are 42 is effective to the right eye of the viewer 17. At this time, the areas 41 and 43 are not in the state where the areas 41 and 43 transmit light through them, thus the left eyes of the viewers can not see the images on the color CRT 10a. The functions of the Fresnel lens 12b are the same as functions of the Fresnel lens 12a, as described above, and the images on the color CRT 10a can be seen by the left eyes of the viewers.

Therefore, when the areas 20a, displayed on the above-described liquid crystal display 11a shown in FIG. 4, of right half faces of the viewers 16 and 17 correspond to the areas 40 and 42 in FIG. 7, only the right eyes of the viewers 16 and 17 can see the images on the color CRT 10a. Similarly, when the areas 20b, displayed on the liquid crystal display 11b shown in FIG. 4, of left half faces of the viewers 16 and 17 correspond to the areas 41 and 43, only the left eyes of the viewers 16 and 17 can see the images on the color CRT 10b.

Note that the images on the liquid crystal display 11b are seen after reflected by the half mirror 15 as shown in FIG. 9. Thus, the half mirror 15 reflects the images, the images to be displayed on the liquid crystal display 11b should be inverted right-to-left in advance, namely, the images should be mirror images.

Figure 10:
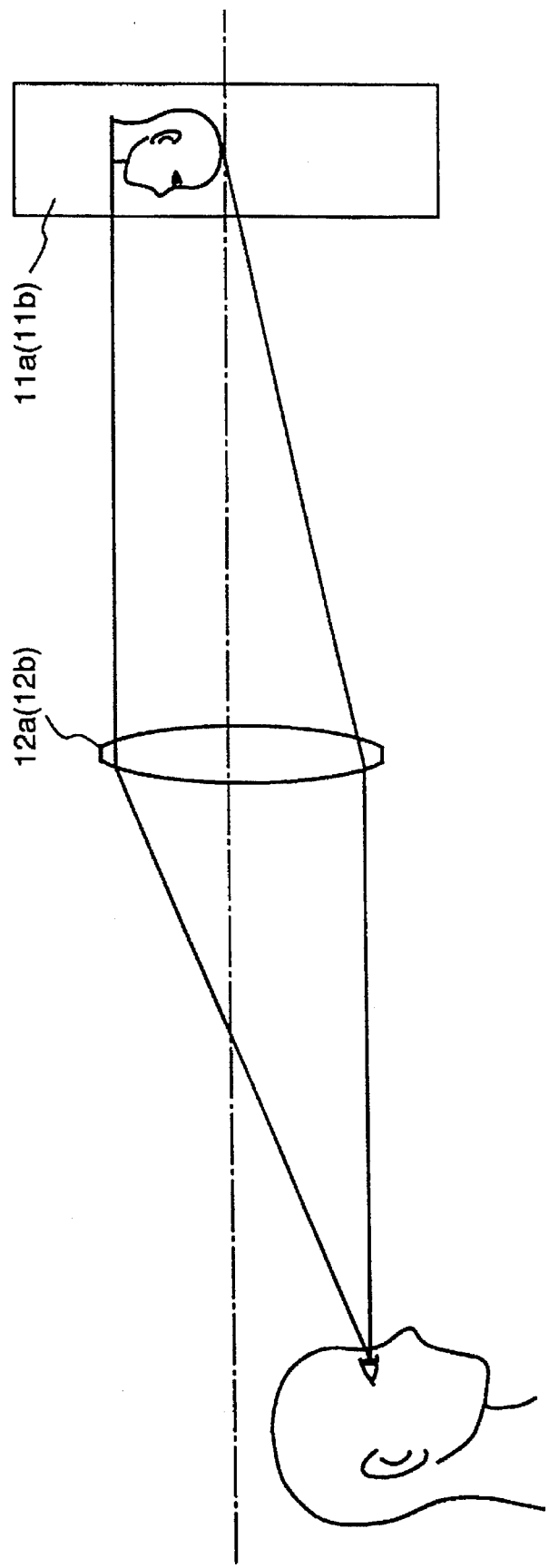
FIG. 10 illustrates an explanatory view of operation of the stereoscopic image display apparatus according to the first embodiment of the present invention.

FIG. 10 explains why the inversion of the images displayed on the liquid crystal display 11a (11b) is necessary. If inversion function is not implemented, when the viewer sits down, the light transmission image of the viewer goes downward, which results in that the image on the liquid crystal display 11a (11b) does not function as an light transmission image. In other words, when the viewer sits down the light transmission image should be moved upwardly in the liquid crystal display, while when he or she stands up the image should be moved downward. See FIG. 10. The liquid crystal display device 11a (11b) achieves the movement of the light transmission image by inverting image data in the vertical direction with respect to the display space of the device 11a (11b). The inversion in the vertical direction functions to move an image at a lower (or higher) position to a higher (to lower) position within the display area of the liquid crystal display 11a (11b). Inverting image data in the vertical direction may be performed simply by rotating to place the liquid crystal display 11 upside down.

The R screen image is input to the color CRT 10a with turned upside down, therefore also inverted right-to-left. Such turned R screen image is corrected by the lens 12a to enter the right eye of the viewer properly. The R transmission control image which is derived from the image of the right half face of the viewer is displayed in a left region of the LCD 11a without special inversion. As set forth with reference to FIG. 10, the control image of the right half face should be inverted upside down only.

The L screen image is input to the color CRT 10b with turned upside down and converted into mirror image. Such L screen image with turned upside down is made upright properly by the lens 12b, and then is inverted right-to-left by the mirror 15 to enter the left eye properly. The L transmission control image which is derived from the image of the left half face of the viewer is input to the LCD 11b so that it is displayed in a left region of the LCD 11b. The L transmission control image at the left position introduce the L screen image on the CRT 10b into the left eye properly by virtue of the lens 12b and the mirror 15. As set forth with reference to FIG. 10, the transmission control image of the left half face should be inverted upside down only and right-to-left.

According to the operation of the image display apparatus as described above, the R screen images displayed on the color CRT 10a shown in FIG. 3 can be seen by the right eyes of the viewers 16 and 17 through the liquid crystal display 11a, whereas the L screen images displayed on the color CRT 10b can be seen by the left eyes through the liquid crystal display 11a. Therefore, both the viewers 16 and 17 can see a pair of the R and L screen images simultaneously as to form stereoscopic images. Further, in a case where the viewers 16 and 17 move, they can see stereoscopic images as long as the illumination condition by the LED as shown in FIG. 4 is maintained.

It should be noted that, in the aforesaid embodiment, a color CRT is used as an image display device, however, it is not limited to this as long as the image display device can display stereoscopic images, and can be a liquid crystal display, for instance. Further, the minimum required function of the image display device is to display a moving picture as light emitting images, thus the image display device can have a flat or curved device (e.g., a film) where images are recorded and a device to display the images, instead of CRTs. Further, the liquid crystal display used as the spatial modulation element can be an electro-chromic display, for instance, as far as the device can transmit light and display figures. The LED used as an irradiation device can be replaced by a device capable of irradiating infrared light of two different wavelengths, e.g., a halogen lamp attached with a wavelength filter to limit the range of wavelength of light to be emitted. Further, a Fresnel lens is used as a lens, however, it can be replaced by an element as far as having orientation characteristics, e.g., a concave lens or a convex mirror.

The CRT's and LCD's are an electronic display. They are able to display inverted images the data of which are electronically inverted in longitudinal and right-to-left directions. The inversion can be made just by rotating the display body by 180 degrees.

Another example as to how to achieve displaying arrangement of screen images and control figures according to the first embodiment will be described below.

In FIG. 3, the display 11a, 11b, 10a, and 10b are indicated with a indicator "(s)". The indicator means a starting point of luster scanning on the respective displays. For example, the display 10a luster-scans from the lower right position in a right to left direction. Starting the luster scan at positions "(s)" which are lower right on the displays 10a, 10b means that the displays 10a, 10b are turned upside down, namely rotated by 180 degrees. Further, in FIG. 3, arrows mean the direction of inversion. For example, the arrow attached display 11a means that an electronic data inversion is made in the direction indicated by the arrow, namely in a vertical direction.

According to such indications, when data of screen image R are normally inputted to the display 10a, they displayed on the display 10a with inverted in the vertical and horizontal directions, because the display 10a is turned upside down. The display 10b is also turned upside down. Further, the data of screen image L are inputted to the display 10b with inverted right-to-left, as the display 10b is attached with an arrow indicating right-to-left inversion. Therefore, the screen image L is seen as inverted only in the vertical direction on the display 10b.

As "(s)" indicator is put at the upper left position on the display 11a, the display 11a for the control figure is set upright. Therefore, the right portion of the control figure is displayed at a relatively left region on the display 11. The arrow attached to the display 11a means that the data of the control figure R are inputted to the display 11a with electronically inverted in the vertical direction. The display 11b is inputted with the data of left control figure which are electronically inverted vertical and right-to-left directions. Therefore, the control figures R and L allows to maintain a stereoscopic vision for the right and left eyes even when the viewer moves in the vertical direction.

<Second Embodiment>

Figure 11:
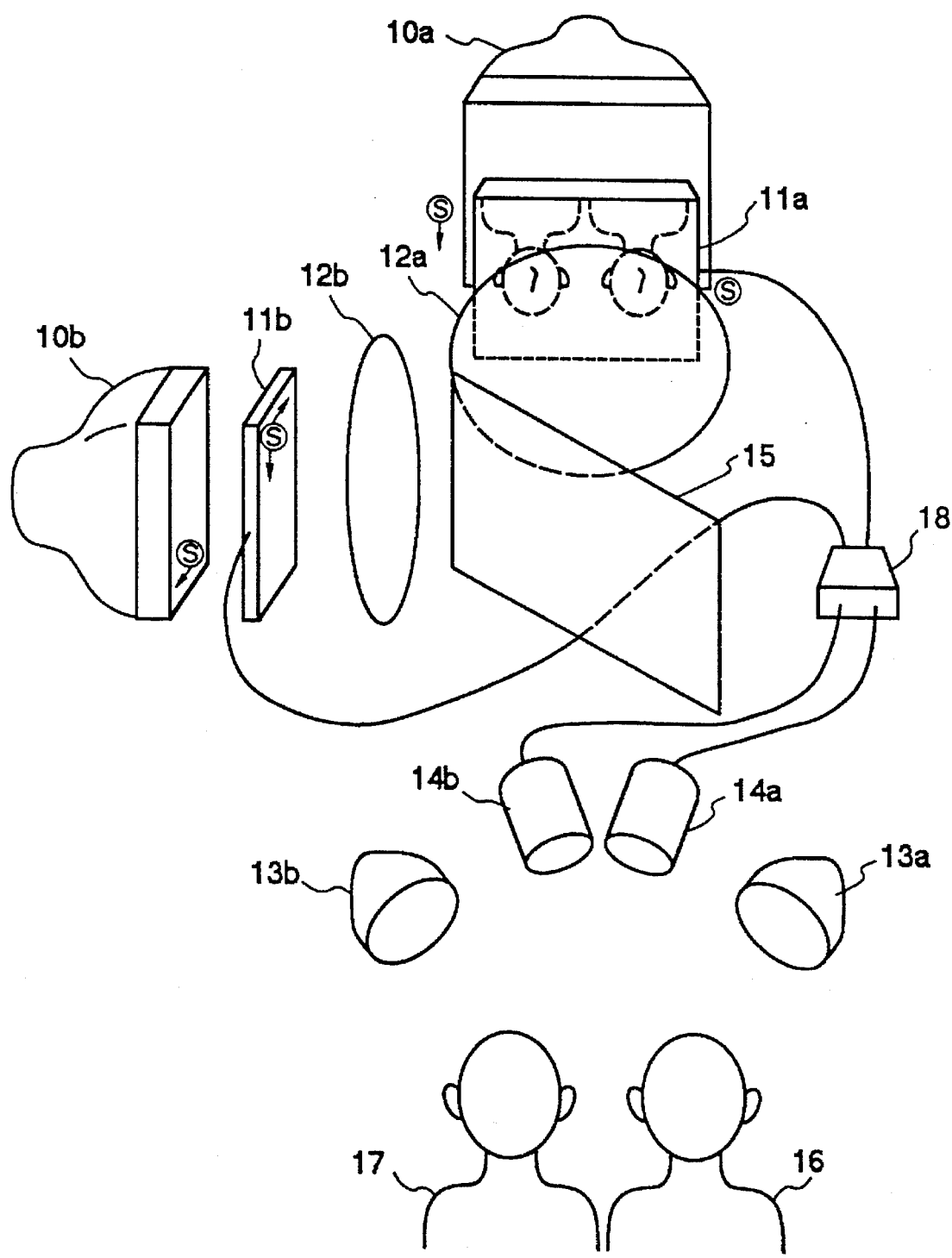
FIG. 11 illustrates a configuration of a stereoscopic image display apparatus according to a second embodiment of the present invention.

FIG. 11 illustrates a configuration of a stereoscopic image display apparatus according to a second embodiment of the present invention. Similar to the previous embodiments, in the apparatus according to the present embodiment comprises a plurality of displays. The displays are set "normally" unless otherwise specified.

The feature of the second embodiment is that undesired background images in the images including viewers are eliminated by applying subtraction process.

In FIG. 11, reference numerals 10a and 10b denote color CRTs as image display devices; 11a and 11b, transmission type liquid crystal displays functioning as spatial modulation devices each of which is provided between the color CRT 10a or 10b and viewers; and 12a and 12b, Fresnel lenses having a focal distance of 150 mm. Each Fresnel lens is placed at the distance which is farther than the focal distance of the Fresnel lenses 12a and 12b from the liquid crystal display 11a or 11b, 160 mm, for instance. Further, reference numerals 13a and 13b denote LEDs which emit light having wavelengths of 850 nm and 950 nm, respectively, and function as irradiation devices; 14a and 14b, monochrome CCD cameras which serve as image sensing devices; 15, a half mirror for combining images displayed on the color CRTs 10a and 10b; 16 and 17, viewers who see stereoscopic images; and 18, a subtracting device which operates the subtraction process between the two kinds of images.

The operation of the stereoscopic image display apparatus constructed as above is basically the same as the one described in accordance with the first embodiment of the present invention with reference to FIG. 3, thus the same elements, devices, and the like, in this embodiment as in the first embodiment are referred by the same reference numerals, and the description of them are omitted, and only different elements, devices, and the like, will be explained. The image signals selectively picked up by the CCD cameras 14a and 14b are inputted into the subtracting device 18, and after processed with the subtraction process, then outputted to the transmission type liquid crystal displays 11a and 11b.

By performing subtraction process in the subtracting device 18, common portions of the two images taken by the cameras 14a and 14b are eliminated, thus the portions which are not necessary for displaying the stereoscopic image are eliminated.

FIG. 11 also illustrates another method to achive the above described inversions of the screen images and control figures in the second embodiment. The meaning of "(s)" and "→" is the same as the first embodiment.

<Third Embodiment>

Figure 12:
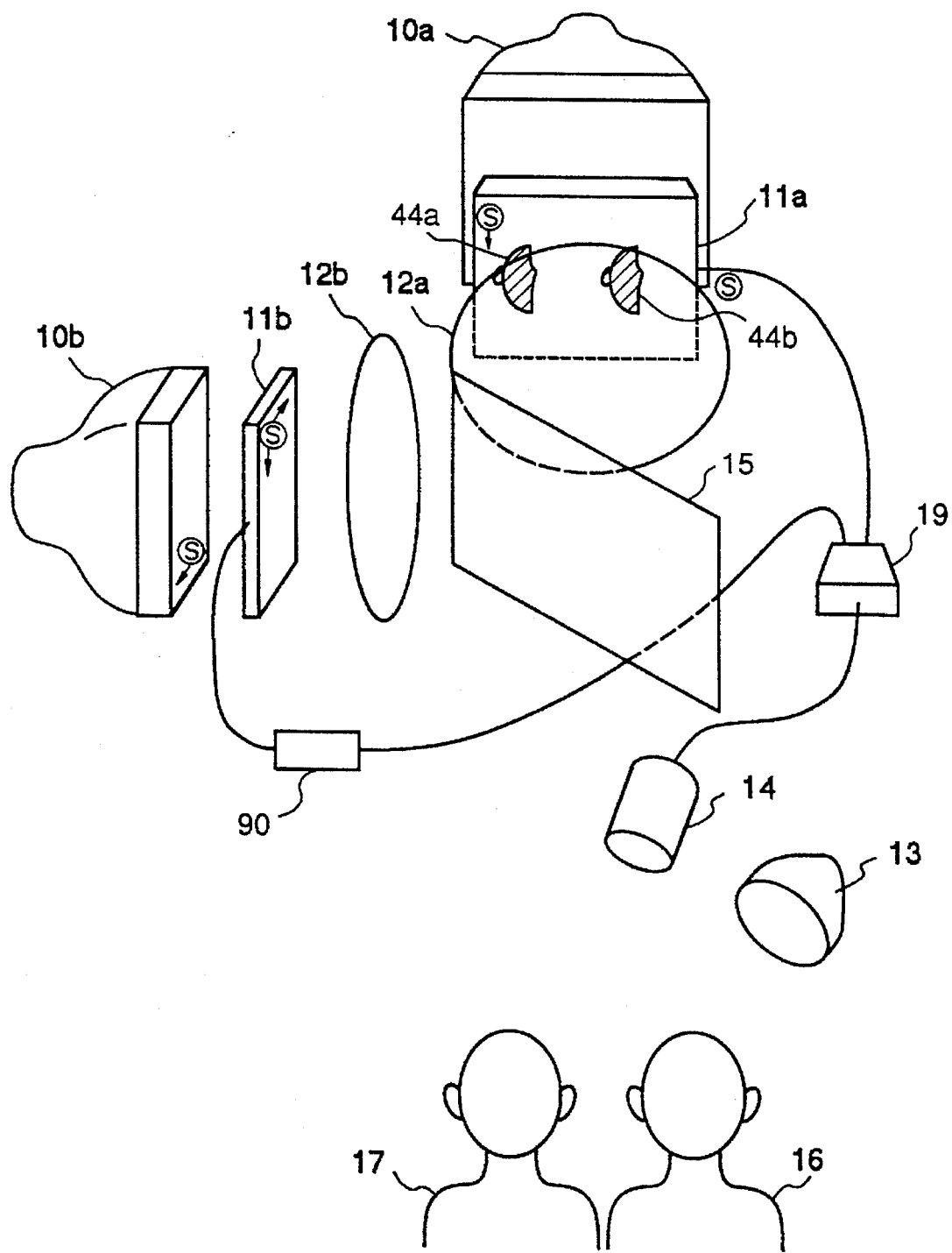
FIG. 12 illustrates a configuration of a stereoscopic image display apparatus according to a third embodiment of the present invention.

FIG. 12 shows a configuration of a stereoscopic image display apparatus according to the third embodiment of the present invention. Similar to the previous embodiments, in the apparatus according to the present embodiment comprises a plurality of displays. The displays are set "normally" unless otherwise specified.

The feature of the third embodiment is that a light transmission image is produced from a single image taken by a single camera.

In FIG. 12, reference numerals 10a and 10b denote color CRTs as a first and a second image display devices; 11a and 11b, transmission type liquid crystal displays functioning as a first and a second spatial modulation devices each of which is provided between the color CRT 10a or 10b and viewers; and 12a and 12b, Fresnel lenses having a focal distance of 150 mm. Each Fresnel lens is placed at the distance which is farther than the focal distance of the Fresnel lenses 12a and 12b from the liquid crystal display 11a or 11b, 160 mm, for instance. Further, reference numerals 13 denotes a LED which emits light having wavelengths of 850 nm, and functions as an irradiation device; 14, a monochrome CCD camera which serves as an image sensing device; 15, a half mirror for combining images displayed on the color CRTs 10a and 10b; 16 and 17, viewers who see stereoscopic images; 19, a signal divider; and 90, a negative-positive inversion circuit.

Since the LED 13 illuminates on the right side of the viewers, the CCD camera 14 picks up images of right half faces of the viewers. Accordingly, the images 44a and 44b, displayed on the transmission type liquid crystal display 11a, are images of the right half faces of the viewers, and function as light transmission images on the display 11a.

The operation of the stereoscopic image display apparatus constructed as above is basically the same as the one described in accordance with the first embodiment of the present invention with reference to FIG. 3, thus the same elements, devices, and the like, in this embodiment as in the first embodiment are referred by the same reference numerals, and the description of them are omitted, and only different elements, devices, and the like, will be explained.

The signals representing the images of the right half faces of the viewers 16 and 17 taken by the monochrome CCD camera 14 are divided into two groups by the signal divider 19, and the one group of the signals is inputted into the transmission type liquid crystal display 11a and displayed as the images 44a and 44b. Whereas, the other group of the signals is inputted into the negative-positive inversion circuit 90 then into the transmission type liquid crystal display 11b, thus the portions except the images 44a and 44b are displayed as figures on the transmission type liquid crystal display 11b. The hatched areas have light transmitting characteristics.

The characteristics of the third embodiment is that a single light and a single camera, not plural, are necessary.

The third embodiment will be further described in detail. The images of the right half faces of the viewers taken by the camera 14 are sent to the negative-positive inversion circuit 90, then negative-positive inverted. In other words, when the resolution of the image sensing element 32 of the camera 14 is 8 bits, the density of the image signals outputted by the image sensing element 32 is in the range between 0 and 255. The negative-positive conversion in the negative-positive conversion circuit 90 is an operation to find complement value of an image signal density value transmitted from the camera 14. For example, if the density value is "30", then a complement value of the density which is "negative-positive inverted" is "225".

Figure 13:
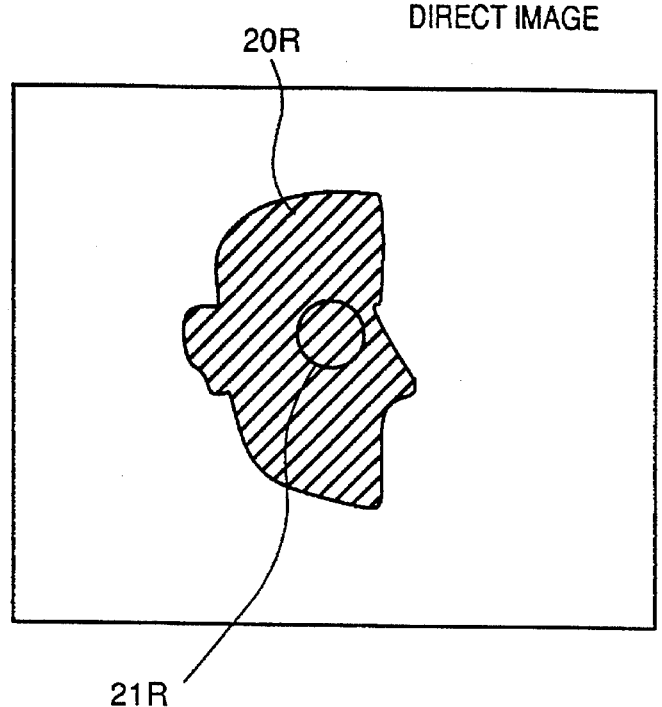
FIG. 13 illustrates a diagram explaining process of generating a light transmission figure, and the like, according to the third embodiment of the present invention.
Figure 14:
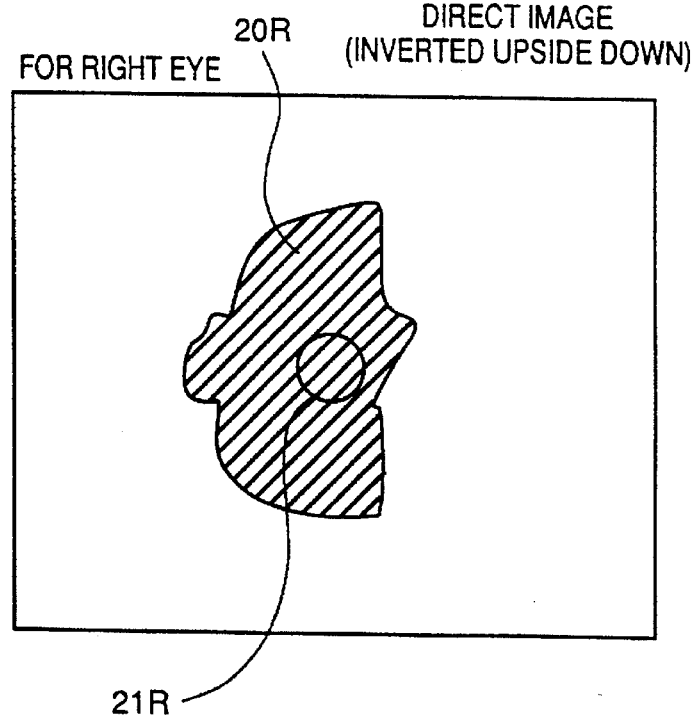
FIG. 14 illustrates a diagram explaining process of generating a light transmission figure, and the like, according to the third embodiment of the present invention.
Figure 15:
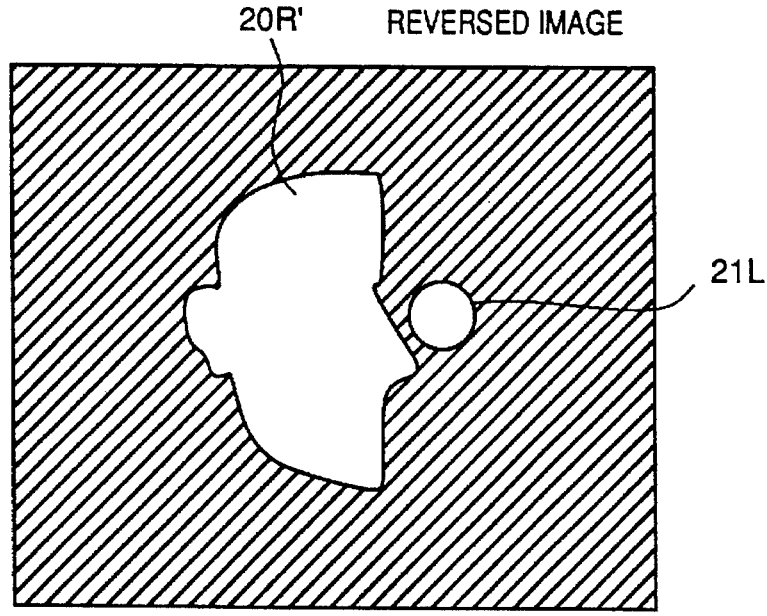
FIG. 15 illustrates a diagram explaining process of generating a light transmission figure, and the like, according to the third embodiment of the present invention.

FIG. 13 shows the illuminated portion, 20R, of the viewer 16's face taken by the camera 14. (For convenience, an image directly taken by a camera is called, "direct image".) FIG. 14 shows an inverted upside-down image of the image in FIG. 13. The image in FIG. 14 is shown on the liquid crystal display 11a, and functions as the light transmission image for the right eye. For the sake of simplicity, images of the viewer 17 are not shown in FIGS. 13 and 14. In FIGS. 13 and 14, white portions indicates dark areas which are not illuminated by the LED 13 (areas of high density). FIG. 15 shows a negative-positive inverted image of the direct image shown in FIG. 13. In FIG. 15, white portion 20R' is dark area (area of high density) where the illuminated area 20R in FIG. 3 is negative-positive inverted.

Figure 16:
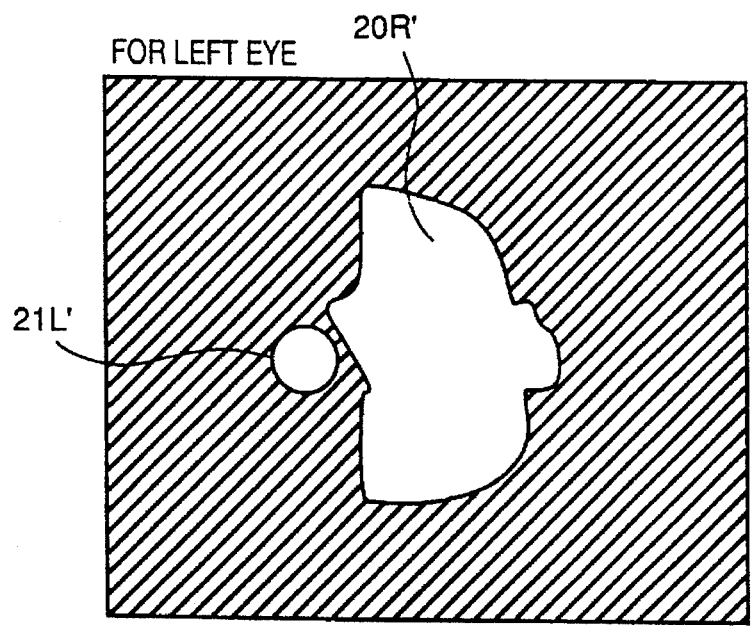
FIG. 16 illustrates a diagram explaining process of generating a light transmission figure, and the like, according to the third embodiment of the present invention.

In FIG. 13, an area 21R indicates a part of the illuminated area 20R in the direct image. In FIG. 15, an area 21L indicates a part of the illuminated area in the inverted image. FIG. 16 is an image obtained by turning the image in FIG. 15 upside-down. The illuminated light transmission area 21L, located on the right side in FIG. 15, is moved to the left side in FIG. 16.

The area 21R in FIG. 14 functions as a light transmission image for the right eye, and the area 21L' in FIG. 16 functions as a light transmission image for the left eye.

It should be noted that luminance and contrast of the liquid crystal displays 11a and 11b and iris diaphragm of the CCD camera 14 should be adjusted so that the areas corresponding to faces are displayed by the white and high luminance.

Next, functions of the Fresnel lenses 12a and 12b will be described with reference to FIG. 7. The Fresnel lens 12a is provided so that the viewers 16 and 17 are able to see the upside-down images of them displayed on the transmission type liquid crystal display 11a as virtual images. By setting the Fresnel lenses 12a and 12b at positions where the distance between the positions and the liquid crystal display 11a is farther than the focal distance of the Fresnel lens 12a, the images on the areas 40R (or 40L) on the liquid crystal display 11a (or 11b) are magnified, where the magnification ratio is limited according to the effective diameter of the Fresnel lens 12a, and the magnified R (or L) screen images are focused at the right (or left) eye of the viewer 16. Likewise, the images on the areas 42R (or 42L) of the liquid crystal display 11a (or 11b) are magnified, and the magnified R (or L) screen images are focused at the right (or left) eye of the viewer 17. Therefore, in a case where the areas 40 and 42 transmit light, they functions as a selective transmitting light control image for the right (or left) eyes of the viewers 16 and 17 within the range of the effective diameter of the Fresnel lens 12a (or 12b), and the viewers 16 and 17 can see the images displayed on the color CRT 10a (or 10b), provided behind the liquid crystal display 11a (or 11b), through the transmitting light control image on the liquid crystal display 11 as upside-down images. The magnification ratio of upside-down images can be set arbitrarily by choosing the distance between the Fresnel lens 12a (or 12b) and the color CRT 10a (or 10b) and the distance between the Fresnel lens 12a (or 12b) and the viewers 16 and 17. Regarding function of the light transmission figure, the area 40 is effective to the right eye of the viewer 16, and the are 42 is effective to the right eye of the viewer 17. At this time, the areas 41 and 43 are not in the state where the areas 41 and 43 transmit light through them, thus the left eyes of the viewers can not see the images on the color CRT 10a. The functions of the Fresnel lens 12b are the same as functions of the Fresnel lens 12a, as described above, and the images on the color CRT 10a can be seen by the left eyes of the viewers.

Displaying arrangement of screen images on the displays according to the third embodiment will be explained below.

The R and L screen image are input to the color CRTs 10a, 10b in the same manner as in the first embodiment, namely with turned upside down, therefore inverted right-to-left. The functions of the lenses 12a, 12b and the mirror 15 are the same as those of the first embodiment.

FIG. 12 also illustrates another method to achive the above described inversions of the screen images and control figures in the third embodiment. The meaning of "Ⓢ" and "→" is the same as the first embodiment.

<Fourth Embodiment>

Figure 17:
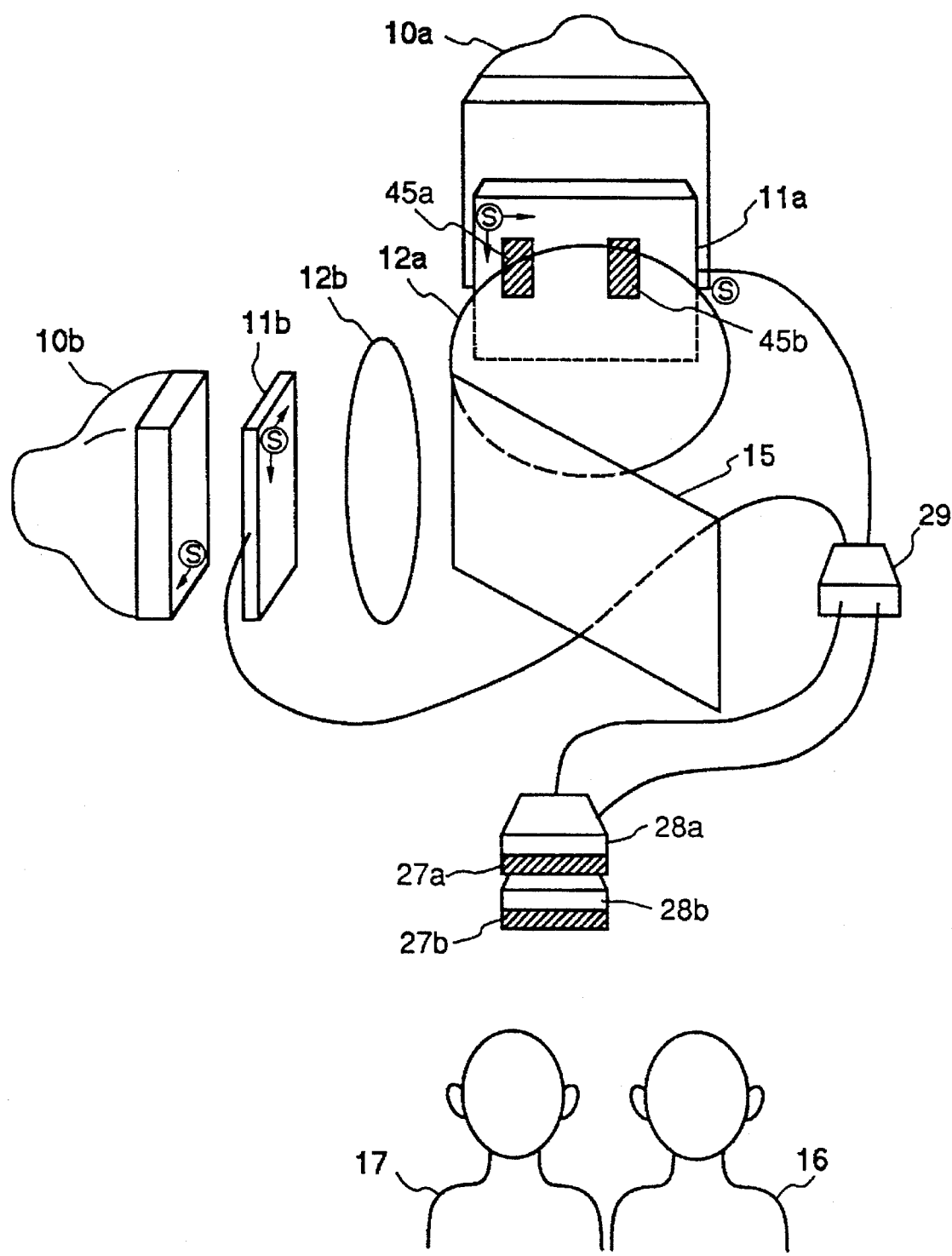
FIG. 17 illustrates a configuration of a stereoscopic image display apparatus according to a fourth embodiment of the present invention.

FIG. 17 shows a configuration of a stereoscopic image display apparatus according to a fourth embodiment of the present invention. Similar to the previous embodiments, in the apparatus according to the present embodiment comprises a plurality of displays. The displays are set "normally" unless otherwise specified.

The feature of the fourth embodiment is that positions of viewers are detected by using ultrasonic.

In FIG. 17, reference numerals 10a and 10b denote color CRTs as image display devices; 11a and 11b, transmission type liquid crystal displays functioning as spatial modulation devices each of which is provided between the color CRT 10a or 10b and viewers; and 12a and 12b, Fresnel lenses having a focal distance of 150 mm. Each Fresnel lens is placed at the distance which is farther than the focal distance of the Fresnel lenses 12a and 12b from the liquid crystal display 11a or 11b, 160 mm, for instance. Reference numerals 16 and 17 denote viewers who see stereoscopic images; and 27a and 27b, ultrasonic emitters which emit ultrasonic having frequencies of 100 kHz and 120 kHz against the viewer 16 and 17, respectively. Further, ultrasonic detectors 28a and 28b selectively detect ultrasonic emitted by the ultrasonic emitters 27a and 27b. Reference numeral 15 denotes a half mirror for combining images displayed on the color CRTs 10a and 10b; 29, an image output device; and 45a and 45b, figures displayed on the transmission type liquid crystal display 11a at positions corresponding to right half faces of the viewers 16 and 17, and the figures have light transmitting characteristics.

The operation of the stereoscopic image display apparatus constructed as above is basically the same as the one described in accordance with the first embodiment of the present invention with reference to FIG. 3, thus the same elements, devices, and the like, in this embodiment as in the first embodiment are referred by the same reference numerals, and the description of them are omitted, and only different elements, devices, and the like, will be explained.

The ultrasonic of two different frequencies emitted from the ultrasonic emitters 27a and 27b are reflected by the viewers 16 and 17, and respectively detected by the ultrasonic detectors 28a and 28b. The image output device 29 calculates positions corresponding to the right and left half faces of the viewers on the transmission type liquid crystal displays 11a and 11b from the detected ultrasonic signals, then predetermined figures through which R and L screen image are respectively transmitted for the right and left eyes (referred as "R" or "L transmitting light control figures", hereinafter) are outputted and displayed at the calculated positions on the transmission type liquid crystal displays 11a and 11b.

Figure 18:
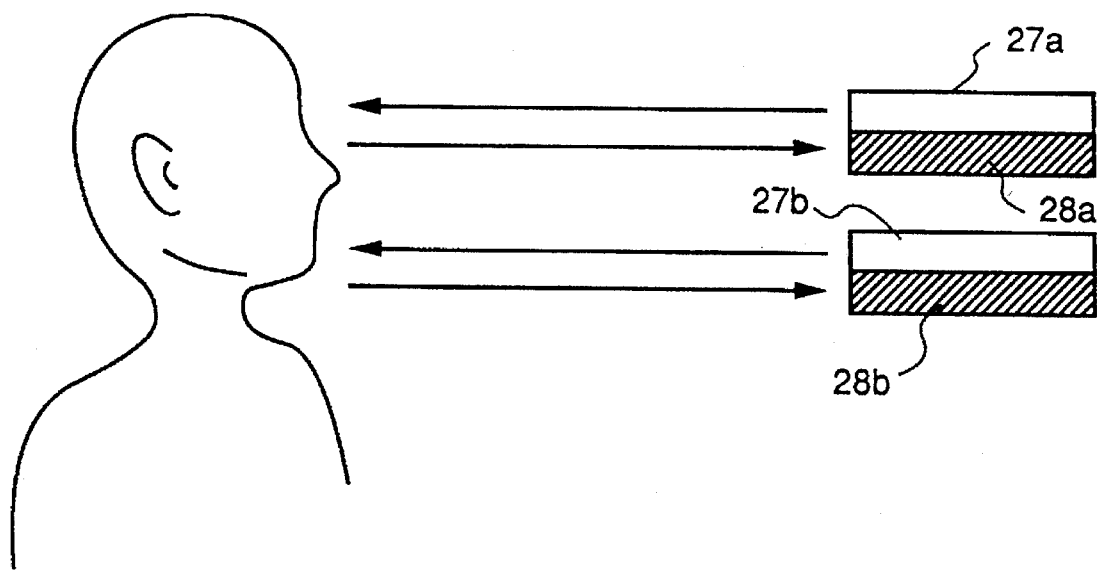
FIG. 18 illustrates an explanatory view of operation of the stereoscopic image display apparatus according to the fourth embodiment of the present invention.

The operations of the fourth embodiment will be further described in detail with reference to FIG. 18.

The ultrasonic of two different frequencies emitted from the ultrasonic emitters 27a and 27b is reflected by the viewers 16 and 17, and respectively detected by the ultrasonic detectors 28a and 28b. In FIG. 18, the emitter 27a continuously emits ultrasonic in the horizontal direction, and the ultrasonic which is reflected by the viewers' faces is detected by the detector 28a as horizontal cross sectional information. Likewise, the emitter 27b, provided below the emitter 27a, continuously emits ultrasonic in the horizontal direction, and the ultrasonic which is reflected by the viewers' faces is detected by the detector 28b.

The ultrasonic emitters 27a and 27b emit ultrasonic in order to scan in the horizontal direction. Then the ultrasonic of two different frequencies, separated in the vertical direction, emitted by the emitter 27a and 27b are reflected by the observers in the scanning line, and the reflected ultrasonic is respectively detected by the detectors 28a and 28b. Thereby, it is possible to investigate the positions of the viewers' faces by analyzing the echoed signals of ultrasonic.

The output from the ultrasonic detectors 28a and 28b is inputted to the image output device 29 connected to the ultrasonic detectors. The image output device 29 calculates the position of the viewers' faces in accordance with the echoed signals from the detectors 28a and 28b, then outputs and display the predetermined R and L figures on the liquid crystal displays 11a and 11b in accordance with the calculated position of the faces.

Displaying arrangement of screen images and control figures on the displays according to the fourth embodiment will be explained below.

The R and L screen image are input to the color CRTs 10a, 10b in the same manner as in the first embodiment, namely with turned upside down, therefore also inverted right-to-left. The functions of the lenses 12a, 12b and the mirror 15 are the same as those of the first embodiment. As described above, the R control image for the right eye is displayed in a relatively left region of the display 11a. The L control image for the left eye is displayed in a relatively left region of the display 11b. In other words, the control image displayed on the display 11b for left eye is identical with that of on display 11a for right eye. This is because the control figures for right and left eyes according to the fourth embodiment are generated based upon detected position of viewer's face by the ultrasonic detectors.

According to the fourth embodiment, it is easy to process so as not to display portions other than portions corresponding to the viewers' faces, thus crosstalk of left (right) and right (left) images which are slightly recognized by right (left) and left (right) eyes, respectively, because of external scattered light, does not occur.

FIG. 17 also illustrates another method to achive the above described inversions of the screen images and control figures in the fourth embodiment. The meaning of "ⓢ" and "→" is the same as the first embodiment.

<Fifth Embodiment>

Figure 19:
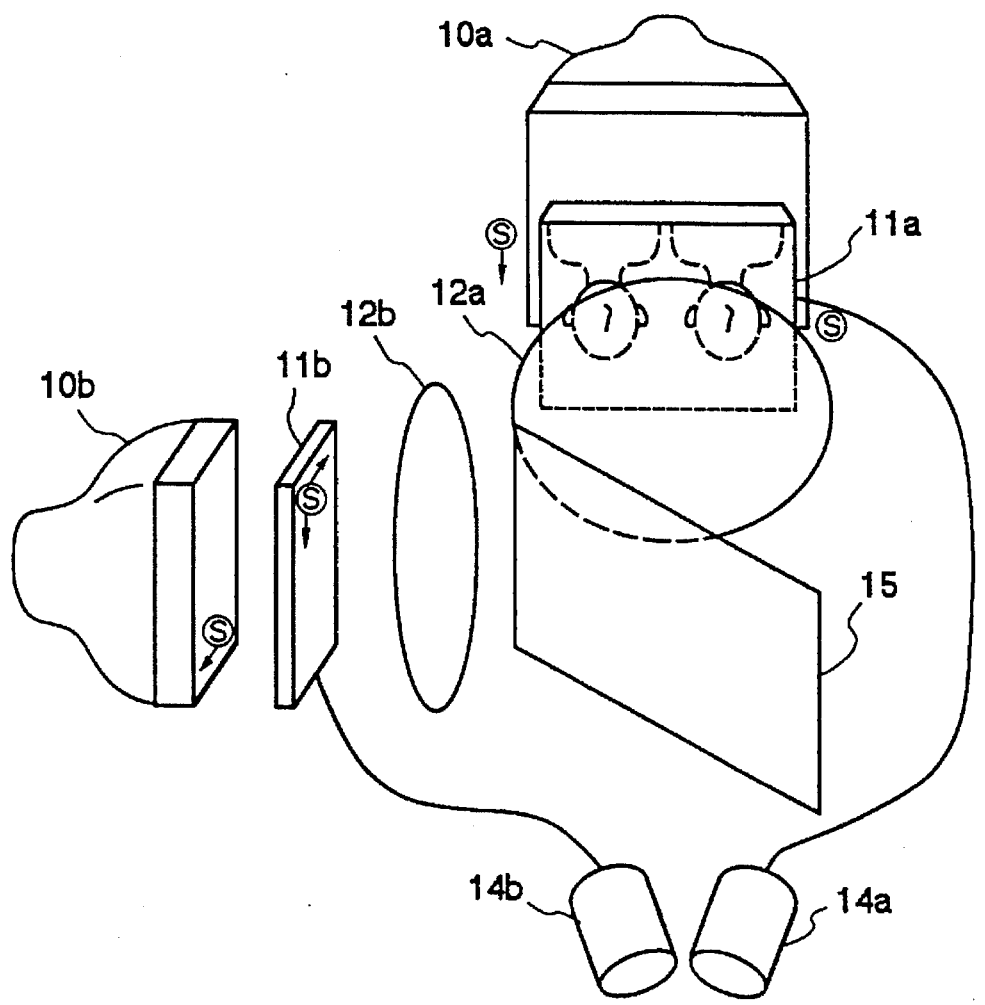
FIG. 19 illustrates a configuration of a stereoscopic image display apparatus according to a fifth embodiment of the present invention.
Figure 19:
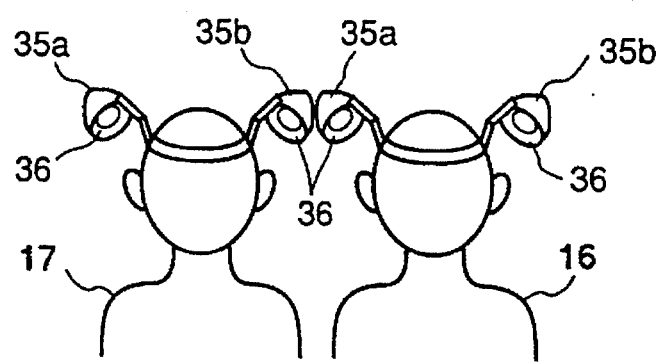

FIG. 19 illustrates a configuration of a stereoscopic image display apparatus according to a fifth embodiment of the present invention. Similar to the previous embodiments, in the apparatus according to the present embodiment comprises a plurality of displays. The displays are set "normally" unless otherwise specified.

The characteristics of the fifth embodiment is that light sources are fixed on the head of viewers so that the correct position of the viewers' faces can be measured.

In FIG. 19, reference numerals 10a and 10b denote color CRTs as image display devices; 11a and 11b, transmission type liquid crystal displays functioning as spatial modulation devices each of which is provided between the color CRT 10a or 10b and viewers; and 12a and 12b, Fresnel lenses having a focal distance of 150 mm. Each Fresnel lens is placed at the distance which is farther than the focal distance of the Fresnel lenses 12a and 12b from the liquid crystal display 11a or 11b, 160 mm, for instance.

Further, reference numerals 35a and 35b denote LEDs, provided on each head of the viewers 16 and 17 with head bands, which emit light having wavelengths of 850 nm and 950 nm, respectively, and function as irradiation devices. The LEDs 35a and 35b have blocking covers. Reference numerals 14a and 14b denote monochrome CCD cameras which serve as image sensing devices; 15, a half mirror for combining images displayed on the color CRTs 10a and 10b; and 16 and 17, viewers who see stereoscopic images.

The operation of the stereoscopic image display apparatus constructed as above is basically the same as the one described in accordance with the first embodiment of the present invention with reference to FIG. 3, thus the same elements, devices, and the like, in this embodiment as in the first embodiment are referred by the same reference numerals, and the description of them are omitted, and only different elements, devices, and the like, will be explained.

The LEDs 35 are provided on each head of the viewers 16 and 17, thus light emitted from each LED 35 certainly illuminates right or left sides of viewers. Further, differing from the case described in the first embodiment, the relative positions of the LEDs and the viewers do not change, thus the viewers can move freely. The blocking cover 36 is to prevent the light of the LED from illuminating another viewer next to the viewer wearing the LED.

Displaying arrangement of screen images on the displays according to the fifth embodiment will be explained below.

The R and L screen image are input to the color CRTs 10a, 10b in the same manner as in the first embodiment, namely with turned upside down, therefore also inverted right-to-left. The functions of the lenses 12a, 12b and the mirror 15 are the same as those of the first embodiment.

FIG. 19 also illustrates another method to achive the above described inversions of the screen images and control figures in the fifth embodiment. The meaning of "Ⓢ" and "→" is the same as the first embodiment.

<Sixth Embodiment>

Figure 20:
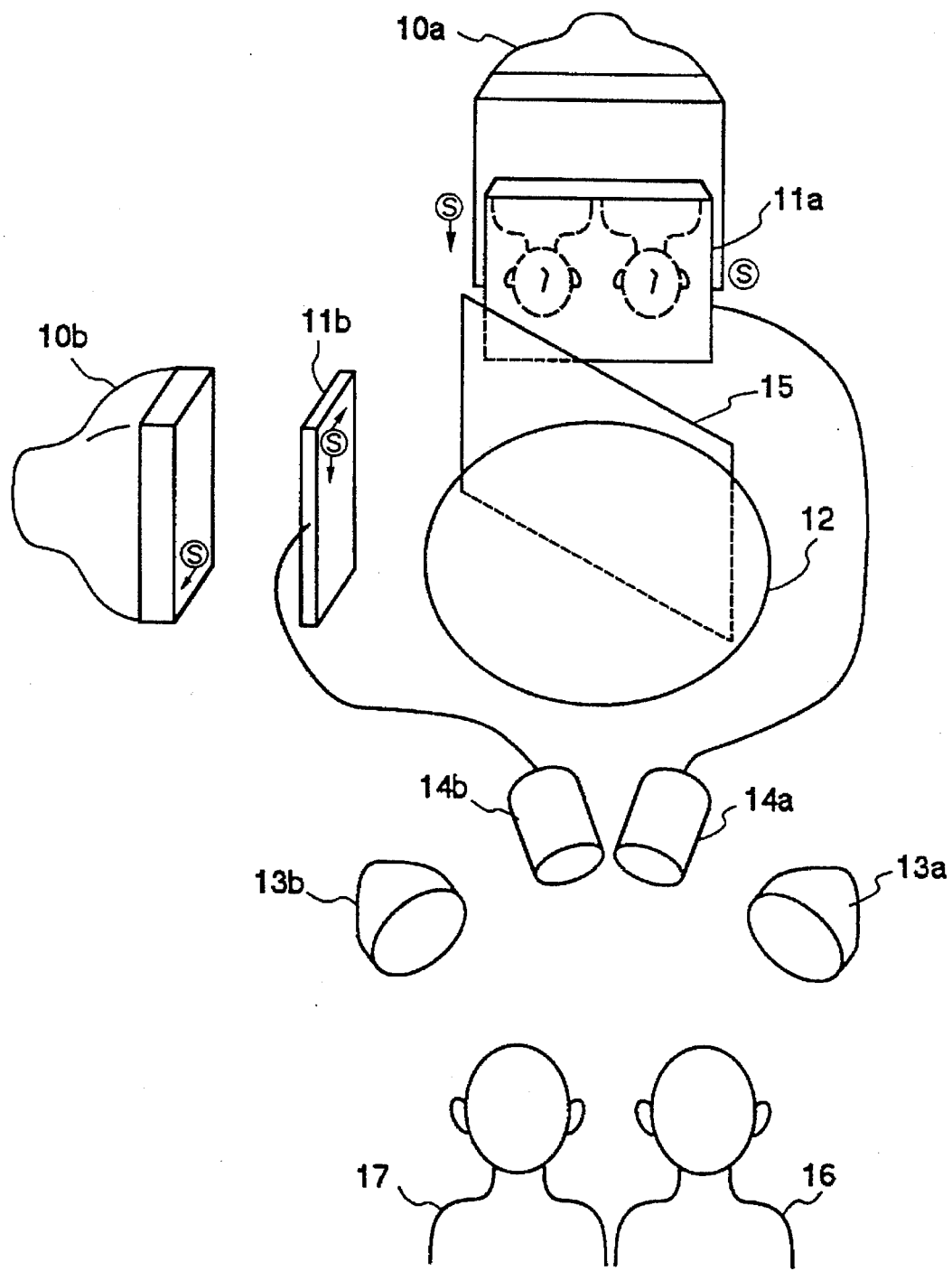
FIG. 20 illustrates a configuration of a stereoscopic image display apparatus according to a sixth embodiment of the present invention.

FIG. 20 illustrates a configuration of a stereoscopic image display apparatus according to a sixth embodiment of the present invention. Similar to the previous embodiments, in the apparatus according to the present embodiment comprises a plurality of displays. The displays are set "normally" unless otherwise specified.

In FIG. 20, reference numerals 10a and 10b denote color CRTs as image display devices; 11a and 11b, transmission type liquid crystal displays functioning as spatial modulation devices each of which is provided between the color CRT 10a or 10b and viewers; and 12, Fresnel lens having a focal distance of 240 mm. The Fresnel lens is placed on its optical axis at the distance which is farther than the focal distance of the Fresnel lens 12 from the liquid crystal displays 11a and 11b, 280 mm, for instance. Further, reference numerals 13a and 13b denote LEDs which emit light having wavelengths of 850 nm and 950 nm, respectively, and function as irradiation devices; 14a and 14b, monochrome CCD cameras which serve as image sensing devices; 15, a half mirror for combining images displayed on the color CRTs 10a and 10b provided on the optical axes of the Fresnel lens 12 between the transmission type liquid crystal displays 11a and 11b and the Fresnel lens 12; and 16 and 17, viewers who see stereoscopic images.

The operation of the stereoscopic image display apparatus constructed as above is basically the same as the one described in accordance with the first embodiment of the present invention with reference to FIG. 3, thus the same elements, devices, and the like, in this embodiment as in the first embodiment are referred by the same reference numerals, and the description of them are omitted, and only different elements, devices, and the like, will be explained.

In the sixth embodiment, a pair of screen images displayed on the color CRTs 10a and 10b are combined by the half mirror 15, first, then seen by the viewers through the Fresnel lens 12. Accordingly, the images can be magnified to the effective diameter of the Fresnel lens 12 without limited by the size of the half mirror 15.

Displaying arrangement of screen images on the displays according to the sixth embodiment will be explained below.

The sixth embodiment has a single lens 12, while the first embodiment includes a couple of lenses 12a, 12b. However, the functions of the lense 12 and the mirror 15 of the sixth embodiment are the same as those of the first embodiment. Therefore, the R and L screen image are input to the color CRTs 10a, 10b in the same manner as in the first embodiment, namely with turned upside down, therefore also inverted right-to-left. The control images on the display 11a, 11b are displayed in the same manner as in the first embodiment.

FIG. 20 also illustrates another method to achive the above described inversions of the screen images and control figures in the sixth embodiment. The meaning of "Ⓢ" and "→" is the same as the first embodiment.

The feature of the sixth embodiment is that a single lens is necessary.

<Seventh Embodiment>

Figure 21:
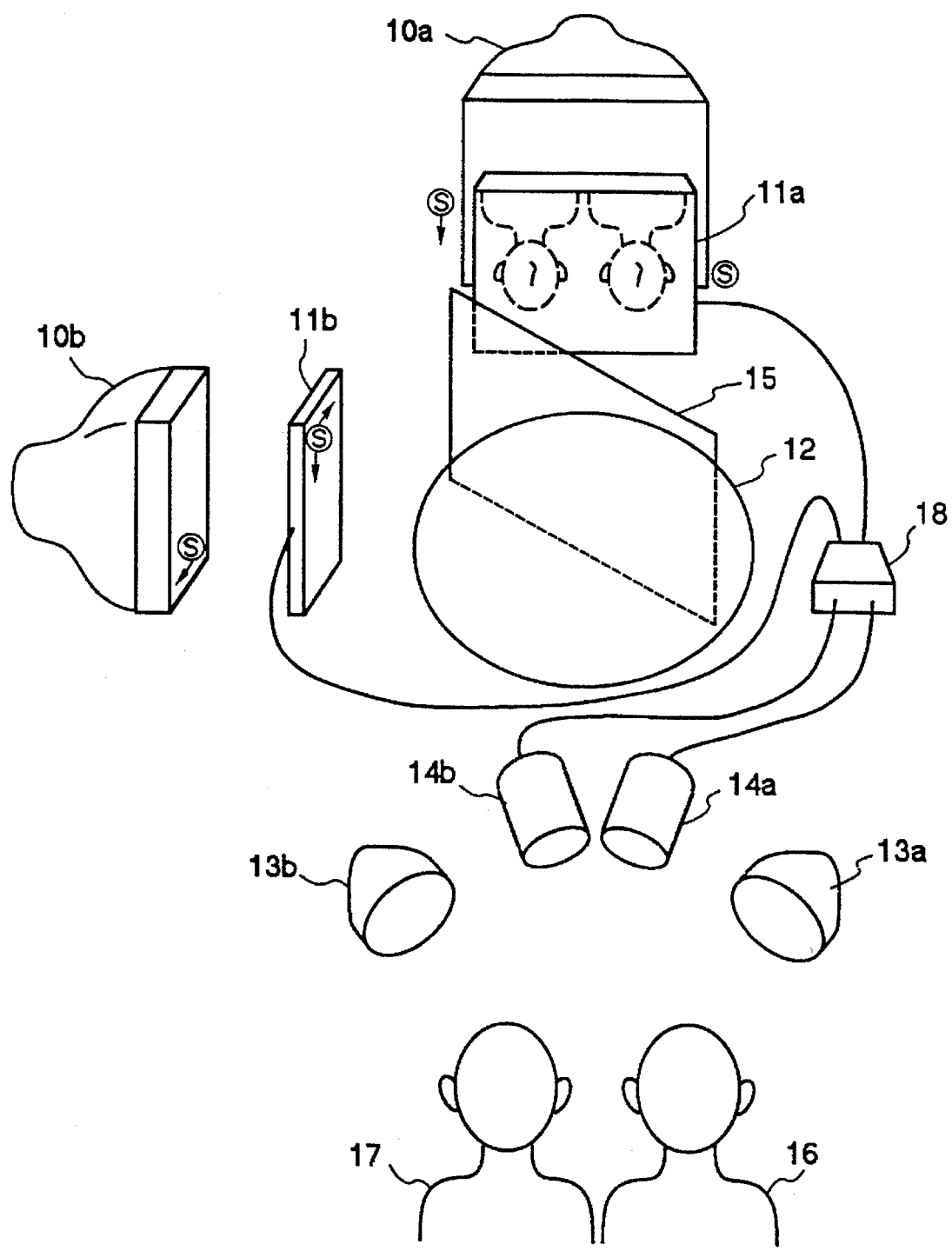
FIG. 21 illustrates a configuration of a stereoscopic image display apparatus according to a seventh embodiment of the present invention.

FIG. 21 shows a configuration of an stereoscopic image display apparatus according to a seventh embodiment of the resent invention. Similar to the previous embodiments, in the apparatus according to the present embodiment comprises a plurality of displays. The displays are set "normally" unless otherwise specified.

The stereoscopic image display apparatus in the seventh embodiment has both characteristics described in the sixth embodiment where the necessity number of the Fresnel lens is reduced to one, and in the second embodiment where the unnecessary background images are eliminated by applying the subtraction process.

In FIG. 21, reference numerals 10a and 10b denote color CRTs as image display devices; 11a and 11b, transmission type liquid crystal displays functioning as spatial modulation devices each of which is provided between the color CRT 10a or 10b and viewers; and 12, Fresnel lens having a focal distance of 240 mm. The Fresnel lens is placed on its optical axis at the distance which is farther than the focal distance of the Fresnel lens 12 from the liquid crystal displays 11a and 11b, 280 mm, for instance. Further, reference numerals 13a and 13b denote LEDs which emit light having wavelengths of 850 nm and 950 nm, respectively, and function as irradiation devices; 14a and 14b, monochrome CCD cameras which serve as image sensing devices; 15, a half mirror for combining images displayed on the color CRTs 10a and 10b provided on the optical axes of the Fresnel lens 12 between the transmission type liquid crystal displays 11a and 11b and the Fresnel lens 12; 16 and 17, viewers who see stereoscopic images; and 18, a subtracting device which operates subtraction process between the two kinds of images.

The operation of the stereoscopic image display apparatus constructed as above is basically the same as the one described in accordance with the sixth embodiment of the present invention with reference to FIG. 20, thus the same elements, devices, and the like, in this embodiment as in the sixth embodiment are referred by the same reference numerals, and the description of them are omitted, and only different elements, devices, and the like, will be explained.

The image signals of the faces of the viewers 16 and 17 separately taken by the cameras 14a and 14b are inputted into the subtracting device 18, and processed with subtraction, then outputted to the transmission type liquid crystal displays 11a and 11b. By performing the aforesaid subtraction, common portions of the two images taken by the cameras 14a and 14b are eliminated, thus the portions, such as background images, which are not necessary for displaying stereoscopic images are eliminated.

FIG. 21 also illustrates another method to achive the above described inversions of the screen images and control figures in the seventh embodiment. The meaning of "Ⓢ" and "→" is the same as the first embodiment.

<Eighth Embodiment>

Figure 22:
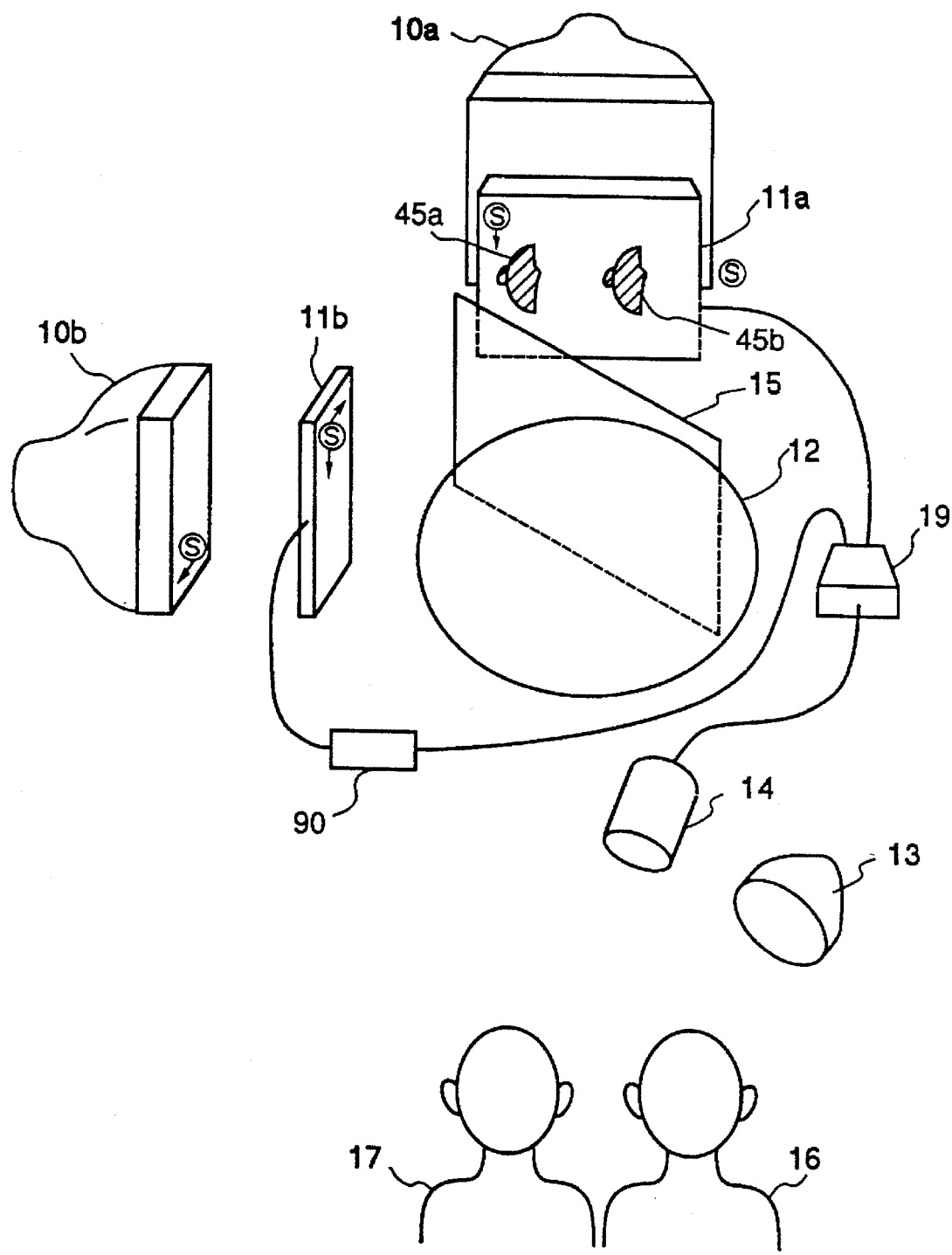
FIG. 22 illustrates a configuration of a stereoscopic image display apparatus according to an eighth embodiment of the present invention.

FIG. 22 shows a configuration of a stereoscopic image display apparatus according to an eighth embodiment of the present invention. Similar to the previous embodiments, in the apparatus according to the present embodiment comprises a plurality of displays. The displays are set "normally" unless otherwise specified.

The stereoscopic image display apparatus in the eighth embodiment has both characteristics described in the sixth embodiment where the number of necessary Fresnel lens is reduced to one, and in the third embodiment where the number of necessary cameras is reduced to one by performing the negative-positive conversion.

In FIG. 22, reference numerals 10a and 10b denote color CRTs as image display devices; 11a and 11b, transmission type liquid crystal displays functioning as spatial modulation devices which are provided between the color CRT 10a or 10b and viewers; and 12, Fresnel lens having a focal distance of 240 mm. The Fresnel lens is placed on its optical axis at the distance which is farther than the focal distance of the Fresnel lens 12 from the liquid crystal displays 11a and 11b, 280 mm, for instance. Further, reference numerals 13a and 13b denote LEDs which emit light having wavelengths of 850 nm and 950 nm, respectively, and function as irradiation devices; 14a and 14b, monochrome CCD cameras which serve as image sensing devices; 15, a half mirror for combining images displayed on the color CRTs 10a and 10b provided on the optical axes of the Fresnel lens 12 between the transmission type liquid crystal displays 11a and 11b and the Fresnel lens 12; 16 and 17, viewers who see stereoscopic images; 19, a signal divider; and 90, a negative-positive inversion circuit. Areas 45a and 45b are right half faces of the viewers 16 and 17 displayed on the transmission type liquid crystal display 11a, and are light transmission portions on the transmission type liquid crystal display 11a.

The operation of the stereoscopic image display apparatus constructed as above is basically the same as the one described in accordance with the sixth embodiment of the present invention with reference to FIG. 20, thus the same elements, devices, and the like, in this embodiment as in the sixth embodiment are referred by the same reference numerals, and the description of them are omitted, and only different elements, devices, and the like, will be explained.

The signals representing the images of the right half faces of the viewers 16 and 17 taken by the monochrome CCD cameras 14s are divided into two groups by the signal divider 19, and the one group of the signals is inputted into the transmission type liquid crystal display 11a and displayed as the images 45a and 45b. Whereas, the other group of the signals is inputted into the negative-positive inversion circuit 90 then to the transmission type liquid crystal display 11b, thus the portions except the images 45a and 45b are displayed as figures on the transmission type liquid crystal display 11b. Accordingly, on the liquid crystal display 11b, the areas except the areas 45a and 45b transmit light. The theory that the stereoscopic image display apparatus in the eighth embodiment makes the viewers to see a stereoscopic image is the same as the one described in the second embodiment with reference to FIG. 11.

In the eighth embodiment, the necessary number of light and camera is one for each.

FIG. 22 also illustrates another method to achive the above described inversions of the screen images and control figures in the eighth embodiment. The meaning of "ⓢ" and "→" is the same as the first embodiment.

<Ninth Embodiment>

Figure 23:
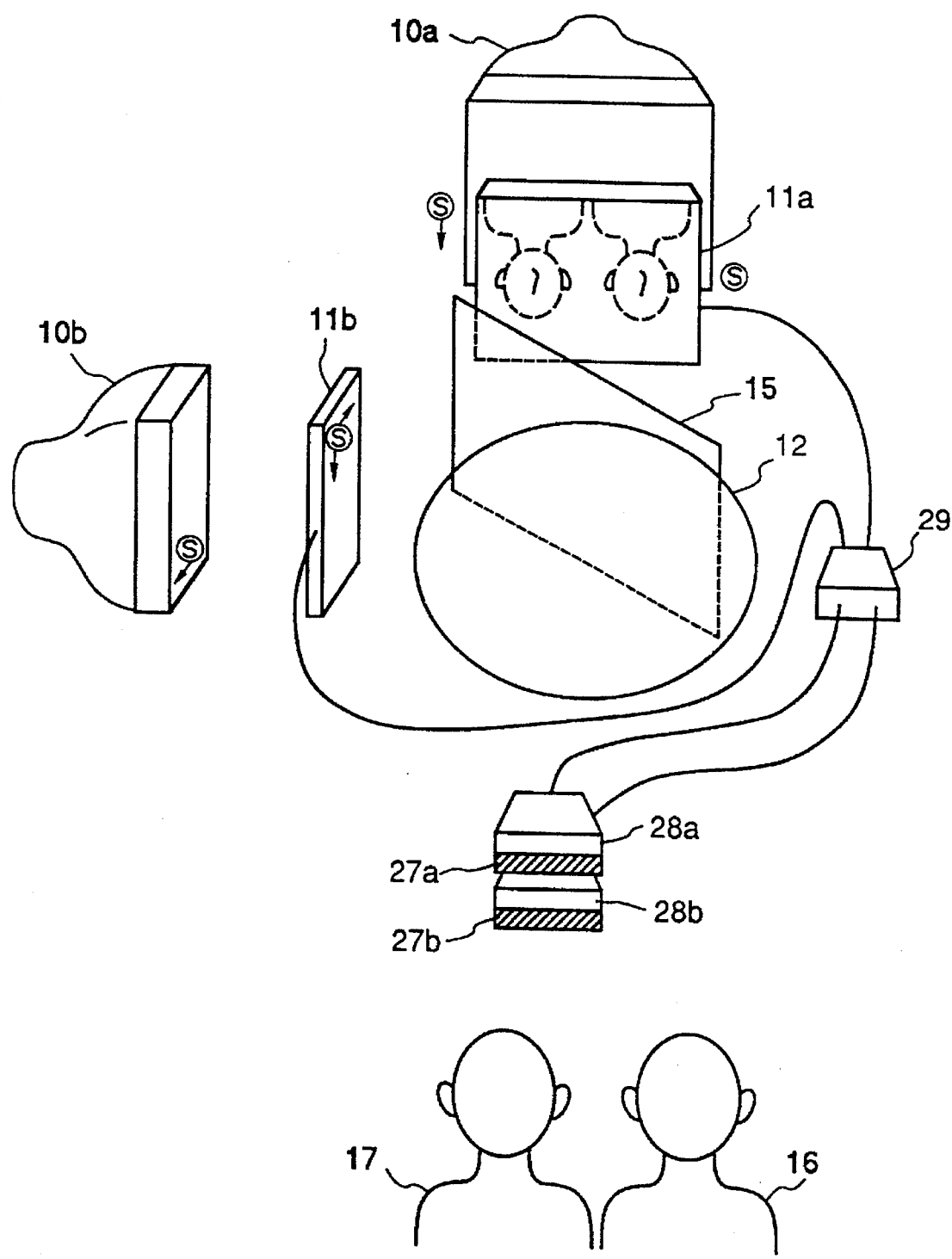
FIG. 23 illustrates a configuration of a stereoscopic image display apparatus according to a ninth embodiment of the present invention.

FIG. 23 is a configuration of a stereoscopic image display apparatus according to a ninth embodiment of the present invention. Similar to the previous embodiments, in the apparatus according to the present embodiment comprises a plurality of displays. The displays are set "normally" unless otherwise specified.

The stereoscopic image display apparatus in the ninth embodiment has both characteristics descried in the sixth embodiment where the necessary number of Fresnel lenses is reduced to one, and in the fourth embodiment where the positions of the viewers are detected by using ultrasonic.

Figure 24:
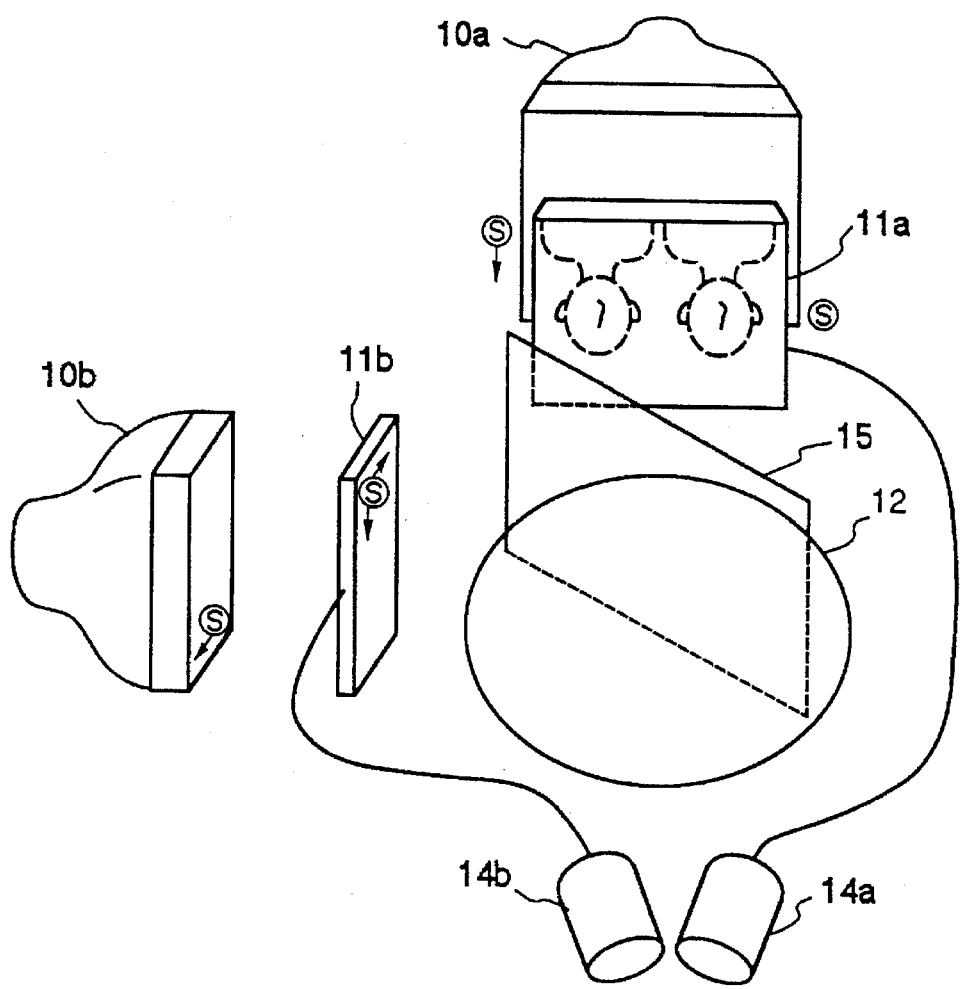
FIG. 24 illustrates a configuration of a stereoscopic image display apparatus according to a tenth embodiment of the present invention.
Figure 24:
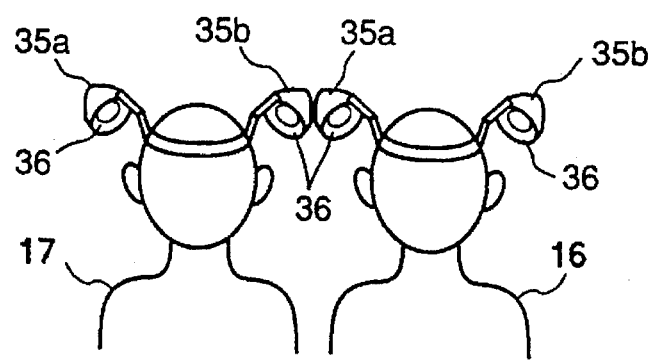

In FIGS. 23 and 24, reference numerals 10a and 10b denote color CRTs as image display devices; 11a and 11b, transmission type liquid crystal displays functioning as spatial modulation devices each of which is provided between the color CRT 10a or 10b and viewers; and 12, a Fresnel lens having a focal distance of 240 mm. The Fresnel lens is placed on its optical axis at the distance which is farther than the focal distance of the Fresnel lens 12 from the liquid crystal displays 11a and 11b, 280 mm, for instance. Reference numerals 16 and 17 denote viewers who see stereoscopic images; and 27a and 27b, ultrasonic emitters which emit ultrasonic having frequencies of 100 kHz and 120 kHz against the viewers 16 and 17, respectively. Further, ultrasonic detectors 28a and 28b selectively detect ultrasonic emitted by the ultrasonic emitters 27a and 27b. Reference numeral 15 denotes a half mirror for combining images displayed on the color CRTs 10a and 10b provided on the optical axis of the Fresnel lens 12 between the transmission type liquid crystal displays 11a and 11b and the Fresnel lens 12; 29, an image output device; and 51a and 51b, figures corresponding to right half faces of the viewers 16 and 17 displayed on the transmission type liquid crystal display 11a, and the figures have light transmitting characteristics.

The operation of the stereoscopic image display apparatus constructed as above is basically the same as the one described in accordance with the sixth embodiment of the present invention with reference to FIG. 20, thus the same elements, devices, and the like, in this embodiment as in the sixth embodiment are referred by the same reference numerals, and the description of them are omitted, and only different elements, devices, and the like, will be explained.

The ultrasonic of two different frequencies emitted from the ultrasonic emitters 27a and 27b are reflected by the viewers 16 and 17, and respectively detected by the ultrasonic detectors 28a and 28b. The image output device 29 calculates positions corresponding to the right and left half faces of the viewers on the transmission type liquid crystal displays 11a and 11b from the detected ultrasonic signals, then outputs the predetermined R screen figures and L screen figures to the transmission type liquid crystal displays 11a and 11b, respectively, to be displayed. Accordingly, it is easy to process so as not to display portions other than portions corresponding to the viewers' faces, thus crosstalk of left (right) and right (left) images which are slightly recognized by right (left) and left (right) eyes, respectively, because of external scattered light, does not occur.

FIG. 23 also illustrates another method to achive the above described inversions of the screen images and control figures in the ninth embodiment. The meaning of "ⓢ" and "→" is the same as the first embodiment.

<Tenth Embodiment>

FIG. 24 shows a configuration of a stereoscopic image display apparatus according to a tenth embodiment of the present invention. Similar to the previous embodiments, in the apparatus according to the present embodiment comprises a plurality of displays. The displays are set "normally" unless otherwise specified.

The stereoscopic image display apparatus in the tenth embodiment have both characteristics described in the sixth embodiment where the necessary number of Fresnel lenses is reduced to one, and in the fifth embodiment where the positions of the viewers can be detected precisely.

In FIG. 24, reference numerals 10a and 10b denote color CRTs as image display devices; 11a and 11b, transmission type liquid crystal displays functioning as spatial modulation devices each of which is provided between the color CRT 10a or 10b and viewers; and 12, Fresnel lens having a focal distance of 240 mm. The Fresnel lens is placed on its optical axis at the distance which is farther than the focal distance of the Fresnel lens 12 from the liquid crystal displays 11a and 11b, 280 mm, for instance. Further, reference numerals 35a and 35b denote LEDs, provided on each head of the viewers 16 and 17 with head bands, which emit light having wavelengths of 850 nm and 950 nm, respectively, and function as irradiation devices. The LEDs 35a and 35b have blocking covers. Reference numerals 14a and 14b denote monochrome CCD cameras which serve as image sensing devices; 15, a half mirror for combining images displayed on the color CRTs 10a and 10b provided on the optical axis of the Fresnel lens 12 between the transmission type liquid crystal displays 11a and 11b and the Fresnel lens 12; and 16 and 17, viewers who see stereoscopic images.

The operation of the stereoscopic image display apparatus constructed as above is basically the same as the one described in accordance with the sixth embodiment of the present invention with reference to FIG. 20, thus the same elements, devices, and the like, in this embodiment as in the sixth embodiment are referred by the same reference numerals, and the description of them are omitted, and only different elements, devices, and the like, will be explained. The LEDs 35a and 35b are provided on each head of the viewers 16 and 17, thus light emitted from each LED 35a and 35b certainly illuminates right or left sides of viewers. Further, differing from the case described in the eighth embodiment, the relative positions of the LEDs and the viewers do not change, thus the viewers can move freely. The blocking cover 36 is to prevent the light of the LED from illuminating another viewer next to the viewer wearing the LED.

FIG. 24 also illustrates another method to achive the above described inversions of the screen images and control figures in the tenth embodiment. The meaning of "Ⓢ" and "→" is the same as the first embodiment.

<Eleventh Embodiment>

Figure 25:
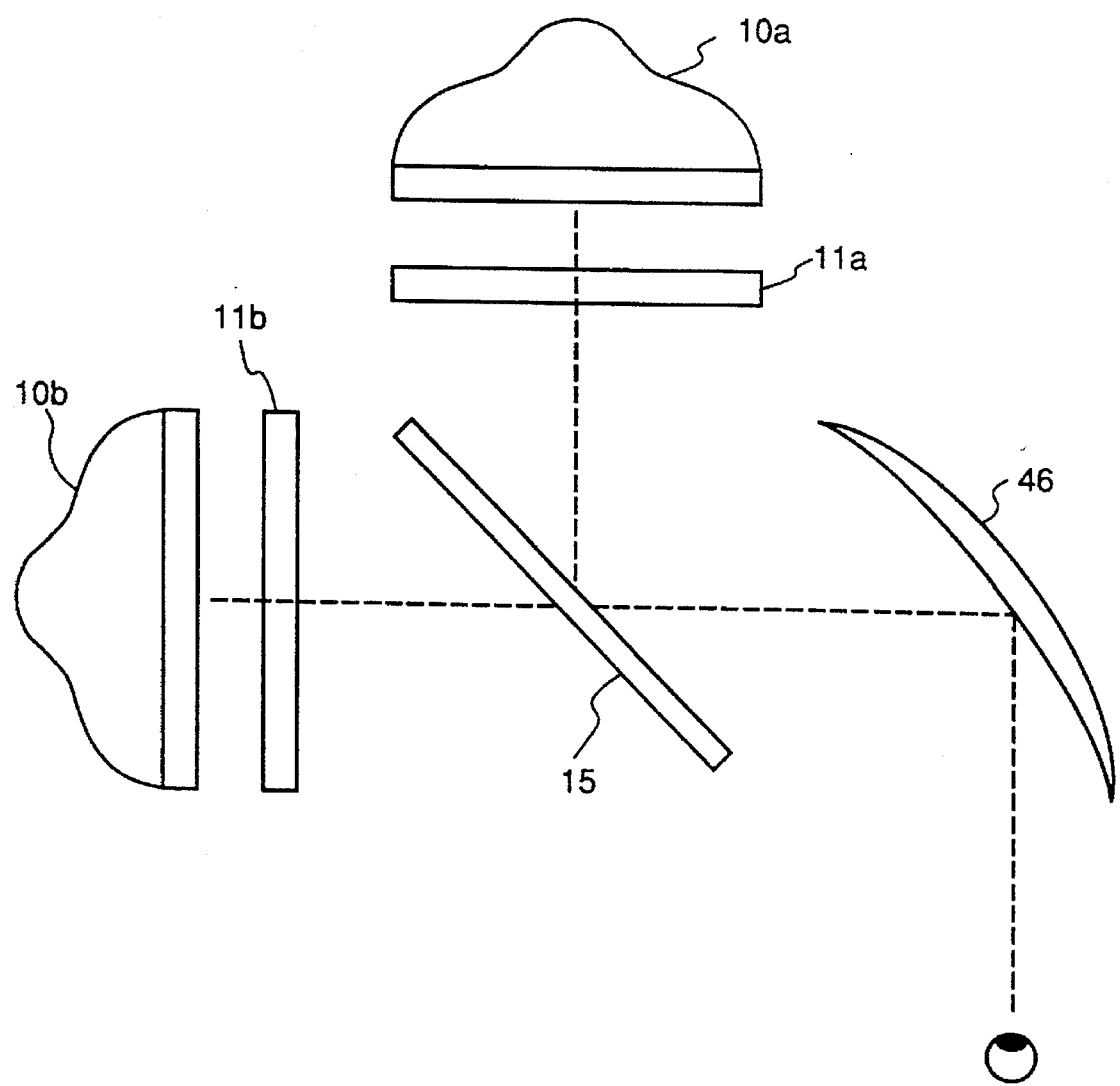
FIG. 25 illustrates a configuration of a stereoscopic image display apparatus according to an eleventh embodiment of the present invention.
Figure 26:
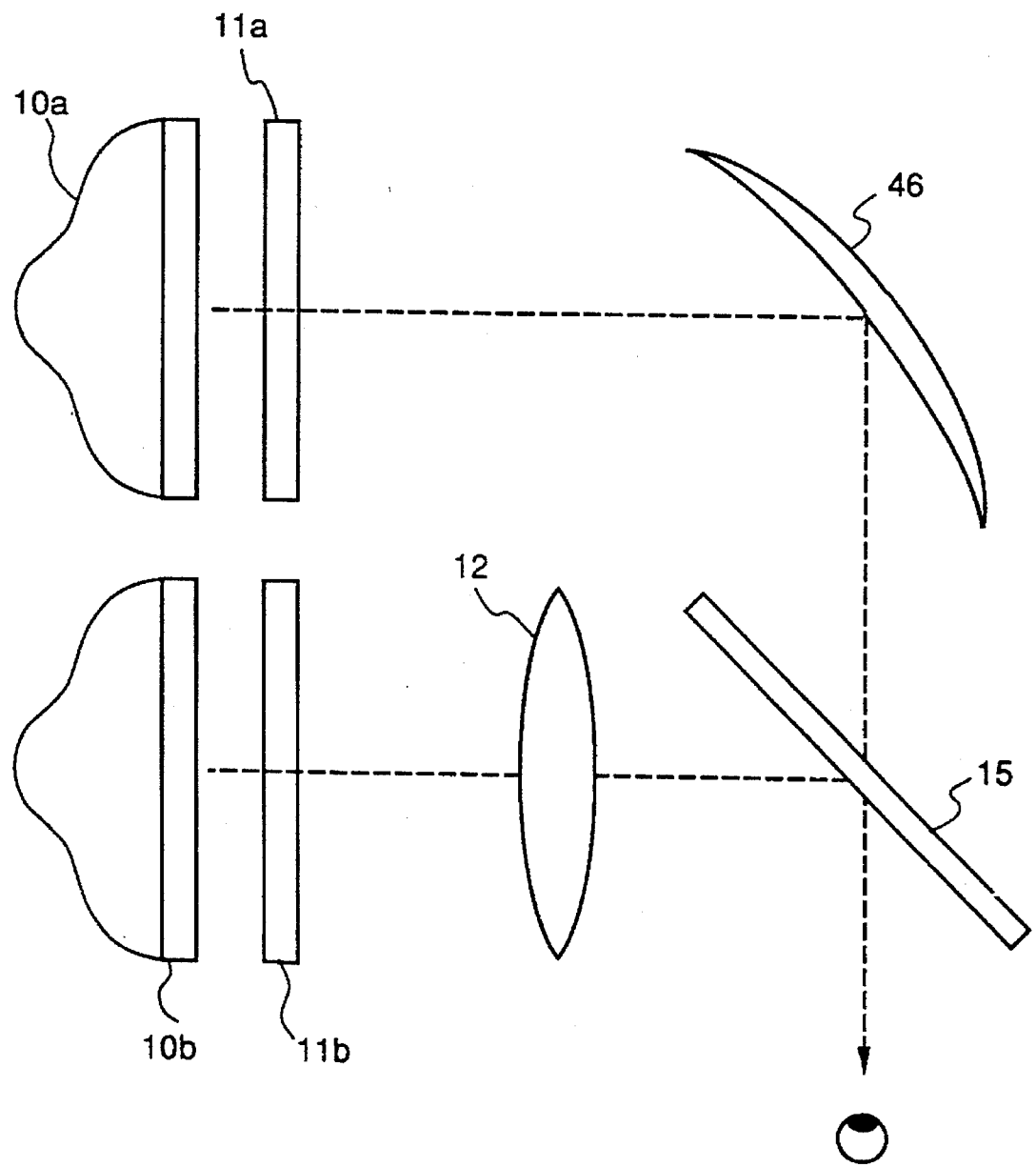
FIG. 26 illustrates a configuration of a stereoscopic image display apparatus according to a twelfth embodiment of the present invention.

FIG. 25 is a configuration of a stereoscopic image display apparatus according to an eleventh embodiment of the present invention. Similar to the previous embodiments, in the apparatus according to the present embodiment comprises a plurality of displays. The displays are set "normally" unless otherwise specified.

In FIG. 25, reference numerals 10a and 10b denote color CRTs as image display devices; 11a and 11b, transmission type liquid crystal displays functioning as spatial modulation devices each of which is provided between the color CRT 10a or 10b and viewers; 15, a half mirror for combining images displayed on the color CRTs 10a and 10b; and 46, a concave mirror having a focal distance of 240 mm. The concave mirror 46 is placed on its optical axis at the distance which is farther than the focal distance of the concave mirror 46 from the liquid crystal displays 11a and 11b, 280 mm, for instance.

The operation of the stereoscopic image display apparatus constructed as above is basically the same as the one described in accordance with the first to tenth embodiments of the present invention with reference to FIGS. 3 to 24, thus the same elements, devices, and the like, in this embodiment as in the first to tenth embodiments are referred by the same reference numerals, and the description of them are omitted, and only different elements, devices, and the like, will be explained. Further, the image sensing devices, detectors, irradiation devices, and so on, in the first to tenth embodiments can be applicable to the eleventh embodiment, thus those devices are not shown.

In the eleventh embodiment, a pair of screen images displayed on the color CRTs 10a and 10b are combined by the half mirror 15, and seen by the viewers 16 and 17 after reflected by the concave mirror 46. Accordingly, it is possible to magnify the images to the effective diameter without limited by the size of the half mirror 15. In this case, the concave lens 46 magnifies the screen images on the transmission type liquid crystal displays 11a and 11b and controls light of the images so that R and L screen images respectively reach the right and left eyes of the viewers, thus a lens is not needed. Comparing to a lens, it is easy to manufacture a large size concave mirror, thus suitable to obtain a large image.

<Twelfth Embodiment>

FIG. 25 is a configuration of a stereoscopic image display apparatus according to a twelfth embodiment of the present invention. Similar to the previous embodiments, in the apparatus according to the present embodiment comprises a plurality of displays. The displays are set "normally" unless otherwise specified.

In FIG. 25, reference numerals 10a and 10b denote color CRTs as image display devices; 11a and 11b, transmission type liquid crystal displays functioning as spatial modulation devices each of which is provided between the color CRT 10a or 10b and viewers. Further, reference numeral 15 denotes a half mirror for combining images displayed on the color CRTs 10a and 10b; and 46, a concave mirror having a focal distance of 240 mm. The concave mirror 46 is placed at the distance which is farther than the focal distance of the concave mirror 46 from the liquid crystal display 11a, 280 mm, for instance.

The operation of the stereoscopic image display apparatus constructed as above is basically the same as the one described in accordance with the first to eleventh embodiments of the present invention with reference to FIGS. 3 to 25, thus the same elements, devices, and the like, in this embodiment as in the first to eleventh embodiments are referred by the same reference numerals, and the description of them are omitted, and only different elements, devices, and the like, will be explained. Further, the image sensing devices, detectors, irradiation devices, and so on, in the first to eleventh embodiments can be applicable to the twelfth embodiment, thus those devices are not shown.

In the twelfth embodiment, the R and L screen images displayed on the color CRTs 10a and 10b, respectively, are separated by reflecting at the concave mirror 46. The pair of the screen images are seen by the viewers after combined by the half mirror 15.

<Thirteenth Embodiment>

Figure 27:
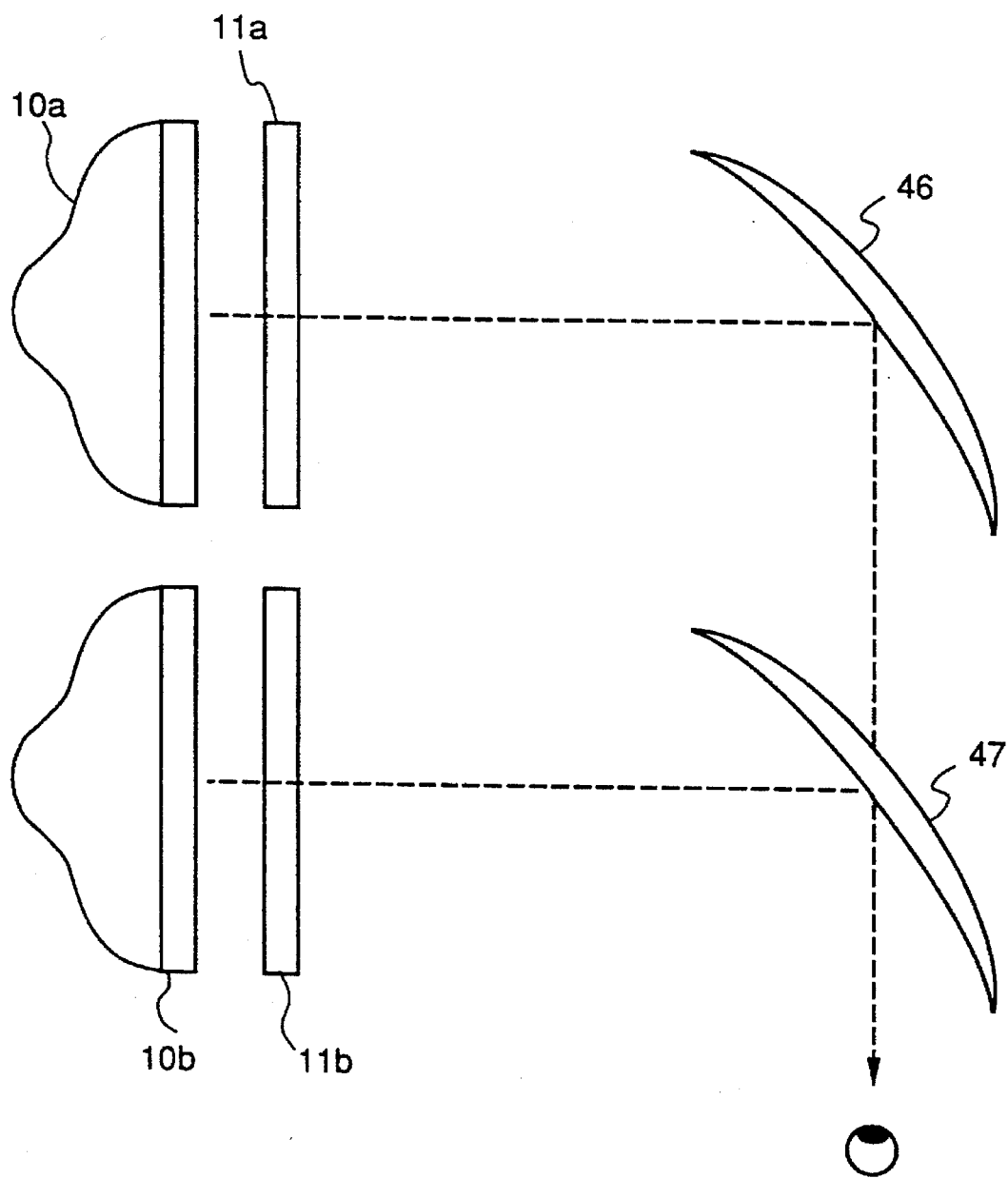
FIG. 27 illustrates a configuration of a stereoscopic image display apparatus according to a thirteenth embodiment of the present invention.

FIG. 27 is a configuration of a stereoscopic image display apparatus according to an thirteenth embodiment of the present invention. Similar to the previous embodiments, in the apparatus according to the present embodiment comprises a plurality of displays. The displays are set "normally" unless otherwise specified.

In FIG. 27, reference numerals 10a and 10b denote color CRTs as image display devices; 11a and 11b, transmission type liquid crystal displays functioning as spatial modulation devices each of which is provided between the color CRT 10a or 10b and viewers; and 46, a concave mirror having a focal distance of 240 mm. The concave mirror 46 is placed at the distance which is farther than the focal distance of the concave mirror 46 from the liquid crystal displays 11a and 11b, 280 mm, for instance. Concave half mirror 47 makes the images on the color CRT 10b to reach the left eyes of the viewers and combines the images on the color CRT 10a and 10b into a single image.

The operation of the stereoscopic image display apparatus constructed as above is basically the same as the one described in accordance with the first to twelfth embodiments of the present invention with reference to FIGS. 3 to 26, thus the same elements, devices, and the like, in this embodiment as in the first to twelfth embodiments are referred by the same reference numerals, and the description of them are omitted, and only different elements, devices, and the like, will be explained. Further, the image sensing devices, detectors, irradiation devices, and so on, in the first to twelfth embodiments can be applicable to the thirteenth embodiment, thus those devices are not shown.

According to the thirteenth embodiment, the R screen images displayed on the color CRT 10a are focused at the right eyes of the viewers by reflected by the concave mirror 46, similarly the L screen images displayed on the color CRT 10b are focused at the left eyes of the viewers by reflected by the concave half mirror 47. The pair of the screen images are combined by the concave half mirror 47, then seen by the viewers.

<Fourteen Embodiment>

Figure 28:
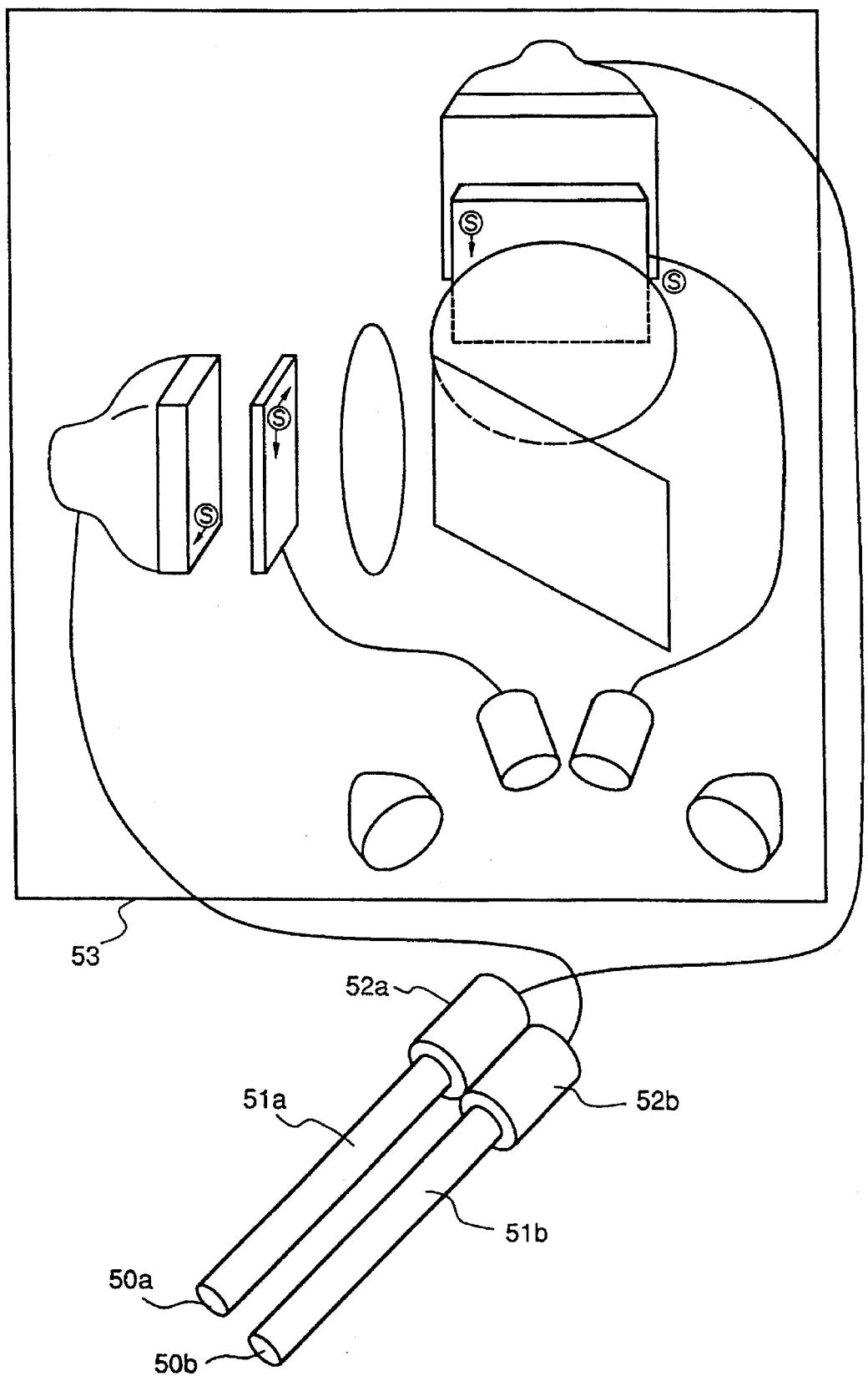
FIG. 28 illustrates a configuration of a stereoscopic image display apparatus according to a fourteenth embodiment of the present invention.
Figure 29:
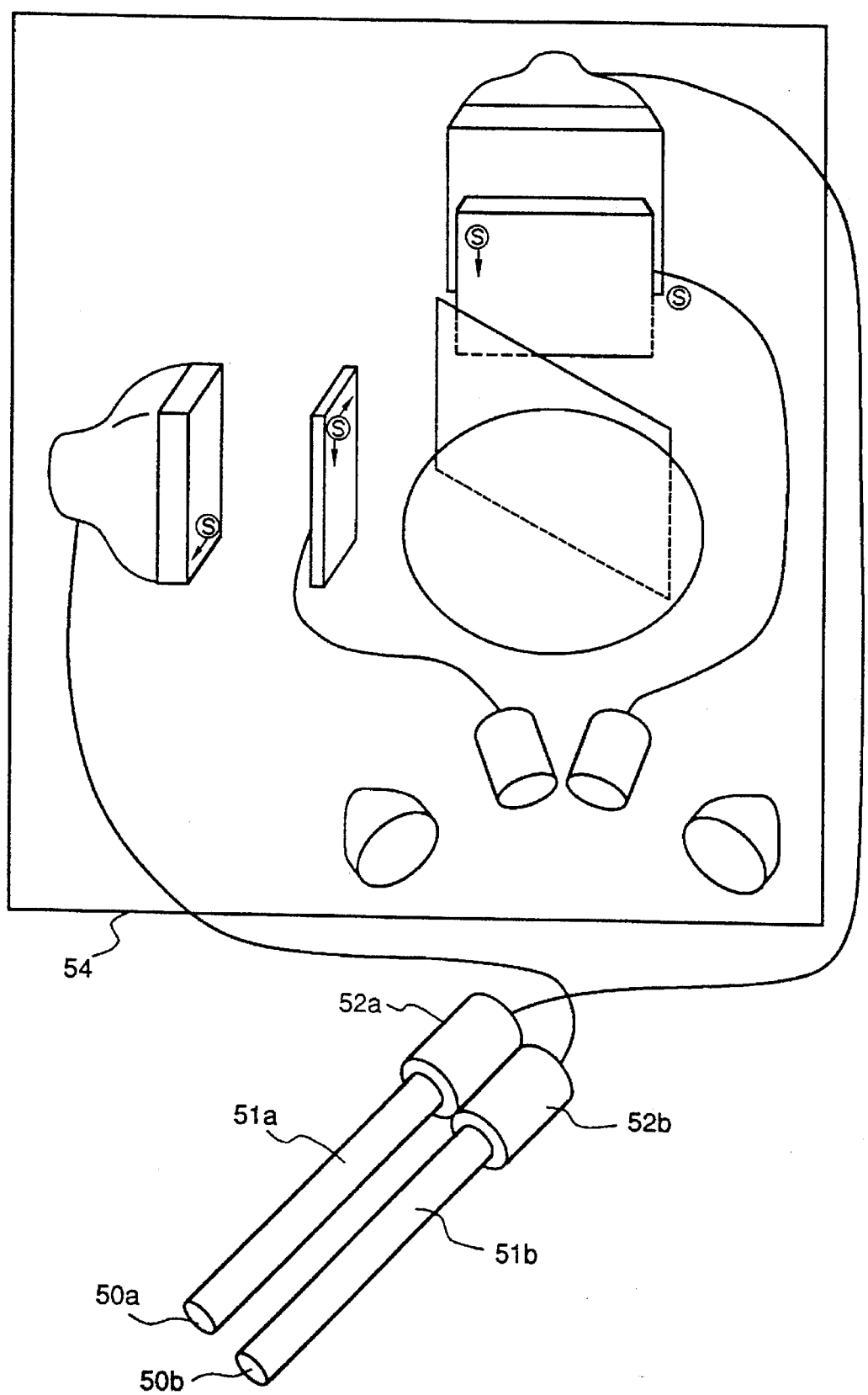
FIG. 29 illustrates a configuration of the stereoscopic image display apparatus according to the fourteenth embodiment of the present invention.

FIGS. 28 and 29 show configurations of a stereoscopic image display apparatus according to the fourteenth embodiment applied to an endoscope. Similar to the previous embodiments, in the apparatus according to the present embodiment comprises a plurality of displays. The displays are set "normally" unless otherwise specified.

In FIGS. 28 and 29, reference numerals 50a and 50b denotes objective lenses; 51a and 51b, lens mirrors containing optical elements for guiding the picked-up images, and provided with an angle corresponding to an observer's convergence angle; 52a and 52b, CCD cameras; 53, the stereoscopic image display apparatus described in the first embodiment with reference to FIGS. 3; and 54, the stereoscopic image display apparatus described in the sixth embodiment with reference to FIG. 20.

The operation of the endoscopic apparatus constructed as described above will be described. Two object images picked up by the objective lenses 50a and 50b are respectively focused on the CCD cameras 52a and 52b as R screen images and L screen images by using the lens mirrors 51a and 51b, provided so as to have an angle corresponding to the convergence angle of the observers' eyes for stereoscopic observation, thus functioning as a stereoscopic endoscope. The focused two images are separately inputted into the color CRTs 10a and 10b of the stereoscopic image display apparatus 53 and displayed as a pair of R and L screen images. With the functions of the stereoscopic image display apparatus 53 or 54 of the present invention, a plurality of observers are able to observe the identical images taken by the stereoscopic endoscope as stereoscopic images.

It should be noted that the image sensing elements 52a and 52b in the present invention are provided so as to touch the objective lenses 50a and 50b, and the shape of the endoscopic barrels can be selected arbitrarily by converting the images picked up by the image sensing elements into electrical signals and guiding the signals in the endoscopic barrels 51a and 51b. Accordingly, a configuration which is more effective to the object of the present invention can be obtained.

It should be noted that the stereoscopic image display apparatus described in the first and sixth embodiments are connected to the endoscope, however, any one of the stereoscopic image display apparatus described in the first to thirteenth embodiment can be also applicable.

<Fifteenth Embodiment>

Figure 30:
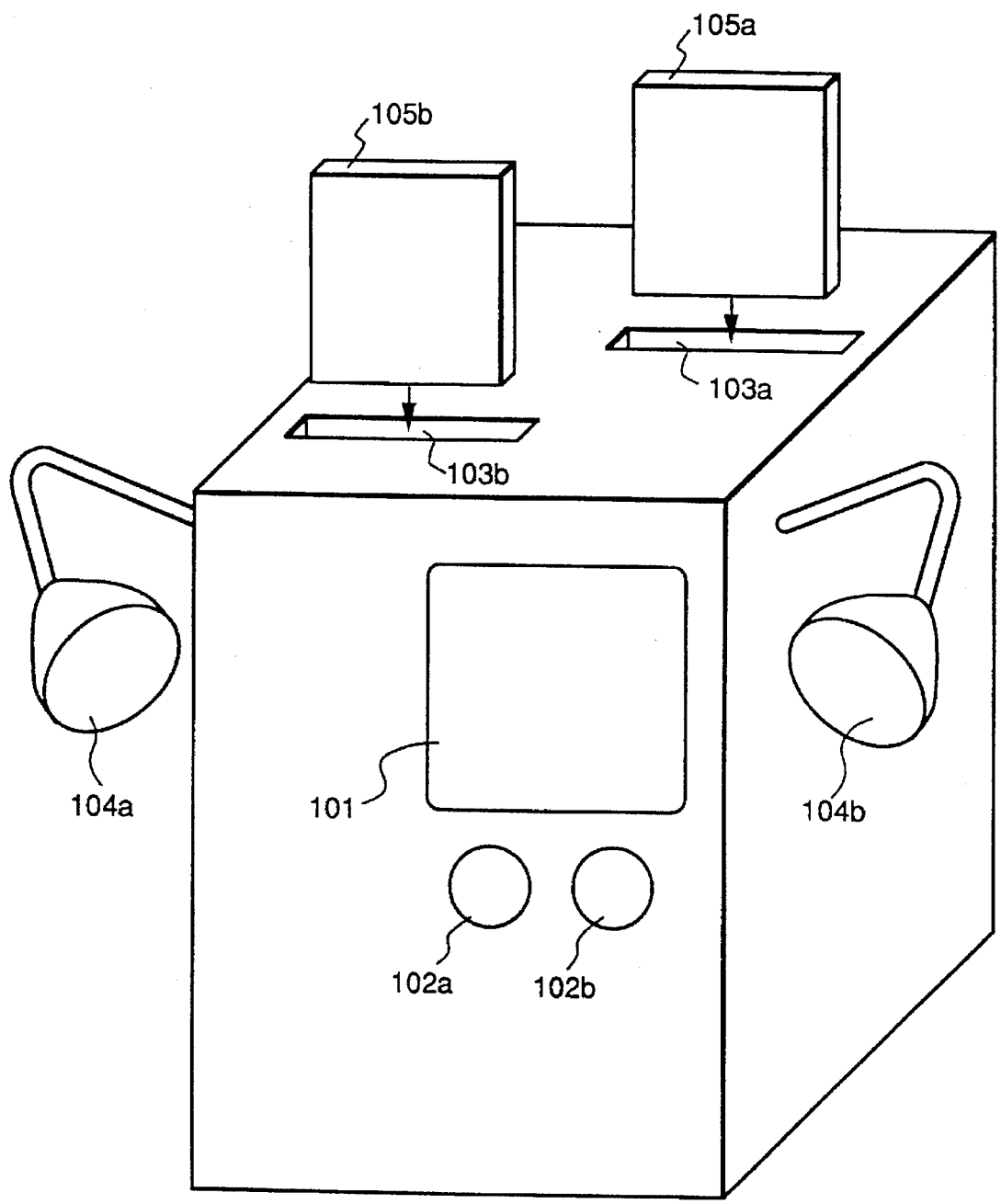
FIG. 30 illustrates a configuration of a stereoscopic image display apparatus according to a fifteenth embodiment of the present invention.

FIG. 30 illustrates an external view of a stereoscopic image display apparatus according to a fifteenth embodiment of the present invention. Similar to the previous embodiments, in the apparatus according to the present embodiment comprises a plurality of displays. The displays are set "normally" unless otherwise specified.

In FIG. 30, reference numeral 101 denotes a display field for displaying stereoscopic images to be observed; 102a and 102b, CCD cameras as image sensing devices; 103a and 103b, connection slits for connecting to recording carriers 105a and 105b of the stereoscopic images; and 104a and 104b, LEDs, as irradiation devices, having wavelengths of 850 nm and 950 nm, respectively.

Figure 31:
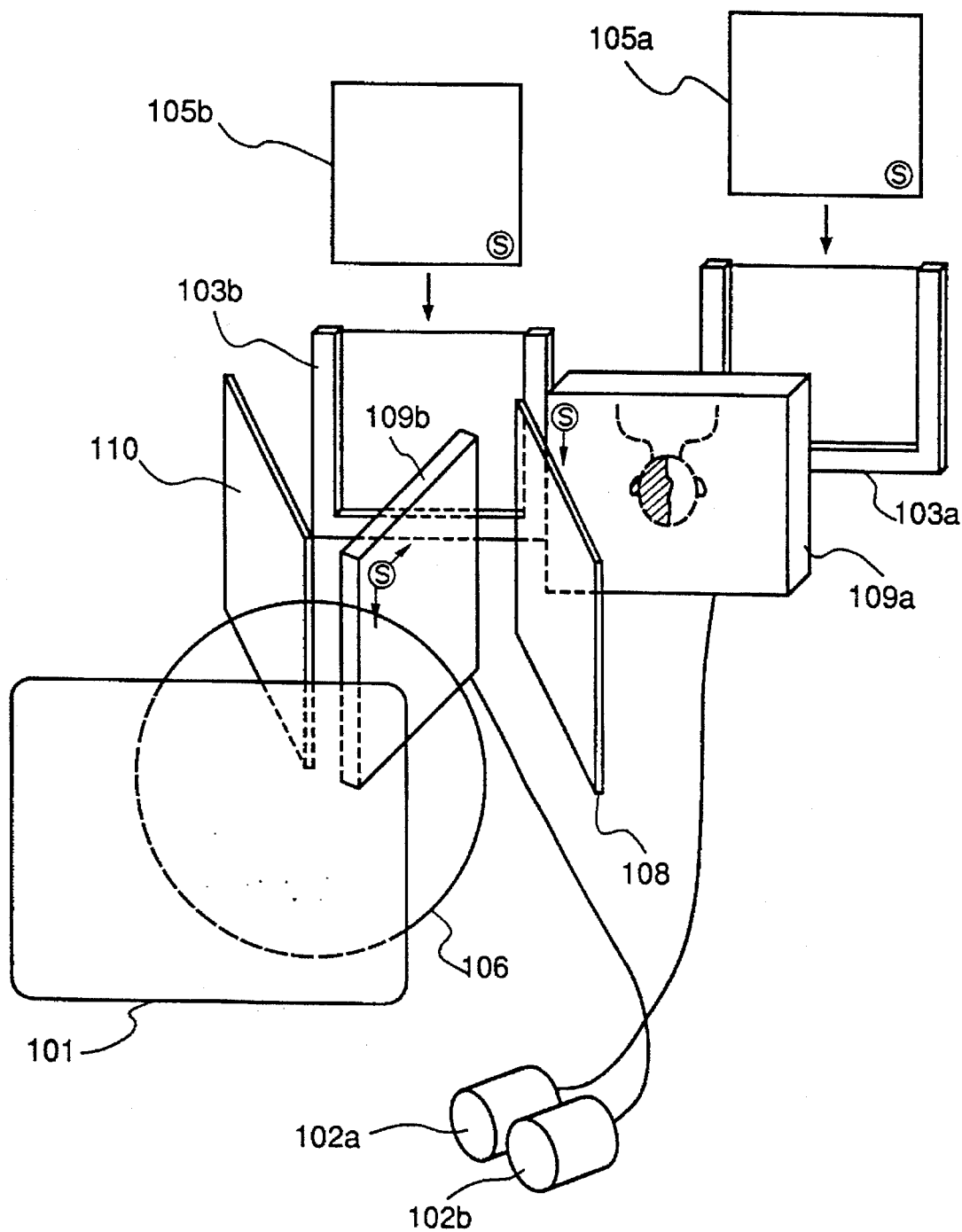
FIG. 31 illustrates a diagram illustrating an internal configuration of the stereoscopic image display apparatus according to the fifteenth embodiment of the present invention.

FIG. 31 is a perspective view illustrating an internal configuration of the stereoscopic display apparatus shown in FIG. 30 according to the fifteenth embodiment.

In FIG. 31, reference numeral 101 denotes a display field in the FIG. 30; 102a and 102b, the CCD cameras as image sensing devices; 103a and 103b, the connection slits for connecting the recording carriers 105a and 105b of the stereoscopic images; 108, a half mirror for combining R and L screen images; 109a and 109b, transmission type liquid crystal displays as spatial modulation elements; 106, a Fresnel lens having a focal distance of 150 mm provided between the liquid crystal displays 109a and 109b and an observer; and 110, a mirror for bending light paths of images recorded on the recording carrier 105b.

Figure 32:
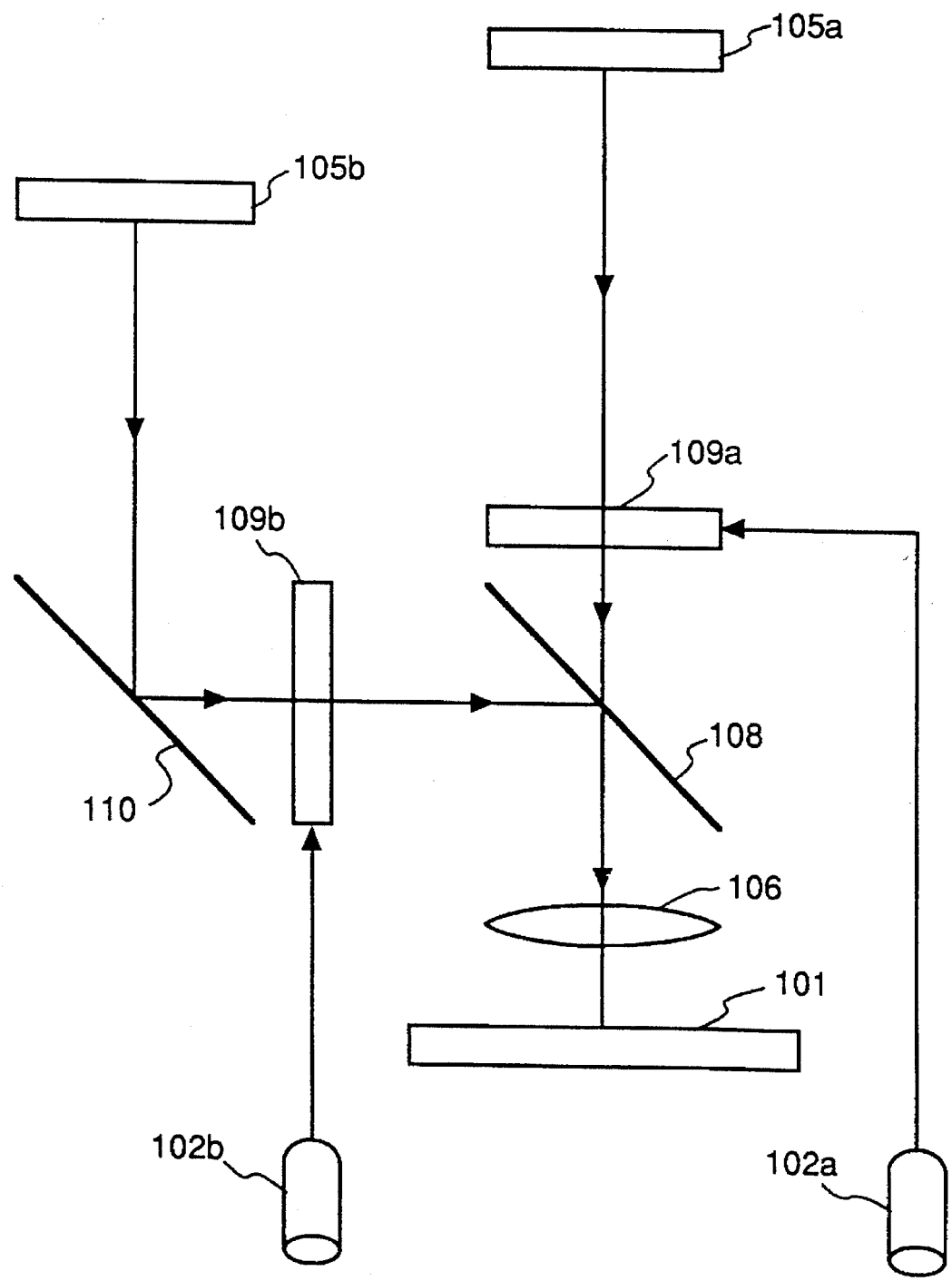
FIG. 32 illustrates light paths in the stereoscopic image display apparatus according to the fifteenth embodiment of the present invention.

FIG. 32 illustrates light paths inside the stereoscopic image display apparatus according to the fifteenth embodiment.

By using the same method as described in the first embodiment, in accordance with image signals of face images of the observers which are picked up by the CCD cameras 102a and 102b, images are converted into a light transmission image (either one of right or left half of viewers' face images) and a light blocking image (the other half of viewers' face images). The images are separately displayed on the liquid crystal display 109a and 109b.

When the right half of the viewers' faces are displayed on the liquid crystal display 109b as the light transmission image, the right eyes of the viewers see images on the recording carrier for the right eye (abbreviated as "R recording carrier", hereinafter) 105b, attached at the connection slit 103b, through the light transmission images. At this time, since the light blocking area for the left eye on the liquid crystal display 109b blocks light, the images on the R recording carrier 105b can not be seen from the left eyes of the viewers.

On the other hand, the left half of the viewers' faces are displayed on the liquid crystal display 109a as the light transmission image, thus only the left eye can see the images on the recording carrier for the left eye (referred as "L recording carrier", hereinafter) 105a.

The images on the R recording carrier are reflected by the mirror 110, and after being transmitted through the liquid crystal display 109b, further reflected by the half mirror 108, thus can be seen on the display field 101 by the viewers. Further, the L screen images on the L recording carrier are transmitted through the liquid crystal display 109a, then the half mirror 108, thereby can be seen on the display field 101. The both images are combined to obtain stereoscopic images.

The images on the recording carriers 105a and 105b are turned upside down by being transmitted through the Fresnel lens 106, thus the recording carriers 105a and 105b have to be attached upside down.

Further, when the images on the recording carriers 105a and 105b are the light transmission images, a backlighting device is necessary behind the connecting slits 103a and 103b. Whereas, when the images on the recording carriers 105a and 105b are the light reflecting images, such as photographs and printed images, a light, provided so as to illuminate the images on the recording carriers 105a and 105b, is necessary.

The images on the carriers 105a and 105b are the light transmission images such as images on a film, however, the images can be the ones which emit light themselves as in the first to ninth embodiments. Furthemore, they may be reflective type, such as photo picture.

Because the carriers 105a and 105b should be inserted into the slits 203a and 203b with turned upside down, they are inverted in longitudinal (upside down) and transverse (right-to left) directions. More specifically, the R screen image on the carrier 105a which are turned upside down are corrected by the lens 106 to enter the right eye of the viewer. The L screen image on the carrier 105b which are turned upside down are inverted by the mirrors 110, 108 two times, and then corrected by the lens 106 to enter the left eye of the viewer.

The R control figure is displayed in a relatively left region of the display 109a, therefore, the R control figure may be input to the LCD 109a with inverting upside down only. On the other hand, the LCD 109b is located between the mirrors 108 and 110, thus the L figure is inverted right-to left by only mirror 108 and turned upside down by the lens 106. Therefore, the L control figure has to be input to the LCD 109b with turning upside down.

In the fifteenth embodiment, two image sensing devices are provided, and one of them picks up images of the right half of viewers' faces and the other picks up images of the left half of viewer's faces. However, by using one image sensing device to pick up half images of the viewers' faces, and by displaying the picked up images on one of the monochrome LCD, then displaying negative/positive converted images of the picked up images on the other monochrome LCD, the same object can be achieved.

In the fifteenth embodiment as described above, a case where the liquid crystal displays 109a and 109b block light when voltage is applied is explained, however, in a case where the liquid crystal displays 109a and 109b transmit light when no voltage is applied, the left and right half images described above are displayed as light blocking images.

FIG. 31 also illustrates another method to achive the above described inversions of the screen images and control figures in the fifteenth embodiment. The meaning of "ⓢ" and "→" is the same as the first embodiment.

<Sixteenth Embodiment>

In the first to fourteenth embodiments, a stereoscopic image is obtained by seeing screen images displayed on color CRTs which are as image display devices through the mono-chromatic transmission type liquid crystal displays which are as spatial modulation elements. In the sixteenth embodiment, the mono-chromatic transmission type liquid crystal displays are used, however, color liquid crystal displays are used instead of the color CRTs as the image display devices. Similar to the previous embodiments, in the apparatus according to the present embodiment comprises a plurality of displays. The displays are set "normally" unless otherwise specified.

Figure 33:
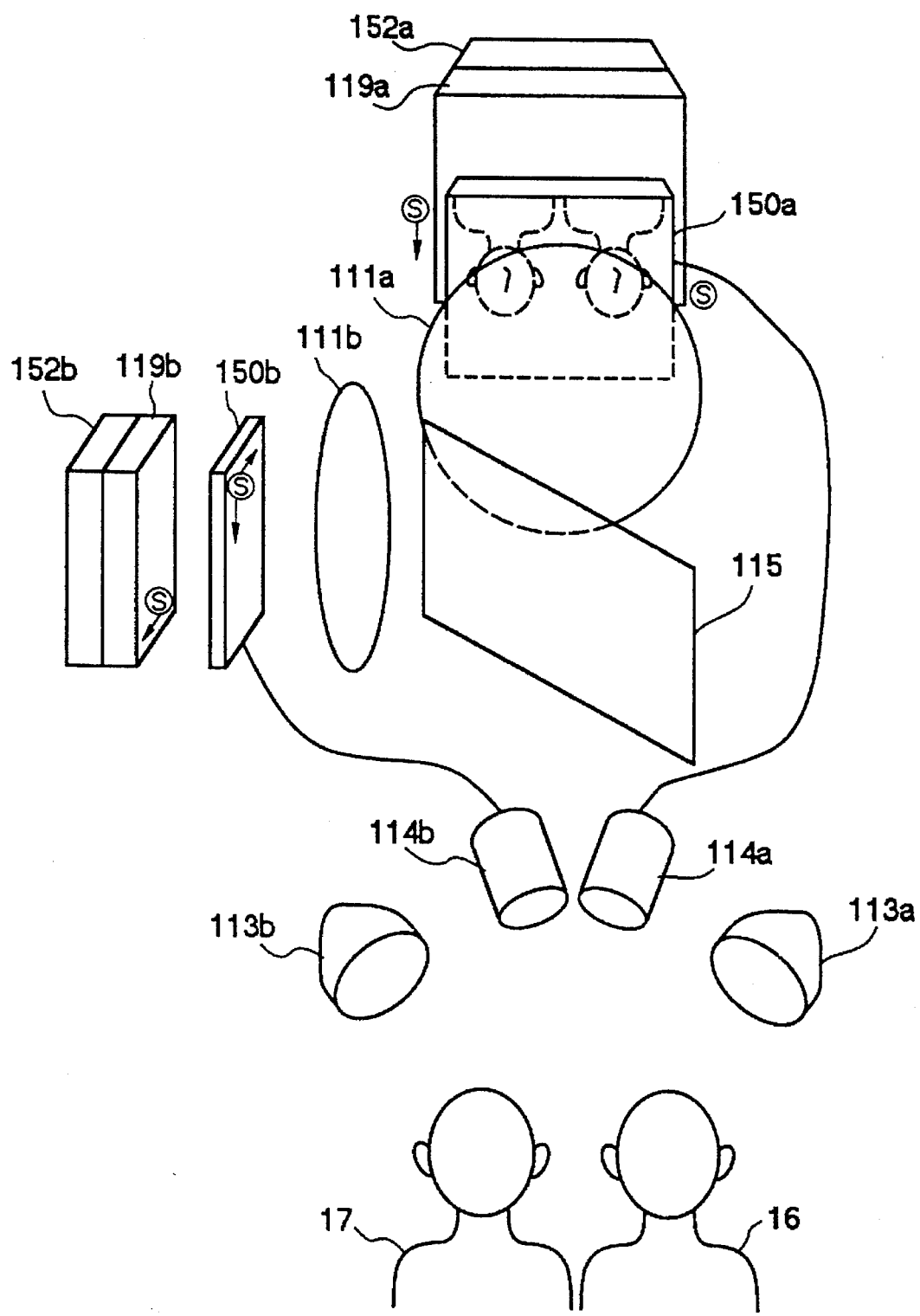
FIG. 33 illustrates a configuration of a stereoscopic image display apparatus according to a sixteenth embodiment of the present invention.

FIG. 33 illustrates a configuration of a stereoscopic image display apparatus according to the sixteenth embodiment of the present invention.

In the sixteenth embodiment, the screen color images are displayed on color liquid crystal displays 152a and 152b. Further, there are provided a monochrome liquid crystal display 150a for selectively transmitting the R color screen images and a monochrome liquid crystal display 150b for selectively transmitting the L color screen images, and Fresnel lenses 151a and 151b are provided between the monochrome displays 150a and 150b and the viewers 16 and 17, respectively.

Note that, since LEDs 113a and 113b and image sensing devices 114a and 114b are the same as the ones described in the first embodiments, the wavelength range of the emitted light from the LEDs are the same as the one in FIG. 5. Accordingly, the areas of the faces of the viewers 16 and 17 illuminated by the two light sources, namely LEDs 113a and 113b, are illustrated in FIG. 4.

Figure 34:
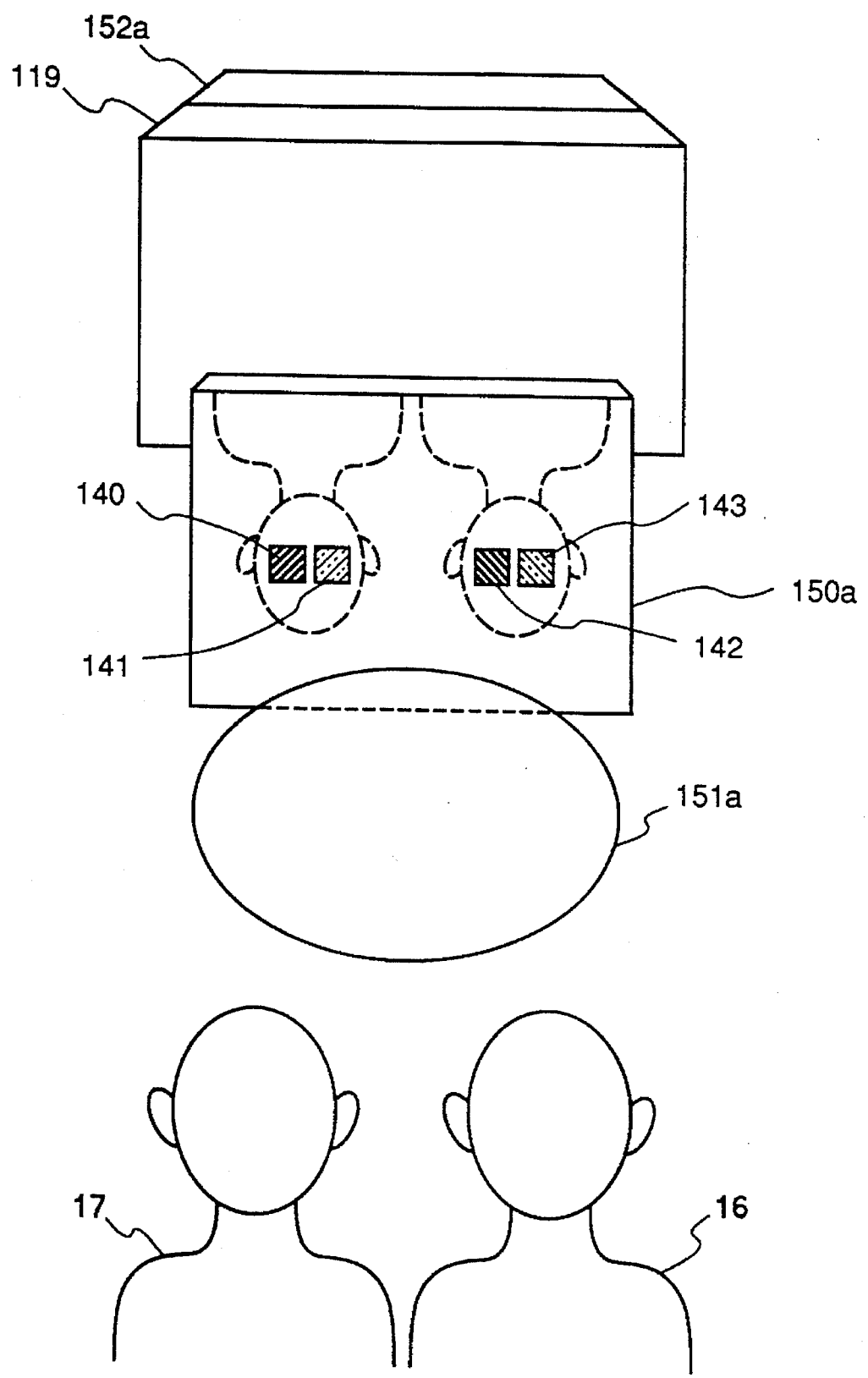
FIG. 34 illustrates a diagram illustrating a theory according to the sixteenth embodiment of the present invention.

FIG. 34 shows a scene where the viewers see images of their faces as virtual images. For the sake of simplicity, the color liquid crystal display 152a, the circular dichroic plate 119, the Fresnel lens 151a and the monochrome liquid crystal display 150a are shown, and the color liquid crystal display 152b, the Fresnel lens 151b, monochrome liquid crystal display 150b, and the half mirror, are not shown in the FIG. 34. Reference numerals 140, 141, 142, and 143 indicate areas where the viewers actually see out of the images of themselves displayed on the monochrome liquid crystal display 150a. More specifically, the areas 140 and 142 are for the right eyes of the viewers 16 and 17, and the areas 141 and 143 are for the left eyes of the viewers 16 and 17.

In FIG. 34, if the color liquid crystal display 152a displays color images for the right eye and the monochrome display 150a displays the right half faces of the viewers 16 and 17 at the positions corresponding to the areas 140 and 142, for example, the viewers 16 and 17 see the R screen images, transmitted through the areas 140 and 142, on the color liquid crystal display 152a. Similarly, the left eyes of the viewers 16 and 17 can see the L color screen images which are reflected by the half mirror 15, thus it is possible for the viewers to see the color stereoscopic images in the sixteenth embodiment as in the first embodiment.

Figure 35:
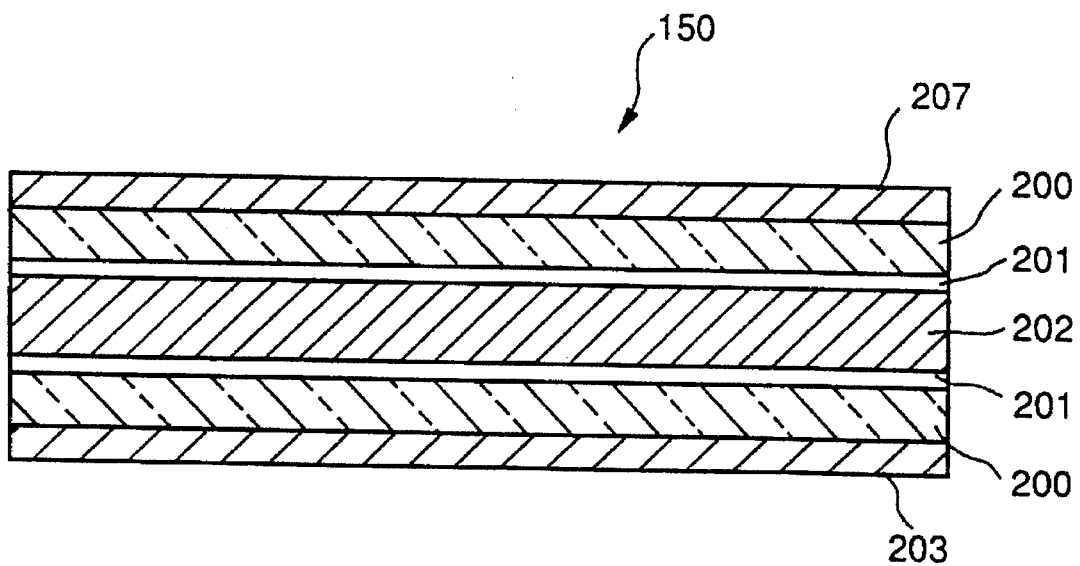
FIG. 35 illustrates a cross sectional view of the stereoscopic image display apparatus according to the sixteenth embodiment of the present invention.

FIG. 35 shows a cross sectional view of the monochrome liquid crystal display apparatus 150, where reference numeral 200 denotes a glass substrate; 201, a transparent electrode; 202, liquid crystal; and 203 and 207, polarizing plates.

Figure 36:
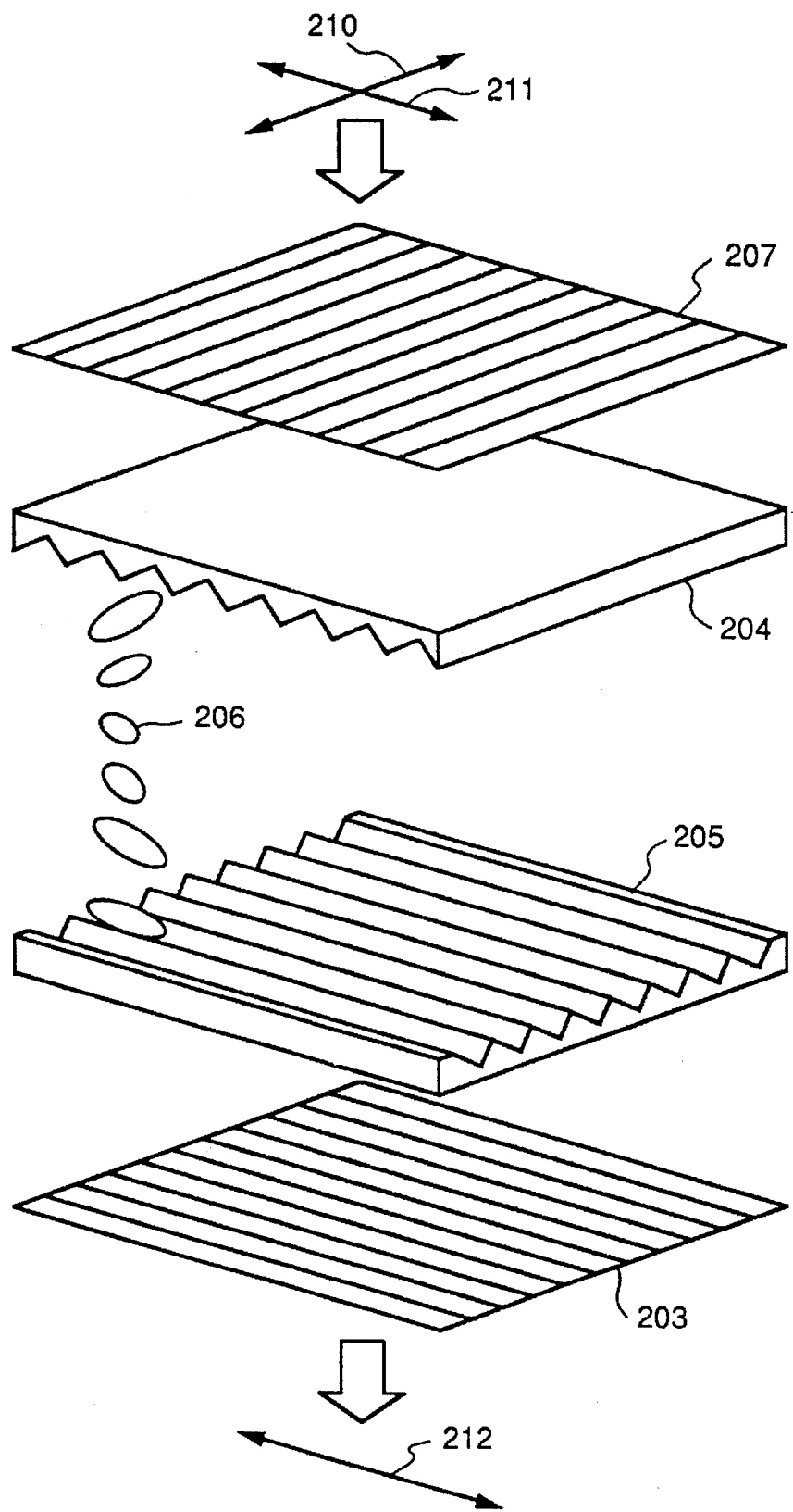
FIG. 36 illustrates a diagram illustrating a theory according to the sixteenth embodiment of the present invention.
Figure 37:
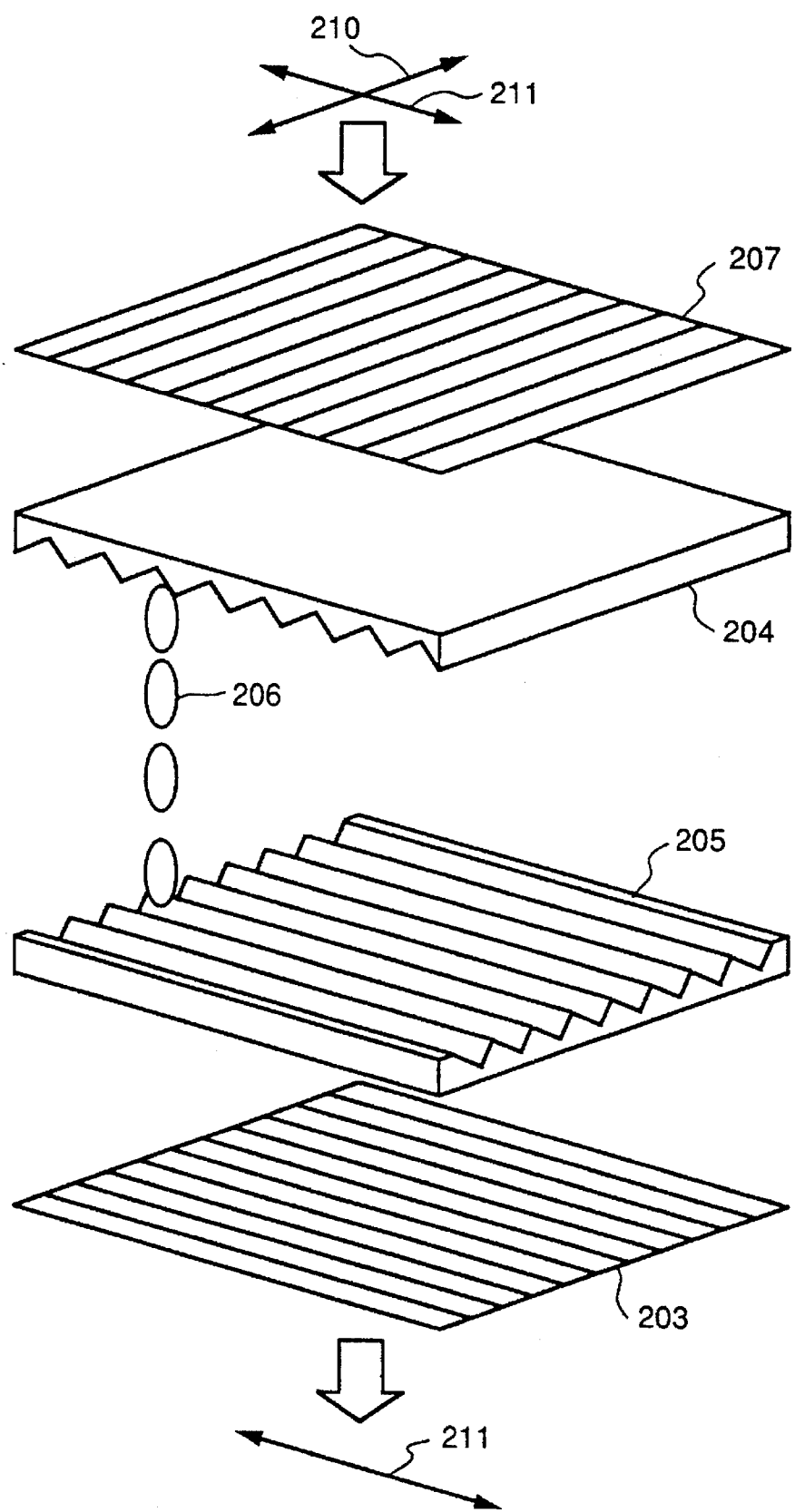
FIG. 37 illustrates a diagram illustrating the theory according to the sixteenth embodiment of the present invention.

FIGS. 36 and 37 respectively show transmission of polarized light when no voltage is applied to the liquid crystal and when a voltage is applied to the liquid crystal of the transmission type liquid crystal display 150 shown in FIG. 33. In FIGS. 36 and 37, reference numerals 204 and 205 denote deflecting memblanes; 206, a molecule of liquid crystal; 203 and 207, polarizing plates; 210 and 211, incoming polarized light whose polarization directions are perpendicular to each other; and 212, transmitted light.

Next, the operation of the circular dichroic plates 119a and 119b will be described with reference to FIG. 38.

Figure 38:
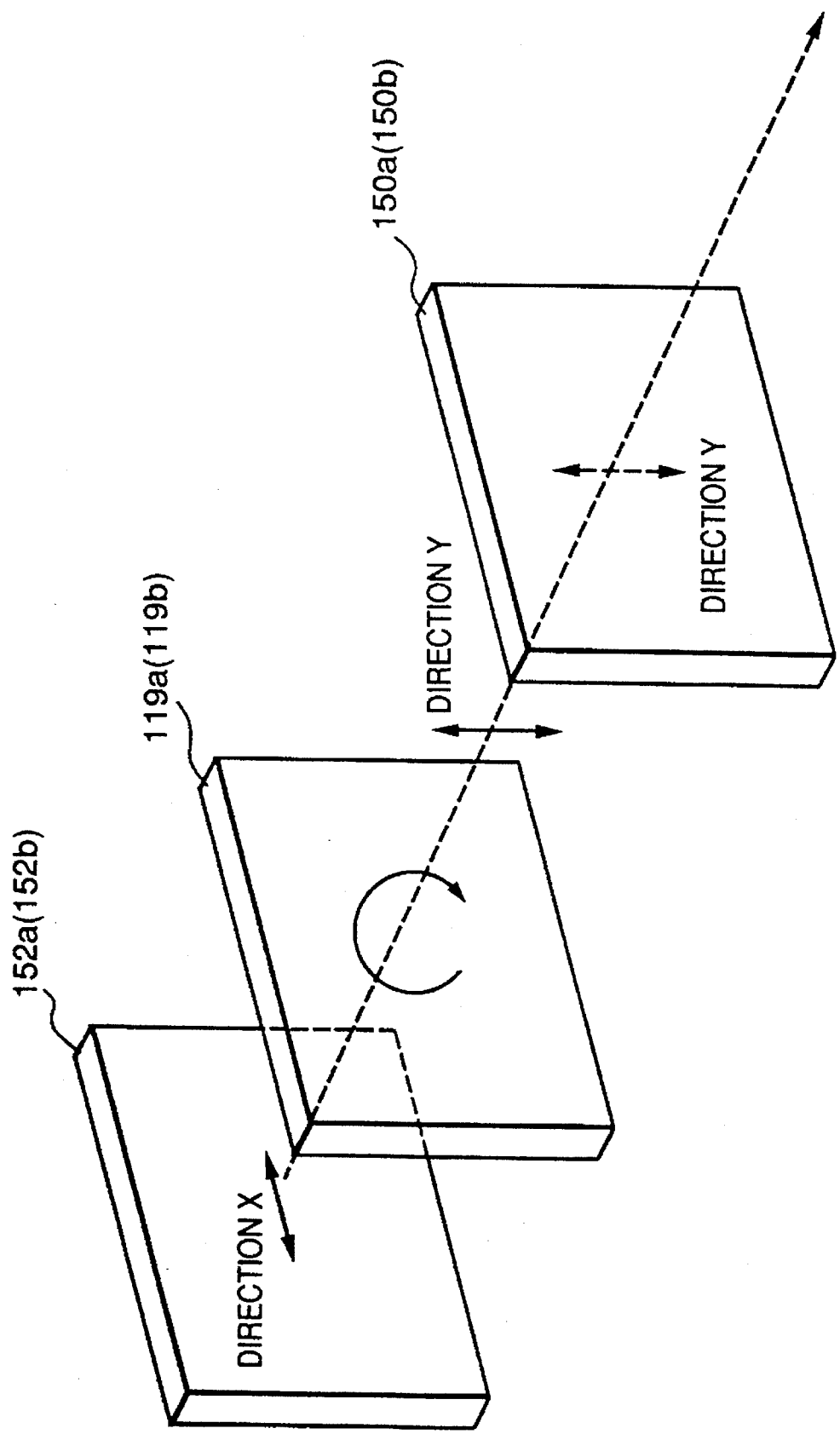
FIG. 38 illustrates a diagram illustrating the theory according to the sixteenth embodiment of the present invention.

FIG. 38 describes a situation where light transmitted through the color liquid crystal display 152a (152b) is changed its polarization state by passing through the circular dichroic plate 119 (119b), then transmitted through the monochrome liquid crystal display 150a (150b) by matching to the polarization characteristics of the display 150a (150b).

As described above, in this embodiment, a color liquid crystal display 152a (152b) is used as an image display device, and the monochrome liquid crystal display 150a (150b) is used as a spatial modulation element. Liquid crystal displays change the polarization directions of light so that the polarized light points a single direction. Accordingly, the emitted light from the color liquid crystal display 152a (152b) is polarized in the X (Y) direction in this example. As shown in FIG. 38, if the polarization characteristics of the monochrome liquid crystal display 150a (150b) is in the Y (X) direction, the amount of the light, emitted from the color liquid crystal display 152a (152b), which is transmitted through the monochrome liquid crystal display 150a (150b) is greatly reduced.

The circular dichroic plate 119a (119b) rotates the polarization direction of the light emitted by the color liquid crystal display 152a (152b), and by adjusting the circular dichroic plate in the angular direction so that the polarization direction of the emitted light, rotated its polarization direction by the circular dichroic plate, matches to the polarization direction of the monochrome liquid crystal display 150a (150b), thus the amount of light transmitted through the monochrome liquid crystal display 150a (150b) is not reduced very much.

In the sixteenth embodiment as shown in FIGS. 36 and 7, the light which can be transmitted through the monochrome liquid crystal displays 150a and 150b is polarized. For example, the incoming light 210 can be transmitted through polarizing plate 207, then changed its polarization direction and transmitted as transmitted light 212. In FIG. 37, the incoming light 210 is transmitted through the polarizing plate 207, however, blocked by the polarizing plate 203.

Accordingly, in the sixteenth embodiment, the circular dichroic plates 119a and 119b are provided in front of the color liquid crystal display 152a and 152b, respectively, thus light of color images is performed with circular dichrism. Therefore, with a theory shown in FIG. 38, it becomes possible for large amount of light to be transmitted through the monochrome liquid crystal displays 150a and 150b, thus a bright stereoscopic image can be obtained.

In the sixteenth embodiment, the Fresnel lens is used as an optical element having directivity, however, a concave lens and a convex mirror can be used instead.

FIG. 33 also illustrates another method to achive the above described inversions of the screen images and control figures in the sixteenth embodiment. The meaning of "(s)" and "→" is the same as the first embodiment.

<Seventeenth Embodiment>

The characteristics of the first to sixteenth embodiments are that, when viewers move to an arbitrary position, the light transmission image (light transmission figure) and the light blocking image (light blocking figure) are moved in accordance with the viewers movement. Therefore, in the first to sixteenth embodiments, means for detecting positions of the viewers is necessary. In the seventeenth embodiment, although the positions to which the viewer can move are limited, but the display apparatus is simplified by using a light blocking plate as a spatial modulation element instead of a liquid crystal display. Similar to the previous embodiments, in the apparatus according to the present embodiment comprises a plurality of displays. The displays are set "normally" unless otherwise specified.

Figure 39:
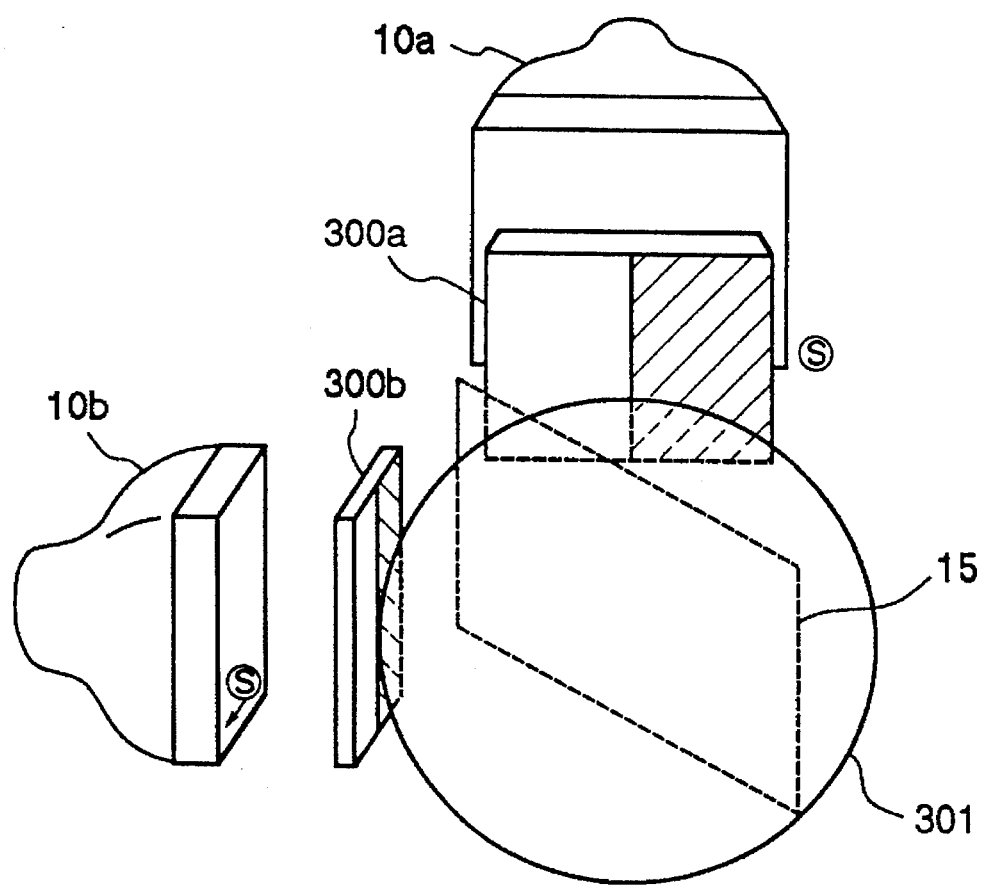
FIG. 39 illustrates a configuration of a stereoscopic image display apparatus according to a seventeenth embodiment of the present invention.
Figure 39:
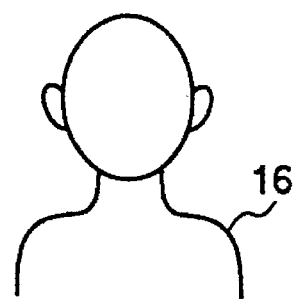

FIG. 39 illustrates a stereoscopic image display system according to the seventeenth embodiment.

In FIG. 39, reference numeral 10a and 10b denote CRT devices for displaying R screen images and L screen images, respectively. In front of each CRT devices 10a and 10b, a light blocking plate for the right eye (referred as "R light blocking plate", hereinafter) 300a and a light blocking plate for the left eye (referred as "L light blocking plate", hereinafter) 300b are provided.

The light blocking plates 300a and 300b in the seventeenth embodiment can be glass plates painted by non-transparent paint, for instance. Thus, instead of light transmission images (light transmission figures) and light blocking images (light blocking figures) displayed on the liquid crystal display 11 used in the first embodiment, for instance, the light blocking plates are used in the seventeenth embodiment, where a transparent area and a non-transparent area are provided on the light blocking plates. In FIG. 39, the portions indicated by oblique stripes are the non-transparent areas.

In FIG. 39, reference numeral 15 denotes a half mirror for combining images displayed on the CRT 10a and 10b; and 301, a group of lenses for magnifying the combined images.

Figure 40:
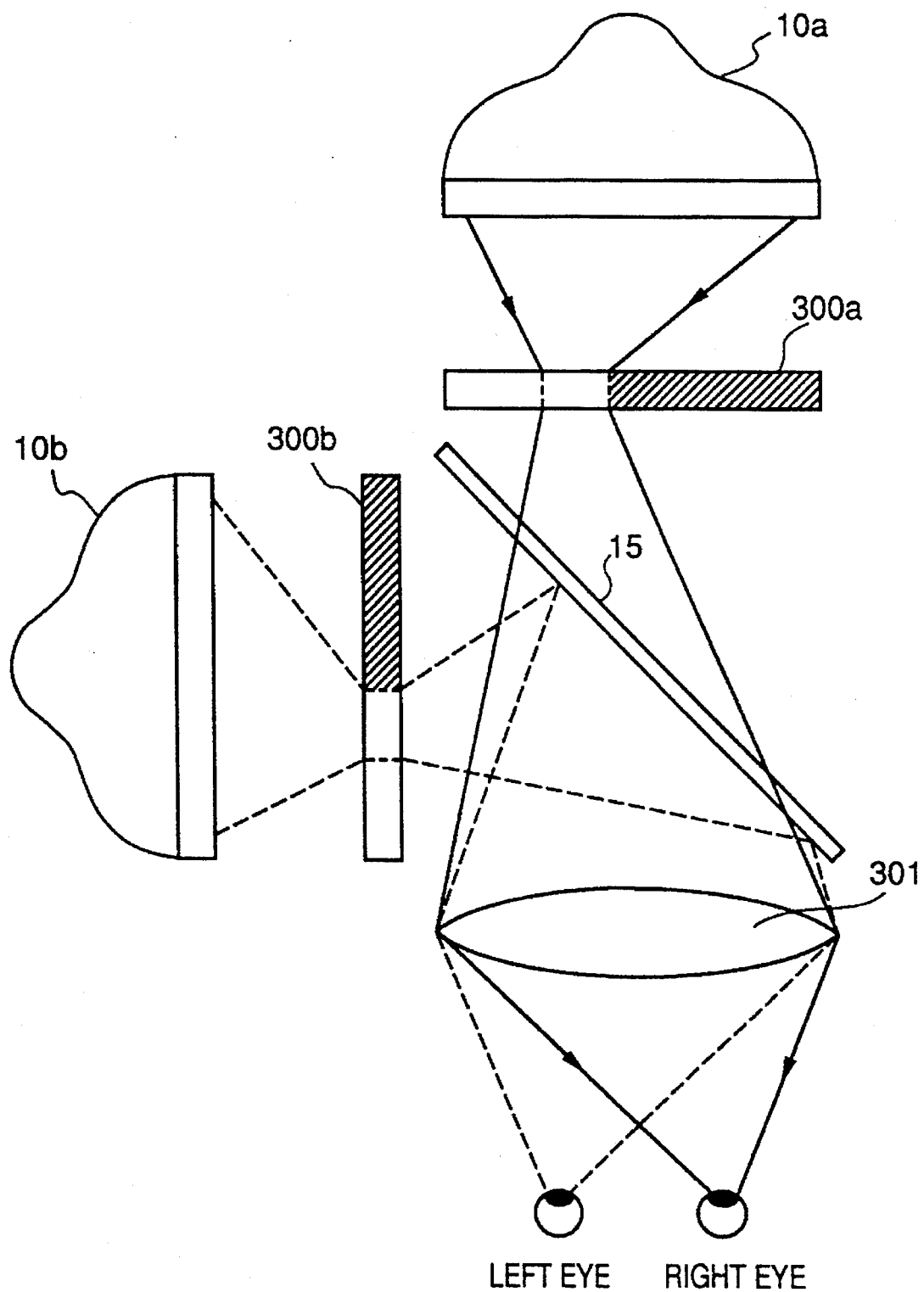
FIG. 40 illustrates a diagram illustrating a theory according to the seventeenth embodiment of the present invention.

FIG. 40 shows light paths of images displayed on the CRTs 10a and 10b reaching respective eyes of the viewers through the light blocking plates 300a and 300b. The right eye of the viewer 16 can see the R screen images displayed on the CRT 10a through the transparent portion of the light blocking plate 300a as upside-down images, likewise the left eye of the viewer 16 can see the L screen images displayed on the CRT 10b through the transparent portion of the light blocking plate 300b as upside-down mirror images. The light blocking plates 300a and 300b make an image sensing device and the illumination lamp unnecessary.

<Modification>

In order to invert images in the various embodiments described above, the various methods are adopted, for example, turning display body by 180 degrees and/or manipulating the image data. The inversion of images may be realized by other methods. For example, in a transmission type LCD, a right-to-left inversion of image is realized by turning the display by 180 degrees around a vertical axis. A longitudinal inversion of image is realized by turning it 180 degrees around a horizontal axis. In CRT displays, rotating yoke coils therein realizes an inversion of image in a vertical or horizontal direction. Further, changing start point of luster scan in CRT displays will cause an inversion of image in right-to-left direction.

Furthermore, the mirrors may be substitued by any type of beam splitters.

INDUSTRIAL APPLICABILITY

A stereoscopic image display apparatus using a pair of screen images for the right eye and for the left eye, it is possible to provide a stereoscopic image display apparatus which does not require a viewer to wear glasses having function of separating screen images for the right eye from the screen images for the left eye, and which produces stereoscopic images that can be seen by a large number of viewers at the same time, and can be seen by the viewers while they are changing their positions, and are flicker-less since the provided images are continuous. The present invention greatly contributes to stereoscopic image display apparatus and a stereoscopic endoscope.

As many apparently widely different embodiments of the present invention can be made without departing from the spirit and scope thereof, it is to be understood that the invention is not limited to the specific embodiments thereof except as defined in the appended claims.

What is claimed is:

1. An image display apparatus comprising:
   an infrared light irradiation device for selectively illuminating right and left half faces of the viewers;
   at least one image sensing device for picking up an image of the viewers' faces, said at least one image sensing device being capable of selectively picking up images depending upon the wavelengths of infrared light;
   first image display means for displaying a first image;
   second image display means for displaying a second image;
   first spatial modulation element provided between said first image display means and said viewers, said first spatial modulation element transmitting light at a position corresponding to one of said right and left half faces of the viewers picked up by said at least one image sensing device, and blocking light at a position corresponding to one of said left and right half faces;
   second spatial modulation element provided between said second image display means and the viewers, said second spatial modulation element transmitting light at a position corresponding to one of said left said right half faces of the viewers and blocking light at a position corresponding to one of said right and left half faces;
   at least one optical element, provided between the first and second spatial modulation elements and said viewers, for giving directivity to light of the first and the second images which are transmitted through said first and second spatial modulation elements, respectively; and
   combining means, provided between the first and second spatial modulation elements and viewers, for combining light of the first and second images which are transmitted through said first and second spatial modulation elements,
   wherein light transmission areas and light blocking areas on said first and second spatial modulation elements are controlled depending upon the image of the viewers' faces picked up by said at least one image sensing device.

2. The image display apparatus according to claim 1, wherein said first and second spatial modulation elements are for screen images of a stereoscopic image for the right eye and the left eye, respectively, said first spatial modulation element transmits light at a position corresponding to right half faces of the viewers and blocks light at a position corresponding to left half faces of the viewers, whereas said second spatial modulation element transmits light at the position corresponding to left half faces of the viewers and blocks light at the position corresponding to right half faces of the viewers.

3. The image display apparatus according to claim 1, wherein said at least one optical element comprises either one of a lens and a concave mirror.

4. The image display apparatus according to claim 1, wherein said at least one optical element magnifies an area corresponding to the fight half faces of the viewers on said first spatial modulation element for the fight eyes of the viewers, and magnifies an area corresponding to the left half faces of the viewers on said second spatial modulation element for the left eyes of the viewers.

5. The image display apparatus according to claim 1, wherein said at least one optical element is provided between said combining means and the viewers.

6. The image display apparatus according to claim 1, wherein said at least one optical element comprises one of (1) a pair of lenses and (2) concave mirrors which are respectively provided between said first and second spatial modulation elements and said combining element.

7. The image display apparatus according to claim 1, wherein said first and second spatial modulation elements are mono-chromatic liquid crystal displays.

8. The image display apparatus according to claim 1, wherein said first and second spatial modulation elements comprise one of (1) a pair of transmission type mono-chromatic liquid crystal displays and (2) electrochromic displays.

9. The image display apparatus according to claim 1, wherein said first and second spatial modulation elements are light blocking plates on which areas for transmitting light and areas for blocking light are fixed.

10. The image display apparatus according to claim 1, said infrared light irradiation device illuminates right half and the left half faces of the viewers by using light having two different frequencies,
    wherein said at least one image sensing device has wavelength filters each of which selectively transmits infrared light of different the wavelengths emitted by said irradiation device.

11. The image display apparatus according to claim 10, wherein said first spatial modulation element displays an image of right half faces, picked up by said at least one image sensing device, of the viewers as light transmission figures, and wherein said second spatial modulation element displays an image of left half faces, picked up by said at least one image sensing device, of the viewers as light transmission figures.

12. The image display apparatus according to claim 10, wherein images except the faces of viewers are eliminated by applying subtraction on two images picked up by said at least one image sensing device, and images of obtained left and right half faces of the viewers are displayed on the first and second spatial modulation elements as light transmission figures, respectively.

13. The image display apparatus according to claim 1, wherein surfaces of said first and second spatial modulation elements are provided at a position beyond a focal distance of the at least one optical element.

14. The image display apparatus according to claim 1, wherein said irradiation device is one of a lamp unit for emitting infrared light, and a LED capable of emitting infrared light.

15. The image display apparatus according to claim 1, further comprising:
    a pair of lens glasses for picking up an image of an object to be seen as a stereoscopic image from the two directions; and
    an endoscope, including a pair of image sensing elements for converting the images picked up by said pair of lens glasses into electrical signals,
    wherein the image signals obtained by the image sensing elements are displayed on said first and second image display means.

16. The image display apparatus according to claim 1, wherein said first and second image display means display still images.

17. The image display apparatus according to claim 1, wherein said first and second image display means comprise liquid crystal displays for displaying one of the first and second images and polarizing plates provided in front of the liquid crystal displays.

18. The image display apparatus according to claim 1, wherein said irradiation device is fixed on the head of the viewer.

19. The image display apparatus according to claim 1, wherein said combining means comprises a beam splitter.

20. An image display apparatus comprising:

an irradiation device for selectively illuminating one of right and left half faces of viewers;

an image sensing device for picking up an image of one of said fight and left half faces of the viewers irradiated by the irradiation device;

means for generating a negative-positive converted image of the image picked up by said image sensing device;

first image display means for displaying a first image;

second image display means for displaying a second image;

first spatial modulation element provided between said first image display means and the viewers, said first spatial modulation element transmitting light at positions corresponding to the image picked up by said image sensing device, and blocking light at positions not corresponding to the image;

second spatial modulation element provided between said second image display means and the viewers, said second spatial modulation element transmitting light at positions corresponding to the converted image generated by said generating means, land blocking light at positions not corresponding to the converted image;

at least one optical element, provided between the first and second spatial modulation elements and viewers, for giving directivity to light of the first and the second images which are transmitted through said first and second spatial modulation elements; and combining means, provided between the first and second spatial modulation elements and viewers, for combining light of the first and second images which are transmitted through said first and second spatial modulation elements, wherein light transmission areas and light blocking areas on said first and second spatial modulation elements are controlled depending upon the image of the viewers' faces picked up by said image sensing device.

21. The image display apparatus according to claim 20, wherein said first and second spatial modulation elements are for screen images of a stereoscopic image for the right eye and the left eye, respectively, said first spatial modulation element transmits light at a position corresponding to right half faces of the viewers and blocks light at a position corresponding to left half faces of the viewers, whereas said second spatial modulation element transmits light at a position corresponding to left half faces of the viewers and blocks light at a position corresponding to right half faces of the viewers.

22. The image display apparatus according to claim 20, wherein said at least one optical element comprises one of a lens and a concave mirror.

23. The image display apparatus according to claim 20, wherein said at least one optical element magnifies an area corresponding to the right half faces of the viewers on said first spatial modulation element for the right eyes of the viewers, and magnifies an area corresponding to the left half faces of the viewers on said second spatial modulation element for the left eyes of the viewers.

24. The image display apparatus according to claim 20, wherein said at least one optical element is provided between said combining means and the viewers.

25. The image display apparatus according to claim 20, wherein said at least one optical element comprises one of (1) a pair of lenses and (2) concave mirrors which are respectively provided between said first and second spatial modulation elements and said combining element.

26. The image display apparatus according to claim 20, wherein said first and second spatial modulation elements are mono-chromatic liquid crystal displays.

27. The image display apparatus according to claim 20, wherein said first and second spatial modulation elements comprise one of (1) a pair of transmission type mono-chromatic liquid crystal displays and (2) electrochromic displays.

28. The image display apparatus according to claim 20, wherein said fist and second spatial modulation elements are light blocking plates on which areas for transmitting light and areas for blocking light are fixed.

29. The image display apparatus according to claim 20, wherein images except the faces of viewers are eliminated by applying subtraction on two images picked up by said image sensing element.

30. The image display apparatus according to claim 20, wherein surfaces of said first and second spatial modulation elements are provided at a position beyond a focal distance of the at least one optical element.

31. The image display apparatus according to claim 20, wherein said irradiation device is one of a lamp unit for emitting infrared light, and a LED capable of emitting infrared light.

32. The image display apparatus according to claim 20, further comprising:

a pair of lens glasses for picking up an image of an object to be seen as a stereoscopic image from the two directions; and an endoscope, including a pair of image sensing elements for converting the images picked up by said pair of lens glasses into electrical signals, wherein the image signals obtained by the image sensing elements are displayed on said first and second image display means.

33. The image display apparatus according to claim 20, wherein said first and second image display means display still images.

34. The image display apparatus according to claim 20, wherein said first and second image display means comprise liquid crystal displays for displaying one of the first and second images and polarizing plates provided in front of the liquid crystal displays.

35. The image display apparatus according to claim 20, wherein said irradiation device is fixed on the head of the viewer.

36. The image display apparatus according to claim 20, wherein said combining means comprises a beam splitter.

* * * * *

UNITED STATES PATENT AND TRADEMARK OFFICE
CERTIFICATE OF CORRECTION

PATENT NO. : 5,644,427
DATED : July 1, 1997
INVENTOR(S) : Shigeru OMORI et al

It is certified that error appears in the above-identified patent and that said Letters Patent is hereby corrected as shown below:

In Column 27, line 31, delete "7" and insert -- 37 --.

In Column 29, line 63, delete "fight" and insert -- right --.

In Column 29, line 64, delete "fight" and insert -- right --.

In Column 31, line 13, delete "fight" and insert -- right --.

Signed and Sealed this

Ninth Day of December, 1997

Attest:

BRUCE LEHMAN

*Attesting Officer*     *Commissioner of Patents and Trademarks*